3,784,603
6-AZIDO-21-OXYGENATED-STEROIDS OF THE PREGNANE SERIES, METHODS FOR THEIR MANUFACTURE AND INTERMEDIATES PRODUCED THEREBY
Elliot L. Shapiro, Cedar Grove, N.J., George J. Teutsch, Nancy, France, and Hershel L. Herzog, Glen Ridge, N.J., assignors to Schering Corporation, Bloomfield, N.J.
No Drawing. Continuation of abandoned application Ser. No. 59,367, July 29, 1970. This application July 13, 1972, Ser. No. 271,463
Int. Cl. C07c *173/10*
U.S. Cl. 260—349                                          44 Claims

ABSTRACT OF THE DISCLOSURE 6-azido-21-oxygenated-4-pregnene-3,20-diones and the 1-dehydro-, 6-dehydro-, and 1,6-bis-dehydro-analogs thereof possess corticoid properties. Preferred are the 6-dehydro analogs, i.e. the 6-azido-21-oxygenated-4,6-pregnadiene-3,20-diones, having enhanced anti-inflammatory activity. Compounds useful as intermediates which also possess glucocorticoid properties are 6β-azido-7α-hydroxy-21-oxygenated-4-pregnene-3,20-diones and the 7α-acylates thereof.

The preferred 6-azido-21-oxygenated-4,6-pregnadiene-3,20-diones are prepared by treating a 6α,7α-oxido-4-pregnene with an alkali metal azide in an aqueous, inert organic solvent; esterifying the thereby formed 6β-azido-7α-hydroxy-4-pregnene; and treating the resulting 6β-azido-7α-acyloxy-4-pregnene with a tetraalkylammonium halide in an aprotic solvent. Alternatively, the 6-azido-4,6-pregnadienes are prepared by treating a 6β-azido-7α-hydroxy-4-pregnene or 7α-acylate thereof with concentrated hydrochloric acid in a lower alkanoic acid in an inert solvent.

The 6α-azido-21-oxygenated-4-pregnene-3,20-diones and 1-dehydro analogs thereof are prepared by treating a 6β-halogeno-(or 6β-sulfonyloxy)-21-oxygenated-4-pregnene-3,20-dione or 1-dehydro-analog thereof with an alkali metal azide in an inert solvent.

The 6-azido-21-oxygenated-1,4,6-pregnatriene-3,20-diones are prepared by treating a 6-azido-21-oxygenated-4,6-pregnadiene-3,20-dione with 2,3-dichloro-5,6-dicyanobenzoquinone in the presence of a strong acid and water.

This is a continuation of application Ser. No. 59,367, filed July 29, 1970, now abandoned.

FIELD OF INVENTION

This invention relates to novel compositions of matter and to processes for their preparation.

More specifically, this invention relates to compositions of matter which may be classified as 6-azido-3,20-diketo-21-oxygenated-4-dehydro-steroids of the pregnane series, to methods for their manufacture, and to intermediates produced thereby.

SUMMARY OF INVENTION

The invention sought to be patented in one composition-of-matter aspect resides in the concept of a chemical compound having a molecular structure comprising a steroid with a 21-oxygenated-4-pregnene-3,20-dione nucleus and having an azido group at C-6, said steroids possessing corticoid properties. Those 6-azido-21-oxygenated-4-pregnene-3,20-diones of the composition-of-matter aspect of our invention which are also substituted at C-11 by a halogen or an oxygenated function, and at C-17 by an oxygenated function, possess glucocorticoid properties and are valuable as anti-inflammatory agents, a preferred species of this group being 6-azido-4,6-pregnadiene derivatives, particularly 6-azido-11,17,21-tri-oxygenated-4,6-pregnadiene-3,20-diones which have enhanced anti-inflammatory activity. Compounds of this composition-of-matter aspect which are valuable mainly as intermediates are 21-hydrocarbonsulfonate esters of 6-azido-4,6-pregnadiene-21-ol-3,20-diones which are useful in the preparation of the corresponding pharmaceutically valuable 21-phosphate esters.

The invention sought to be patented in another composition-of-matter aspect resides in the concept of a chemical compound having a molecular structure comprising a steroid with a 21-oxygenated-4-pregnene-3,20-dione nucleus and having an azido group at C-6 and a hydroxyl group or ester thereof at C-7, some of which compounds are valuable mainly as intermediates in preparing the preferred 6-azido-21-oxygenated-4,6-pregnadiene-3,20-diones of the aforementioned pharmacologically active composition-of-matter aspect of our invention. These compounds, particularly the 11-substituted-6β-azido-7α-hydroxy-4-pregnenes and their 7-lower alkanoate esters also possess glucocorticoid activity per se.

The invention sought to be patented in one process aspect resides in the concept of a method for preparing the preferred pharmacologically active 6-azido-21-oxygenated-4,6-pregnadiene-3,20-diones of our invention which comprises treating a 6α,7α-oxido-21-oxygenated-4-pregnene-3,20-dione with an alkali metal azide (preferably sodium azide) in an aqueous, inert organic solvent, esterifying the thereby formed 6β-azido-7α-hydroxy-21-oxygenated-4-pregnene-3,20-dione, and treating the resulting 6β-azido-7α-acyloxy-21-oxygenated-4-pregnene-3,20-dione with a tetraalkylammonium halide (preferably tetramethylammonium fluoride) in an aprotic solvent whereby is formed a 6-azido-21-oxygenated-4,6-pregnadiene-3,20-dione of our invention.

The invention sought to be patented in another process aspect provides another method for preparing the preferred 6-azido-21-oxygenated-4,6-pregnadienes of our invention and resides in the concept of treating a member selected from the group consisting of a 6β-azido-7α-hydroxy-21-oxygenated-4-pregnene-3,20-dione and the 7α-acyloxy derivatives thereof with concentrated hydrochloric acid in a lower alkanoic acid (preferably acetic acid) in an inert solvent, e.g. acetone or dioxane, whereby is formed a 6-azido-21-oxygenated-4,6-pregnadiene-3,20-dione of our invention.

The invention sought to be patented in yet another process aspect resides in the concept of a method for preparing the pharmacologically active 6α-azido-21-oxygenated-4-pregnene-3,20-diones and the 1-dehydro analogs thereof which comprises treating a member of the group consisting of a 6β-L-21-oxygenated-4-pregnene-3,20-dione and a 6β-L-21-oxygenated-1,4-pregnadiene-3,20-dione said 6β-L- being a member selected from the group consisting of 6β-chloro, 6β-bromo, and 6β-hydrocarbonsulfonyloxy having up to seven carbon atoms with an alkali metal azide (preferably sodium azide) in an inert organic solvent whereby is formed a 6α-azido-21-oxygenated-4-pregnene-3,20-dione of our invention.

The invention sought to be patented in a fourth process aspect resides in the concept of a method of preparing 6-azido-21-oxygenated - 1,4,6 - pregnatriene - 3,20 - diones which comprises treating a 6-azido-21-oxygenated - 4,6-pregnadiene-3,20-dione in an inert solvent with 2,3-dichloro-5,6-dicyanobenzoquinone in the presence of a strong acid and frequently, also in the presence of water, whereby is formed a 6-azido-2-oxygenated-1,4,6-pregnatriene-3,20-dione of our invention.

GENERAL DESCRIPTION OF THE 6 - AZIDO - 4-PREGNENE COMPOSITION-OF-MATTER ASPECT OF THE INVENTION

Included among the physical embodiments of one composition-of-matter aspect of our invention are novel compounds selected from the group consisting of 6-azido-21-oxygenated-4-pregnene-3,20-diones of following Formula I and the 1-dehydro-, 6-dehydro-, and 1,6-bis-dehydro-analogs thereof:

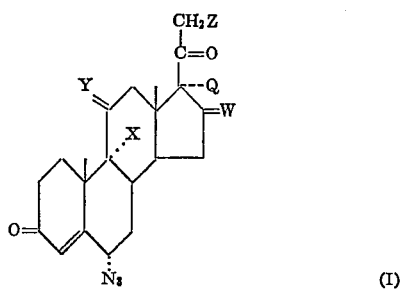

(I)

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen (H,α-alkyl), (H,β-alkyl), (H,α-OH), (H,αOR') wherein R' is an acyl radical of a hydrocarbon carboxylic acid having up to 12 carbon atoms, =CHT where T is a member selected from the group consisting of hydrogen, alkyl, fluorine and chlorine, and W taken together with Q when Q is hydroxy and W is (H,α-hydroxy), the 16α, 17α-alkylidene derivatives thereof;

X is a member selected from the group consisting of hydrogen and halogen having an atomic weight less than 100;

Y is a member selected from the group consisting of hydrogen, oxygen, (H,βOH), and, provided X is halogen, (H,β halogen of atomic weight less than 100);

Z is a member selected from the group consisting of hydroxy and OR" wherein R" is an acyl radical of an acid selected from the group consisting of a hydrocarbon carboxylic acid having up to 12 carbon atoms, phosphoric acid and the mono- and di-alkali metal and alkaline earth metal salts thereof, and Z taken together with Q when both Q and Z are hydroxy, the 17α,21-alkylidene derivatives thereof.

The alkyl groups included within the definition of the substituents W and T are preferably lower alkyl groups, i.e. radicals having usually up to four carbon atoms such as methyl, ethyl, n-propyl, iso-propyl, sec.-butyl, and tert.-butyl, although higher homologs such as pentyl and hexyl come within the scope of this invention.

The alkylidene groups contemplated in the compounds of our invention are preferably lower alkylidenes, i.e. hydrocarbon radicals having preferably up to four carbon atoms and having a terminal double bond, including radicals such as methylene, ethylidene, n-propylidene, iso-propylidene, n-butylidene, sec.-butylidene and tert.-butylidene and the like. The 16-lower alkylidene derivatives of this invention (i.e. when W in above Formula I is =CHT) are double bonded to the D-ring at C–16. The 16α,17α-alkylidenedioxy derivatives and the 17α,21-alkylidenedioxy derivatives have the alkylidene terminal bonds attached to different oxygen atoms, i.e. to the oxygens at C–16 and C–17 in the case of the 16α,17α-alkylidenedioxy derivatives, or to the oxygens at C–17 and C–21 in the case of the 17α,21-alkylidenedioxy derivatives.

As used in the specification and claims of this application, the term "acyl" denotes an organic radical derived from an organic acid by the removal of the hydroxyl group, e.g. acetyl is the acyl radical of acetic acid, benzenesulfonyl is the acyl radical of benzenesulfonic acid, and benzoyl is the acyl radical of benzoic acid.

The acyl radicals of the compounds of this invention as defined by Formula I hereinabove include those derived from hydrocarbon carboxylic acids having up to 12 carbon atoms which may be saturated, unsaturated, straight chain or branched chain, aliphatic, cyclic, cyclic-aliphatic, aromatic, aryl-aliphatic, or alkyl-aromatic, and may be substituted by hydroxy, alkoxy containing from 1 to 5 carbon atoms or by halogen such as fluorine, chlorine, or bromine. Typical ester groups of the 6-azido-21-oxygenated-4-pregnene-3,20-diones of our invention are thus derived from hydrocarbon carboxylic acids such as alkanoic acids exemplified by formic, acetic, propionic, trimethylacetic, butyric, iso-butyric, tert.-butyric, valeric, iso-valeric, caproic, caprylic, capric, undecylic and lauric acids; substituted alkanoic acids such as phenoxyacetic, trifluoroacetic, and β-chloropropionic acids; aromatic and substituted aromatic acids including benzoic, toluic, p-chlorobenzoic acids; arylalkanoic acids such as phenylacetic and phenylpropionic acids; unsaturated acids such as acrylic and sorbic acids; and dibasic acids such as succinic, tartaric and phthalic acids.

Also contemplated as included within the acyl radicals defined by R, R' and R" in compounds of structural Formula I hereinabove, are those derived from phosphoric acids and the mono- and dialkali metal (e.g. sodium, potassium, lithium and alkaline earth metal salts (e.g. magnesium, calcium, barium) thereof.

The halogens at C–9 as defined by X in above Formula I are bromine, chlorine, and preferably fluorine.

The physical embodiment of the 6α-azido-4-pregnenes of Formula I, the 1-dehydro-, 6-dehydro- and the 1,6-bis-dehydro analogs thereof are characterized by being crystalline solids, usually off white to tan in color, which are insoluble in water and soluble in most organic solvents, particularly in dioxane, although of limited solubility in dialkyl ethers and alkyl hydrocarbons.

The pharmacologically active 6-azido-21-oxygenated-4-pregnene-3,20-diones of this invention, i.e. those 6-azido-4-pregnenes of Formula I wherein Z is hydroxy, acyloxy, or together with Q at C–17 is a 17α,21-alkylidene-dioxy, possess corticoid properties. Of these, the 6-azido-pregnenes unsubstituted at C–9 and C–11, i.e. those wherein X and Y are each hydrogen, e.g. 6-azido-16-W-17α-Q-4-pregnene-21-ol-3,20-diones of Formula I possess mineralo-corticoid properties and, as such, are useful in the treatment of conditions requiring retention of sodium, e.g. adrenal insufficiency (i.e. Addison's disease) and salt losing syndromes.

Those 6-azido-21-oxygenated-4-pregnene-3,20-diones of the pharmacologically active composition-of-matter aspect of this invention as defined by Formula I which have a halogen or an oxygen function at C–11 possess glucocorticoid activity and are particularly valuable as anti-inflammatory agents. Of these, preferred species are 6-dehydro-11,17-bis-oxygenated derivatives, particularly 6-azido-4,6-pregnadiene-17,21-diol-3,20-diones of Formula I wherein Y is (H,β-OH)- or oxygen analogs thereof, and their ester and 17,21-alkylidene derivatives, which possess enhanced anti-inflammatory activity.

Illustrative of the preferred 6 - azido-4,6-pregnadienes defined by Formula I are the following:

6 - azido-6-dehydrocortisone (i.e. 6-azido-4,6-pregnadiene-17α,21-diol-3,11,20-trione, a 6-dehydro compound of Formula I wherein Q and Z are hydroxyl, Y is keto, and W and X are hydrogen) and the 21-acetate; 17-valerate; 17,21-dipropionate, and 17,21-iso-propylidene derivative thereof;

6-azido-6-dehydrohydrocortisone (i.e. 6-azido-4,6-pregnadiene-11β,17α,21-triol-3,20-dione) and the 21-acetate; 17-valerate; 17,21-dipropionate, and the 17,21-isopropylidene-derivative thereof;

6-azido-9α-fluoro-4,6-pregnadiene-17α,21-diol-3,11,20-trione, 6-azido-9α-fluoro-4,6-pregnadiene-11β,17α,21-triol-3,20 dione, 6-azido-16-methylene-4,6-pregnadiene-17α,21-diol-3,11,20-trione, 6-azido-16-methylene-4,6-pregnadiene-11β,17α,21-triol-3,20-dione, 6-azido-9α-fluoro-16-methylene-4,6-pregnadiene-17α,21-diol-3,11,20-trione, 6-azido-9α,fluoro-16-methylene-4,6-pregnadiene-11β,17α,21-triol-3,20-dione, 6-azido-16α-methyl-4,6-pregnadiene-17α,21-diol-3,11,20-trione, 6-azido-16β-methyl-4,6-pregnadiene-17α,21-diol-3,11,20-trione, 6-azido-16α-methyl-4,6-pregnadiene-11β,17α,21-triol-3,20-dione, 6-azido-16β-methyl-4,6-pregnadiene-11β,17α,21-triol-3,20-dione, 6-azido-9α-fluoro-16α-methyl-4,6-pregnadiene-17α,21-diol-3,11,20-trione, 6-azido-9α-fluoro-16β-methyl-4,6-pregnadiene-17α,21-diol-3,11,20-trione, 6-azido-9α-fluoro-16α-methyl-4,6-pregnadiene-11β,17α,21-triol-3,20-dione, 6-azido-9α-fluoro-16β-methyl-4,6-pregnadiene-11β,17α,21-triol-3,20-dione, 6-azido-16α-hydroxy-4,6-pregnadiene-17α,21-diol-3,11,20-trione, the 16,21-diacetate ester thereof, and the 16α,17α-iso-propylidene derivative thereof, 6-azido-16α-hydroxy-4,6-pregnadiene - 11β,17α,21 - triol-3,20-dione, the 16,21-diacetate ester thereof, and the 16α,17α-iso-propylidene derivative thereof, 6-azido-9α-fluoro-16α-hydroxy - 4,6 - pregnadiene - 17α,21-diol-3,11,20-trione, the 16,21-diacetate ester thereof, and the 16α,17α-iso-propylidene thereof, 6-azido-9α-fluoro-16β-methyl-4,6-pregnadiene-11β,17α, 21-triol-3,20-dione, the 16,21 - diacetate ester thereof, and the 16α,17α-iso-propylidene thereof.

The enhanced anti-inflammatory activity of the preferred compounds of this invention, i.e. such as the aforementioned 6-azido-4,6-bis-dehydropregnanes oxygenated at C–11, C–17, and C–21, are demonstrated by pharmacological tests in animals. Thus, for example, 6-azido-6-dehydrocortisone 21-acetate, when tested for anti-inflammatory activity by the well known systemic pouch test, exhibits anti-inflammatory activity greater than 1.5 times that of prednisolone acetate thus demonstrating 6-azido-6-dehydrocortisone 21-acetate about 15 times more active as an anti-inflammatory agent in the systemic pouch test than the corresponding 6-unsubstituted analog, i.e. 6-dehydrocortisone 21-acetate.

The 6-azido-9α,11β-dihalogeno-4,6-pregnadiene-17α,21-bis-oxygenated compounds of the pharmacologically active composition-of-matter aspect of our invention, i.e. 17α,21-bis-oxygenated compounds of Formula I (especially the 17-mono- and 17,21-dilower alkanoate esters thereof) wherein X and Y are halogen, (preferably those wherein the C–11 halogen (Y) is at least as electronegative as the C–9 halogen (X)), also possess superior anti-inflammatory activity being useful as topical anti-inflammatory agents. Particularly valuable 6-azido-9α,11β-dihalogeno-21-oxygenated-4,6-pregnadiene-3,20 - diones of our invention include compounds such as:

6-azido-9α,11β-dichloro-4,6 - pregnadiene - 17α,21 - diol-3,20-dione, the 21 acetate thereof, the 17-mono-valerate of the 17α,21-di-propionate thereof, and the 17,21-iso-propylidene derivative thereof, 6-azido-9α,11β-dichloro-16α-hydroxy - 4,6 - pregnadiene-17α,21-diol-3,20-dione, the 16,21-diacetate thereof, and the 16α,17α-iso-propylidene 21-acetate thereof, 6-azido-9α,11β-dichloro-16α-methyl - 4,6 - pregnadiene-17α,21-diol-3,20-dione, the 17-propionate and 17,21-dipropionate esters thereof, 6-azido-9α,11β-dichloro-16β - methyl - 4,6 - pregnadiene-17α,21-diol-3,20-dione, the 17-propionate and 17,21-dipropionate esters thereof, and 6-azido-9α,11β-dichloro-16-methylene - 4,6 - pregnadiene-17α,21-diol-3,20-dione.

In addition to the preferred 6-dehydro analogs of the 11-substituted-17,21-oxygenated-4-pregnene-3,20 - diones of Formula I listed hereinabove, our invention also includes 6-azido-6,7-dihydro-4-pregnenes, 6-azido-1,4-pregnadienes and 6-azido-1,4,6-pregnatrienes of Formula I having glucocorticoid properties. Typical 6-azido-21-oxygenated-4-pregnene-3,20-diones are compounds such as:

6α-azidocortisone (i.e. 6α-azido-4-pregnene-17α,21-diol-3,11,20-trione, a compound of Formula I wherein X and W are hydrogen, Y is oxygen, Q and Z are hydroxy), the 9α-fluoro analog thereof, and their 21-acetates, 6α-azidohydrocortisone (6α-azido-4-pregnene-11β,17α,21-triol-3,20,-dione), the 9α-fluoro analog thereof, and the 21-acetates of the foregoing, and 6α - azido - 9α - fluoro - 16α - methyl - 4 - pregnene - 11β, 17α,21-triol-3,20-dione, the 16β-methyl epimer thereof, and the 21-acetates of the foregoing.

Similarly, typical 6-azido-1,4-pregnadiene-3,20-diones of Formula I include compounds such as:

6α - azido - 1,4 - pregnadiene - 17α,21 - diol - 3,11,20-trione, the 21-acetate and the 17α,21-acetonide thereof, and their 9α-fluoro derivatives;

6α - azido - 1,4 - pregnadiene - 11β,17α,21 - triol - 3,20-dione, the 9α-fluoro analog thereof, and their 21-acetate esters;

6α - azido - 16α - methyl - 1,4 - pregnadiene - 17α,21 - diol-3,11,20-trione, the 9α-fluoro analog thereof, and their 21-acetate esters as well as their 17-valerate and 17,21-dipropionate esters;

6α - azido - 16α - methyl - 1,4 - pregnadiene - 11β,17α,21-triol-3,20-dione, the 9α-fluoro derivative thereof, and their 21-acetate esters as well as their 17-valerate and 17,21-dipropionate esters;

6α - azido - 16β - methyl - 1,4 - pregnadiene - 17α,21 - diol-3,11,20-trione, the 9α-fluoro derivative thereof and their 21-acetate esters as well as their 17-valerate and 17,21-dipropionate esters;

6α - azido - 16β - methyl - 1,4 - pregnadiene - 11β,17α,21-triol-3,20-dione, the 9α-fluoro derivative thereof, and their 21-acetate esters as well as their 17-valerate and 17,21-dipropionate esters;

6α - azido - 16 - methylene - 1,4 - pregnadiene - 17α,21-diol-3,11,20-trione, the 9α-fluoro derivative thereof, and their 21-acetate esters as well as their 17-valerate and 17,21-dipropionate esters;

6α - azido - 16 - methylene - 1,4 - pregnadiene-11β,17α,21-triol-3,20-dione, the 9α-fluoro derivatives thereof, and their 21-acetate esters and their 17-valerate and 17,21-dipropionate esters, and the 17,21-acetonide thereof;

6α - azido - 16α - hydroxy - 1,4-pregnadiene - 17α,21-diol-3,11,20-trione, the 9α-fluoro derivative thereof, their 16α,21-diacetate esters, and the 16α,17α-acetonide derivatives of the foregoing;

6α - azido - 16α - hydroxy - 1,4 - pregnadiene - 11β,17α,21-triol-3,20-dione, the 9α-fluoro derivatives thereof, their 16α,21-diacetate esters and their 16α,17α-acetonide derivatives; and 6α - azido - 9α,11β - dichloro - 1,4 - pregnadiene - 17α,21-diol-3,20-dione, the 17-valerate, the 21-acetate, and the 17,21-dipropionate esters thereof;

6α - azido - 9α,11β - dichloro - 16α - hydroxy - 1,4 - pregnadiene-17α,21-diol-3,20-dione and the 16α,17α-acetonides and the 16α,21-diacetate esters thereof.

Additionally, typical 6-azido-1,4,6-pregnatriene-3,20-diones of Formula I include compounds such as:

6 - azido - 1,4,6 - pregnatriene - 17α,21 - diol - 3,11,20-trione, the 9α-fluoro analog thereof and their 21-acetate esters;

6 - azido - 1,4,6 - pregnatriene - 11β,17α,21 - triol - 3,20-dione, the 9α-fluoro analog thereof, and the 21-acetate esters of the foregoing;

6 - azido - 16(α or β) - methyl - 1,4,6 - pregnatriene-17α, 21-diol-3,11,20-trione, the 9α-fluoro analog thereof, and the 21-acetate; 17-valerate; 17,21-dipropionate and 17,21-dibutyrate esters thereof;

6-azido-16(α or β)-methyl-1,4,6-pregnatriene-11β,17α,21-triol-3,20-dione, the 9α-fluoro analog thereof, and the 21-acetate; 17-valerate; 17,21-dipropionate and 17,21-dibutyrate esters thereof;

6 - azido - 16-methylene-1,4,6-pregnatriene-17α,21-diol-3,11,20-trione, the 9α-fluoro analog thereof, and the 21-acetate; 17-valerate; 17,21-dipropionate and 17,21-dibutyrate esters thereof; and 6-azido-16-methylene-1,4,6-pregnatriene-11β,17α,21-triol-3,20-dione, the 9α-fluoro analog thereof, and the 21-acetate; 17-valerate; 17,21-dipropionate, and 17,21-dibutyrate esters thereof.

In general, the pharmacologically active 6-azido-21-oxygenated-4-pregnene-3,20-diones of this invention as defined by Formula I have an activity similar to that of the corresponding 6-unsubstituted analog and may be administered in similar pharmaceutical forms and for the same indications for which the corresponding 6-unsubstituted-21 - oxygenated-4-pregnene-3,20-diones would be applicable, the total daily dosage depending upon the nature and severity of the inflammation being treated, the age and size of the patient, and the specific activity of the 6-azidocorticoid being administered. When administering preferred compounds of our invention, i.e. 6-azido-6-dehydro-4-pregnenes of Formula I, particularly the 11-oxygenated derivatives thereof, the therapeutic dosages advantageously will generally be lower than those required when administering the corresponding 6-unsubstituted analogs. Thus, for example, 6-azido-4,6-pregnadiene-17α, 21-diol-3,11,20-trione, esters, and alkylidenedioxy derivatives thereof, possess anti-inflammatory activity similar to that exhibited by prednisolone and may be administered orally in the form of tablets, capsules, elixirs, and the like for all inflammatory disorders, particularly arthritis, rheumatism and the like; intravenously in aqueous solution as the 21 - hemisuccinate or 21-phosphate ester for the treatment of shock; intramuscularly for long-term systemic activity or intra-articularly for long-term local activity with minimal systemic effects in aqueous suspension as the 17,21-dilower alkanoate esters, e.g. 17,21-dipropionate, and 17,21- di-butyrate; or topically in creams, lotions or ointments as the 17-mono lower alkanoate (e.g. 17-valerate) or as the 17,21-diesters (e.g. 17,21-di-propionate in the treamtent of contact and allergic dermatitis and psoriasis; or in the form of ophthalmic suspensions or nasal sprays. In each instance, the pharmaceutical dosage forms are prepared according to procedures well known in the art and may contain other active ingredients, e.g. neomycin sulfate in creams for topical use.

A species of the 6-azido-21-oxygenated-4-pregnene-3, 20-diones of our invention which are valuable mainly as intermediates are the 21-hydrocarbon-sulfonate esters of the 6-dehydro analogs of Formula I, i.e., compounds defined by following Formula II:

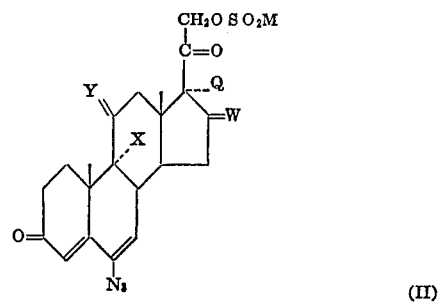

(II)

wherein M is a hydrocarbon radical having up to seven carbon atoms; and Q, W, X, and Y are as defined in Formula I hereinabove. The 21-hydrocarbonsulfonate ester intermediates of Formula II include the 21-methanesulfonate esters, the 21-ethanesulfonate esters, the 21-benzenesulfonate esters and the 21-p-toluenesulfonate esters of the 21-hydroxy-6-azido-4,6-pregnadienes defined by Formula I. They are prepared from the corresponding 21-hydroxy precursor utilizing known methods such as that wherein the steroidal 21-alcohol (e.g. 6-azido-6-dehydrocortisone) is treated with a hydrocarbonsulfonyl chloride (e.g. methanesulfonyl chloride) in pyridine at low temperatures whereby is formed the corresponding steroidal 21-hydrocarbonsulfonate (e.g. 6-azido-6-dehydrocortisone 21-methanesulfonate). The hydrocarbonsulfonate esters of Formula II are useful intermediates in the preparation of the 21-phosphate esters of Formula I utilizing procedures analogous to those known in the art. Thus, a 6-azido-4,6-pregnadiene-21-hydrocarbonsulfonate of Formula II (e.g. 6-azido-6-dehydrocortisone 21-methanesulfonate) upon treatment with sodium iodide in acetone is converted to the corresponding 21-iodo derivative (e.g. 6-azido-21-iodo - 4,6 - pregnadiene-17α-ol-3,11,20-trione) which upon treatment with phosphoric acid in methanol yields a 21-phosphate ester of Formula II (e.g. 6-azido-6-dehydrocortisone 21-phosphate). Because of their solubility characteristics, the 21-phosphate esters of 6-azidocorticoids of Formula I are particularly valuable for administration via the oral route and the intravenous route as aqueous solutions of their salts.

In addition to the foregoing, the 21-methanesulfonate esters of Formula II may be used as intermediates in preparing the corresponding 21-unsubstituted steroids since, after conversion thereof of the 21-iodopregnane as discussed hereinabove, the resulting 6-azido-21-iodo-4,6-pregnadiene (e.g. 6-azido-21-iodo-4,6-pregnadiene-17α-ol-3,11,20-trione) may be reduced by known methods such as with sodium bisulfite in dioxane to obtain the corresponding 6-azido-progesterone (e.g. 6-azido-4,6-pregnadiene-17α-ol-3,11,20-trione).

GENERAL DESCRIPTION OF 6-AZIDO-7-OXYGENATED COMPOSITION-OF-MATTER ASPECT OF THE INVENTION

The physical embodiments of another composition-of-matter aspect of this invention include novel 6-azido-7-hydroxypregnanes and 7-esters thereof useful as intermediates in preparing the preferred 6-azido-4,6-pregnadienes of our invention, some of which also have cortical activity. Among the compounds of this invention are members selected from the group consisting of 6β-azido-7α- oxygenated-4-pregnene-3,20-diones of following Formula III and the 1-dehydro analogs thereof:

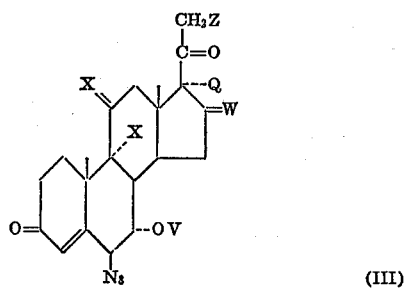

(III)

wherein

V is a member selected from the group consisting of hydrogen and an acyl radical of an acid selected from the group consisting of a hydrocarbon carboxylic acid having up to eight carbon atoms, and a hydrocarbonsulfonic acid having up to 7 carbon atoms;

X is a member selected from the group consisting of hydrogen and a halogen having an atomic weight less than 100;

Y is a member selected from the group consisting of hydrogen, oxygen, (H,βOH), (H,β halogen of atomic weight less than 100) provided X is halogen, (H,αOV') provided X is hydrogen, V' being a member selected from the group consisting of hydrogen and an acyl radical of a hydrocarbon sulfonic acid having up to 7 carbon atoms, and Y and X taken together are members selected from the group consisting of a 9(11)-dehydro bond and a 9β,11β-epoxy group;

And wherein Q, W, and Z are as defined hereinabove for Formula I.

The acyl radicals contemplated as included within the definition of V in Formula III are those derived from hydrocarbon carboxylic acids having up to 8 carbon atoms including lower alkanoic acids exemplified by formic, acetic, propionic, trimethylacetic, butyric, iso-butyric, tert.-butyric, valeric, iso-valeric, caproic, and caprylic; substituted alkanoic acids such as trifluoroacetic and β-chloropropionic acids, aromatic and substituted aromatic acids such as benzoic, toluic, p-chlorobenzoic, and hydrocarbonsulfonic acids such as methanesulfonic acid, ethanesulfonic acid, benzenesulfonic acid, and p-toluenesulfonic acid.

The 1,2-dihydro-compounds of Formula III are useful mainly as intermediates in preparing the preferred 6-azido-4,6-pregnadienes of our invention via two of the process aspects of our invention. In one, a 6α,7α-oxido-4-pregnene upon treatment with an alkali metal azide is converted to a 6β-azido-7α-hydroxy-4-pregnene-3,20-dione of Formula III which, in turn, is esterified at C-7, and the resulting 6β-azido - 7α - acyloxy-4-pregnene-3,20-dione of Formula III is treated with an alkali metal ammonium fluoride to obtain a pharmacologically active 6-azido-4,6-pregnadiene-3,20-dione of Formula I. In another process, a 6β-azido-7α-hydroxy-4-pregnene or 6β-azido-7α-acyloxy-4-pregnene of Formula III is treated with concentrated hydrochloric acid in acetic acid-dioxane to yield a 6-azido-4,6-pregnadiene-3,20-dione of our invention.

The physical embodiments of the 6β-azido-7α-hydroxy-4-pregnene-3,20-dione and 7α-esters thereof of Formula III, their method of preparation and use as intermediates are described in detail in Examples 1–18, the 1-dehydro analogs of Formula III being prepared in similar manner. The requisite starting 6α,7α-oxido-21-oxygenated-4-pregnene-3,20-diones and 1-dehydro analogs are either known compounds or may be prepared via known procedures such as those described in the examples. A convenient method for their preparation comprises treating a 6, 7-unsubstituted-21-oxygenated - 4,6 - pregnadiene - 3,20-dione or 1-dehydro analog thereof with a peracid in a nonreactive organic solvent, e.g. with reagent-solvent combinations such as meta-chloroperbenzoic acid in acetone, meta-chloroperbenzoic acid in methylene chloride/tert.-butanol, or, preferably with mono-perphthalic acid in chloroform.

Typical intermediates of Formula III include compounds such as 6β-azido-7α-hydroxy-4-pregnene-17α,21-diol-3,11,20-trione 21-acetate, the 7-acetate ester thereof, the 7-methanesulfonate ester thereof, and the 7-p-toluenesulfonate ester thereof;

6β-azido-7α-hydroxy-4-pregnene-11β,17α-triol-3,20-dione 21-acetate and the 7-acetate ester thereof;
6β-azido-7α-acetoxy-9α,11β-dichloro-4-pregnene-17α,21-diol-3,20-dione 21-acetate,
6β-azido-7α-hydroxy-16β-methyl-4-pregnene-17α,21-diol-3,11,20 - trione 21 - acetate and the 7-acetate ester thereof;
6β-azido-7α-hydroxy-16-methylene-4-pregnene-17α,21-diol-3,11,20-trione 21-acetate and the 7-acetate ester thereof;
6β-azido-7α-hydroxy-4-pregnene-11α,17α,21-triol-3,20-dione 11-p-toluenesulfonate 21-acetate and the 7-acetate ester thereof;
6β-azido-7α-acetoxy-9β,11β-oxido-4-pregnene-17α,21-diol-3,20-dione 21-acetate;
6β-azido-7α-acetoxy-4,9(11)-pregnadiene-17α,21-diol-3,20-dione 21-acetate.

In addition to the foregoing, the 4-dehydro- and 1,4-bis-dehydro-steroids of Formula III possess corticoid activity except those wherein Y is (H,αOV') or wherein X and Y together comprise a double bond or a 9β,11β-epoxy group, all of which are useful mainly as intermediates. The compounds of Formula III are therefore useful for the treatment of conditions requiring corticoid therapy in a manner similar to that described hereinabove for the corresponding 6-azido-21-oxygenated-4,6-pregnadiene-3,20-diones of Formula I. Of the 6β-azido-7α-hydroxy-4-pregnenes and 1,4-pregnadienes of Formula III, those preferred as corticoid therapeutic agents are those substituted at C–11 by a halogen, oxygen, or beta-hydroxyl which possess anti-inflammatory activity as demonstrated by tests in animals. Thus, when evaluated by the known systemic rat pouch test, 6β-azido-7α-hydroxycortisone 21-acetate (compound of Formula III wherein X, V and W are hydrogen, Y is oxygen, Q is hydroxyl and Z is acetoxy) demonstrates an anti-inflammatory activity about 2.5 times greater than that of cortisone; similarly, 6β-azido-7α-hydroxy-prednisone 21-acetate (a 1-dehydro analog of Formula III wherein V, X and W are hydrogen, Y is oxygen, and Z is acetoxy) demonstrates over about 5 times the anti-inflammatory activity of cortisone.

GENERAL DESCRIPTION OF ONE PROCESS ASPECT OF PREPARATION OF 6-AZIDO-4,6-PREGNADIENES

The preferred 6-azido-4,6-pregnadiene-3,20-diones of our invention, i.e. the 6-dehydro analogs of Formula I, are conveniently prepared from the corresponding 6α,7α-epoxy-4-pregnene derivatives wherein the 21 - hydroxy group is preferably protected by an ester group or by formation of a 17α,21-alkylidenedioxy derivative (e.g. 6α,7α-oxidocortisone 21-acetate and 6α,7α-oxido-17α,21-iso-propylidenedioxy-4-pregnene - 3,20 - dione, respectively) via the process aspect of our invention shown diagrammatically below in Chart A wherein substituents Q, W, X, Y, and Z in structural Formulae A, B, and C are as defined hereinabove for Formula I and wherein I' is a 6-dehydro analog of Formula I:

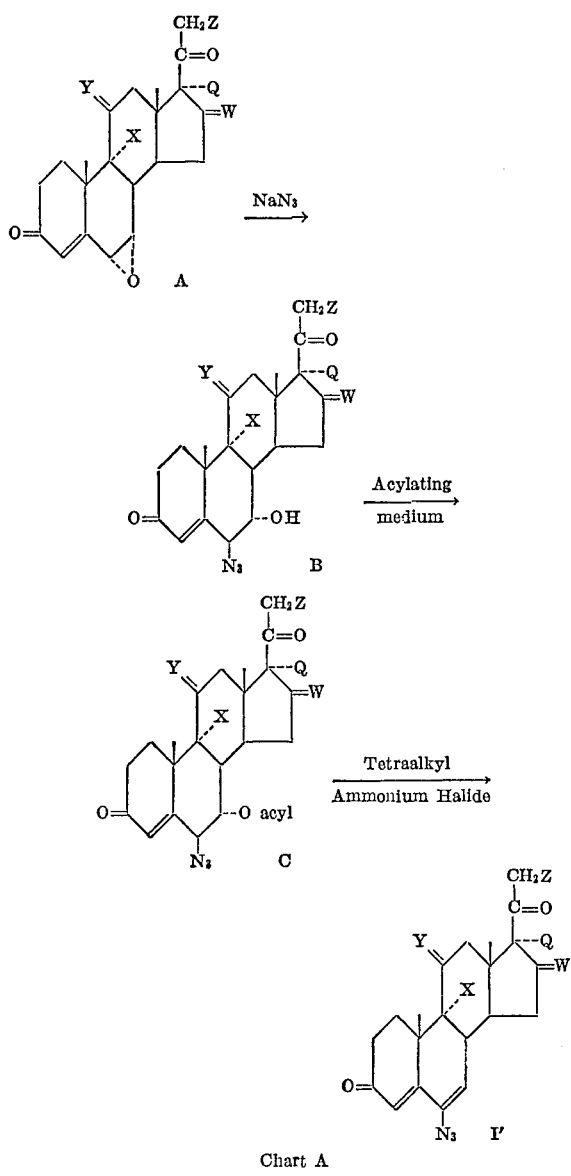

Chart A

According to our process, as shown diagrammatically hereinabove, a 6α,7α-oxido-9α-X-11β-Y-16-W-17α-Q-21-Z-4-pregnene-3,20-dione (Formula A) (e.g. 6α,7α-oxido-4-pregnene-17α,21-diol - 3,11,20 - trione 21-acetate) is treated with an alkali metal azide (e.g. sodium azide) in a non-reactive, organic solvent, preferably a solvent mixture in which water is present (e.g. aqueous methanol, aqueous methanol/dioxane, aqueous dioxane, aqueous tetrahydrofuran, and the like) under mild conditions in neutral, or slightly basic or slightly acidic media whereby the epoxy function is split and there is introduced into the molecule a 6β-azido-7α-hydroxy system to form a novel intermediate of our invention, i.e. a 6β-azido-7α-hydroxy-4-pregnene of Formula B (e.g. 6β-azido-7α-hydroxy-4-pregnene-17α,21-diol-3,11,20-trione 21-acetate.

The 7α-hydroxy function in the thereby formed 6β-azido-7α-hydroxy-9α-X-11β-Y-16-W-17α-Q-21-Z-4 - pregnene-3,20-dione (Formula B) (e.g. 6β-azido-7α-hydroxy-4-pregnene-17α,21-diol-3,11,20-trione 21-acetate) is then esterified utilizing known esterification procedures (e.g. that utilizing acetic anhydride in pyridine). Treatment of the resulting 6β-azido-7α-acyloxy-9α-X-11β-Y-16-W-17α-Q-21-Z-4-pregnene-3,20-dione (Formula C), a novel intermediate of our invention (e.g. 6β-azido-7α-acetoxy-4-pregnene-17α,21-diol-3,20-dione 21-acetate) with a tetraalkylammonium halide (e.g. tetramethylammonium fluoride) in an aprotic solvent, preferably acetonitrile or dimethylformamide, yields a pharmacologically active 6-azido-9α-X-11β-Y-16-W-17α-Q-21-Z-4,6-pregnadiene - 3,20 - dione of our invention (Compound I'), e.g. 6-azido-4,6-pregnadiene-17α,21-diol-3,11,20-trione 21-acetate.

Our process provides a convenient, novel method of converting, in good yields, a 6α,7α-epoxy-4-pregnene to the novel, pharmacologically active 6-azido-4,6-pregnadienes of our invention. Heretofore, it has been unknown to deacetoxylate a 6-substituted-7α-acyloxy-4-pregnene with a tetraalkylammonium halide to obtain a 6-substituted-4,6-pregnadiene. We have found, however, that when a 6β-azido-7α-acyloxy-4-pregnene-3,20-dione of Formula III (or Formula C hereinabove) is treated with a tetraalkylammonium halide (e.g. tetramethylammonium fluoride) in an aprotic solvent according to a process aspect of our invention, there is formed, in good yield, a 6-azido-4,6-pregnadiene of Formula I'.

In carrying out the first step of the aforedescribed process whereby a 6α,7α-oxido-21-oxygenated-4-pregnene-3,20-dione of Formula A is converted to a 6β-azido-7α-hydroxy-21-oxygenated-4-pregnene-3,20-dione of Formula B, the alkali metal azide reagent of choice is sodium azide, although there may be used other alkali metal azides such as potassium azide, lithium azide; alternatively, there may also be used quaternary ammonium azides such as tetrabutylammonium azide.

The solvents used in the epoxide splitting step may be any non-reactive, organic solvent in which the steroidal starting compound and the azide reagent are soluble. By non-reactive, organic solvent is meant an organic solvent which will not react with an alkali metal azide or the steroid substrate under the conditions of the reaction so as to cause transformations which will result in the occurrence of competing side reactions. Included among the non-reactive organic solvent contemplated for the epoxide opening are hydroxylated hydrocarbons (e.g. methanol and tertiary butanol), cyclic ethers (e.g. dioxane) and N,N-dialkyl amides (e.g. dimethylformamide).

The epoxide-splitting step is carried out under mild conditions, usually at temperatures ranging from about 0° C. to about 55° C. and preferably at room temperature, with the reaction media usually being maintained at about neutrality (e.g. utilizing dimethylformamide and sodium azide) or slightly basic (e.g. utilizing methanol with sodium azide) or slightly acidic (e.g. utilizing dioxane and methanol as solvent together with a small quantity of aqueous lower alkanoic acid or, alternatively of aqueous boric acid). When carrying out this step on a compound of Formula A having primary or secondary ester groups, e.g. compounds wherein Z is acyloxy and/or W is (H,α-acyloxy), in order to minimize hydrolysis of the ester function, the epoxide opening step is advantageously carried out in the presence of acid, preferably an acid having the same acyl function as that in the ester groups in the starting steroid A. Thus, 6α,7α-oxidocortisone 21-acetate upon treatment with sodium azide in aqueous methanol/dioxane to which a few milliliters of acetic acid are added yields a 21-acetate of Formula B, e.g. 6β-azido-7α-hydroxycortisone 21-acetate. Alternatively, when carrying out this step on a compound of Formula A having an alkylidenedioxy function (i.e. 17,21-alkylidene derivatives of compounds wherein Q and E are hydroxy and 16,21-alkylidene derivatives of compounds wherein Q and W are hydroxy) in order to minimize hydrolysis of the alkylidenedioxy function, the epoxide opening step is advantageously carried out under essentially neutral or slightly basic conditions. Thus, 6α,7α - oxido-17α,21-isopropylidenedioxy-4-pregnene-3,11,20-trione (compound of Formula A) upon treatment with sodium azide in aqueous methanol/dioxane yields a 17α, 21-alkylidenedioxy derivative of Formula B, 6β-azido-7α-hydroxy-17,21-isopropylidenedioxy-4-pregnene - 3,11,20 - trione.

In a preferred procedure of carrying out the epoxide opening step of our processes for preparing 6-azido-4,6-pregnadienes there is usually added to a solution of the 6α,7α-oxido-21-oxygenated-4-pregnene-3,20-dione (A) in a non-reactive solvent or solvent mixture (e.g. methanol-dioxane mixture) at least one mole of alkali metal azide per mole of steroid (preferably 10 to 12 moles of azide per mole of steroid) in a minimum of aqueous lower alkanoic acid, e.g. acetic acid (usually about 100 ml. water and about 1 ml. acetic acid per mole alkali metal azide) and the reaction mixture is allowed to stand at room temperature until all the starting material is transferred as determined by thin layer chromatography (usually about 17 hours). The desired 6β-azido-7α-hydroxy thereby formed (B) is then conveniently isolated by pouring the reaction mixture into water, extracting the aqueous mixture with an organic solvent, evaporating the combined organic extracts to a residue comprising a 6β-azido - 7α - hydroxy-21-oxygenated-4-pregnene-3,20-dione of Formula B (also a compound of Formula III). Purification is effected utilizing known techniques including crystallization and thick layer chromatography.

The esterification step of our process (i.e. B→C) is usually carried out in basic media, under relatively mild conditions known to esterify secondary hydroxyl groups. Preferably, the esterification is carried out at room temperature in pyridine utilizing large molar excesses of acylating agents which may be an acid halide of an aryl carboxylic acid (e.g. benzoyl chloride) or of a hydrocarbon-sulfonic acid (e.g. p-toluenesulfonyl chloride or methanesulfonyl chloride) or an acid anhydride of a lower alkanoic acid having up to eight carbon atoms. In a preferred procedure for carrying out this step whereby a 7α-hydroxy function is esterified, whenever starting steroid (B), already possesses an ester function, the acylating agent used is preferably one having the same acyl radical as that in the starting steroid (B) (e.g. acetic anhydride when the starting steroid (B) is 6β-azido-7α-hydroxy-4-pregnene-17α,21-diol-3,11,20-triene 21-acetate).

The last step of our process whereby a 6β-azido-7α-acyloxy-21-oxygenated-4-pregnene-3,20-dione (C) upon treatment with a tetraalkylammonium halide is converted to a 6β-azido-21-oxygenated-4,6-pregnadiene-3,20-dione (I), is usually carried out in an aprotic solvent at temperatures in the range of from about 0° C. to about 80° C., preferably between 20° C. to about 60° C.

Although anhydrous conditions are usually employed for this last deacylating step of our process, water may be present in small amounts, and there will be formed the desired 6-azido-4,6-pregnadiene.

Thus, treatment of 6β-azido-7α-acetoxy-4-pregnene-17α,21-diol-3,11,20-trione 21-acetate in acetonitrile with tetramethylammonium fluoride pentahydrate yields 6-azido-4,6-pregnadiene - 17α,21-diol-3,11,20-trione 21-acetate in good yield.

Aprotic solvents suitable for use in our process include dimethylsulfoxide, dimethylacetamide, dioxane, tetrahydrofuran, and preferably acetonitrile or dimethylformamide.

Tetraalkylammonium halides are known in the art. In our process, we have found it most convenient to use tetramethylammonium chloride or, preferably, tetramethylammonium fluoride, since they are commercially available and excellent product yields are obtained thereby. When utilizing the commercially available tetramethylammonium fluoride pentahydrate as reagent, usually the water of hydration is removed therefrom by azeotropic distillation with acetonitrile although the reaction will proceed when the pentahydrate is used as reagent. When preparing the anhydrous form of the tetramethylammonium fluoride reagent, the azeotropic distillation is continued until the reagent is a solid at 50° C., at which point it is most suitable for use as a deacyloxylating reagent to convert a 6β-azido-7α-acyloxy-21-oxygenated-4-pregnene-3,20-dione to a 6-azido-6,7-unsubstituted-21-oxygenated-4,6-pregnadiene-3,20-dione (I) of our invention.

The tetraalkylammonium halide reagents have limited solubility in the aprotic solvents utilized in this process; therefore, it is preferable to stir the reaction mixture when deacyloxylating at C–7 (6). The reaction will proceed without stirring, however, with the tetraalkylammonium halide dissolving as the reaction proceeds.

Generally when deacyloxylating a 6β-azido-7α-acyloxy-21-oxygenated-4-pregnene-3,20-dione of Formula C, the 6β-azido-7α-acyloxy intermediate (C) is added (either in the solid state or in solution) to a solution or suspension of tetraalkylammonium halide (present in quantities ranging from 1.5 moles to 5 moles per mole of steroid) in an aprotic solvent (of which 1 ml. per 10 mgm. of reagent is generally used). The reaction is stirred or left standing in temperatures ranging between 0° C. to 80° C. until the deacyloxylation at C–6 (7) is completed as evidenced by thin layer chromatography or by spectroscopic evaluation. (Reaction times usually range from 10 minutes to 48 hours.) The resulting 6-azido-21-oxygenated-4,6-pregnadiene-3,20-dione of Formula I' is isolated utilizing known techniques. Usually, the solvent is partially or totally removed in vacuo, then an organic solvent (e.g. methylene chloride, chloroform, ethyl acetate, and the like) is added, the solution poured into water, the layers separated, the organic layer washed with dilute aqueous base (e.g. sodium bicarbonate), dried and evaporated to a residue comprising the desired 6-azido-9α-X-11-Y-16-W-17α-Q-21-oxygenated-4,6-pregnadiene-3,20-dione of Formula I'. Purification of this product is effected by known techniques including chromatography and recrystallization methods.

In our process whereby a 6α,7α-oxido-21-oxygenated-4-pregnene-3,20-dione is converted via three steps to a 6-azido-21-oxygenated-4,6-pregnadiene-3,20-dione, the necessary 6α,7α - oxido-21-oxygenated-4-pregnene-3,20-dione starting compounds (A) are conveniently prepared according to known procedures from the corresponding 6,7-unsubstituted-21-oxygenated-4,6-pregnadiene - 3,20-dione such as by reaction with a peracid in a non-reactive organic solvent, e.g. with reagent-solvent combinations such as meta-chloroperbenzoic acid in acetone, meta-chloroperbenzoic acid in methylene chloride/tert.-butanol, or with mono-perphthalic acid in chloroform.

The 6,7-unsubstituted-21-oxygenated - 4,6-pregnadiene-3,20-dione precursors of the starting 6α,7α-oxido intermediates (A) are a known class of compounds conveniently derived from the corresponding 6,7-dihydro analogs by procedures known to effect dehydrogenation between C–6 and C–7, such as those utilizing chloranil or 2,3-dichloro-5,6-dicyanobenzoquinone (DDQ). When the starting steroid has a 16-alkyl substituent, e.g. 16β-methyl-4-pregnene-17α,21-diol-3,11,20-trione 21-acetate, in order to minimize the possibility of rearrangement reactions, introduction of the 6-dehydro bond is preferentially effected by the use of 2,3-dichloro-5,6-dicyanobenzoquinone in the presence of acid (e.g. DDQ in ethyl acetate and acetic acid).

When preparing the preferred 6-azido-21-oxygenated-4,6-bis-dehydropregnanes of our invention (i.e. the 6-dehydro analogs of Formula I) by the above described process, it is usually preferable to have present in the starting 6α,7α- epoxypregnane (A) all the substituents desired in the final 6-azido-4, 6-pregnadiene product, I.

Alternatively, substituents such as those at C–9 and C–11 may be introduced into the molecule during the process, preferably after the formation of the 6β-azido-7α-acyloxypregnane intermediate (C). Thus, to prepare a 6-azido-9α,11β-dihalogeno-4,6-pregnadiene of Formula I, e.g. 6-azido-9α,11β-dichloro-4,6-pregnadiene-17α,21-diol-3,20-dione 21-acetate, one may utilize as starting compound the known 6α,7α-oxido-11α-tosyloxy-4-pregnene- 17α,21-diol-3,20-dione 21-acetate which may be converted via the above process to the corresponding 6β-azido-7α-hydroxy-4-pregnene and thence esterified at C–7 to form 6β-azido-7α-acetoxy-11α-tosyloxy-4-pregnene-17α,21-diol-3,20-dione. Desulfonyloxylation at C–11 according to known procedures such as that utilizing sodium acetate in acetic acid yields the corresponding 9(11)-dehydropregnane, i.e. 6β-azido-7α-acetoxy-4,9(11)-pregnadiene-17α,21-diol-3,20-dione 21-acetate, a compound useful as an intermediate in preparing 9α-halogeno-11β-hydroxy derivatives as well as 9α,11β-dihalogeno compounds of Formula I.

When the 11α-tosylate precursor is not readily available, the 9(11)-bond may be introduced into the molecule, utilizing known procedures preferably before formation of the 6-azido-6-dehydro-system and after the epoxidation at C–6 and 7, usually after preparation of the 6β-azido-7α-acetoxypregnane intermediate. Thus, an 11-hydroxyl group is introduced microbiologically with the aid of microorganisms such as *Curvularia lunata* (N.R.R.L. 2380) or *Rhizopus nigricans* (A.T.C.C. 6227b). When *Curvularia lunata* is employed, the 11β-hydroxy steroid produced is dehydrated by a reagent such as methanesulfonyl chloride in the presence of pyridine or phosphorous oxychloride in pyridine or N-bromoacetamide and sulfur dioxide in pyridine to give the 9(11)-dehydro intermediates. Alternatively, the action of *Rhizopus nigricans* on a corticoid such as 16α-methyl-4-pregnene-17α,21-diol-3,20-dione 21-acetate yields the 11α-hydroxy derivative, 16α - methyl-4-pregnene-11α,17α,21-triol-3,20-dione. After reacetylation at C–21, subsequent treatment with a sulfonyl chloride such as methanesulfonyl chloride yields the corresponding 11α-sulfonate, i.e. 11α-methanesulfonyloxy - 16α - methyl - 4 - pregnene - 17α,21-diol-3,20-dione 21-acetate. To minimize the possibility of competing side reactions, the first two steps in our process for introduction of the 6-azido-6-dehydro-system are carried out with the 11α-sulfonyloxy-derivative. Thus, treatment of 11α - methanesulfonyloxy - 16α - methyl-4-pregnene - 17α,21 - diol - 3,20 - dione 21-acetate with chloranil followed by epoxidation of the 6-dehydro analog thereby formed, i.e. 11α-methanesulfonyloxy-16α-methyl-4,6 - pregnadiene - 17α,21 - diol - 3,20 - dione 21-acetate, with mono-perphthalic acid, for example, yields 6α,7α-oxido - 11α - methanesulfonyloxy - 16α - methyl - 4-pregnene - 17α,21 - diol-3,20-dione 21-acetate which, upon treatment with sodium azide yields 6β-azido-7α-hydroxy-11α- methanesulfonyloxy - 16α - methyl - 4 - pregnene-17α,21-diol-3,20-dione 21-acetate. Esterification at C–7 utilizing acetic anhydride in pyridine yields 6β-azido-7α-acetoxy - 11α - methanesulfonyloxy - 16α - methyl-4-pregnene - 17α,21 - diol-3,20-dione 21-acetate. Introduction of the 9(11)-bond is conveniently carried out in the foregoing 11α-methanesulfonate by treatment with sodium acetate in acetic acid to yield 6β-azido-7α-acetoxy-16α - methyl-4,9(11)-pregnadiene-17α,21-diol-3,20-dione 21-acetate.

After formation of the 9(11)-dehydro intermediate, halogen groups may then be introduced at C–9 and C–11 of the 6β - azido - 7α - acetoxy-4,9(11)-pregnadiene-17α,21-diol-3,20-dione 21-acetate, e.g. to form a 9α,11β-dichloro derivative employing procedures well known in the art. For example, treatment of the aforenamed 9(11)-dehydropregnanes with chlorine in halogenated solvents such as methylene chloride will yield the 9α,11β-dichloro intermediates, 6β - azido - 7α-acetoxy-9α,11β-dichloro-4-pregnene - 17α,21-diol-3,20-dione 21-acetate, and the 16α-methyl homolog thereof which upon treatment with tetramethylammonium fluoride as described in Example 6B herein, will yield 6-azido-9α,11β-dichloro-4,6-pregnadiene - 17α,21 - diol - 3,20 - dione 21-acetate, a 6-dehydro compound of Formula I. If a 9α-bromo-11β-fluoro- or a 9α - chloro - 11β - fluoro-derivative is desired, the 6β-azido - 7α - acyloxy - 9(11) - dehydro precursor is treated with N-bromo-succinimide and hydrogen fluoride or N-chlorosuccinimide and hydrogen fluoride, respectively, to obtain the corresponding 9α,11β-dihalogeno derivative, i.e. 6β - azido - 7α-acetoxy-9α-bromo-11β-fluoro-4-pregnene - 17α,21 - diol - 3,20 - dione 21-acetate and 6β - azido - 7α - acetoxy - 9α - chloro-11β-fluoro-4-pregnene - 17α,21 - diol - 3,20 - dione 21-acetate, respectively, and the 16α - methyl homologs. Treatment of each of the foregoing 6β - azido - 7α-acetoxy intermediates with tetramethylammonium fluoride according to the above described process yields 6-azido-6-dehydro-9α,11β-dihalogeno derivatives of Formula I, e.g. 6-azido-9α-bromo - 11β - fluoro - 4,6-pregnadiene - 17α,21-diol-3,20-dione 21 - acetate and 6 - azido - 9α - chloro-11β-fluoro-4,6 - pregnadiene - 17α,21 - diol - 3,20 - dione 21-acetate, respectively, and their 16α-methyl homologs.

The 6β - azido - 7α - acetoxy-9(11)-dehydropregnanes are also useful in the preparation of the 9α-halogeno-11β-hydroxy derivatives of our invention. Thus, a 6β-azido-7α - acetoxypregnane (e.g. 6β - azido - 7α - acetoxy-4,9(11)-pregnadiene-17α,21-diol-3,20-dione 21-acetate) and the 16α-methyl homolog thereof upon treatment with N-bromoacetamide in aqueous dioxane in the presence of perchloric acid according to known procedures yields the corresponding 9α-bromo-11β-hydroxy derivative (e.g. 6β-azido - 7α - acetoxy - 9α - bromo-11β-hydroxy-4-pregnene-17α,21 - diol - 3,20 - dione 21-acetate and the 16α-methyl homolog thereof).

Other 9α - halogeno - 11β - hydroxy - 6β-azido-7α-acetoxy - 21 - oxygenated-pregnane intermediates, i.e. the 9α-chloro- and 9α-fluoro-, are obtained from the corresponding 9β,11β-oxido derivatives, e.g. 6β-azido-7α-acetoxy - 9β,11β-oxido-4-pregnene-17α,21-diol-3,20-dione 21-acetate which, in turn, are derived from the aforedescribed 9α - bromo - 11β - hydroxy intermediates, e.g. 6β - azido - 7α - acetoxy - 9α - bromo - 11β-hydroxy-4-pregnene - 17α,21 - diol - 3,20 - dione 21-acetate, by treatment with potassium acetate in ethanol or acetone. Addition of hydrogen chloride in chloroform, or of hydrogen fluoride in chloroform-tetrahydrofuran, to a 9β,11β-oxido pregnane intermediate, e.g. 6β - azido - 7α-acetoxy - 9β,11β-oxido-4-pregnene-17α,21-diol-3,20-dione 21-acetate, will yield the corresponding 9α-chloro-11β-hydroxy- or 9α-fluoro-11β-hydroxy-pregnane intermediates, respectively, e.g. 6β - azido - 7α-acetoxy-9α-chloro-4-pregnene - 11β,17α,21-triol-3,20-dione 21-acetate, and 6β-azido - 7α - acetoxy - 9α - fluoro-4-pregnene-11β,17α, 21-triol-3,20-dione 21-acetate.

By utilizing the above procedures it is obvious that one need but choose the appropriate 6β-azido-7α-acetoxy-9-(11)-dehydro-intermediate to obtain other 9α-halogeno-11β-hydroxy-6β-azido-7α-acetoxy-pregnane intermediates of our invention. The 6β-azido-7α-acyloxy-9α,11β-dihalogeno-pregnanes and the 6β-azido-7α-acyloxy-9α-halogeno-11β-hydroxy-pregnane intermediates prepared from the corresponding 6β-azido-7α-acyloxy-9(11) - dehydropregnanes as described hereinabove are then converted to the corresponding 6-azido-4,6-pregnadienes of our invention by treatment with a tetraalkylammonium halide in acetonitrile. Thus, each of the 6β-azido-7α-acetoxy-9α-bromo-4-pregnene-11β,17α,21-triol-3,20-dione 21-acetate, 6β-azido-7α-acetoxy-9α-chloro-4-pregnene - 11β,17α,21 - triol-3,20-dione 21-acetate and 6β-azido-7α-acetoxy-9α-fluoro-4,6-pregnadiene-11β,17α,21-triol - 3,20 - dione 21-acetate and the 16 (α and β)-methyl homologs thereof upon treatment with tetramethylammonium fluoride in acetonitrile yields the corresponding 6-azido-9α-halogeno-11β-hydroxy-4,6-pregnadiene- of our invention, e.g. 6-azido-9α-bromo-4,6-pregnadiene - 11β,17α,21 - triol-3,20-dione 21-acetate, 6-azido-9α-chloro-4,6-pregnadiene-11β,17α,21-triol-3,20-dione 21-acetate, and 6-azido-9α-fluoro-4,6-pregnadiene-11β,17α,21-triol-3,20-dione 21-acetate, respectively, and the 16(α and β)-methyl homologs thereof.

When the starting 6β-azido-7α-acetoxy-4-pregnane has a 9α-bromo-11β-hydroxy group, treatment with tetramethylammonium halide according to our process will cause the formation of a mixture of products including some 9β,11β-oxido-4,6-pregnadiene. Separation of the product mixture may be effected via chromatographic procedures. Thus, treatment of 6β-azido-7α-acetoxy-9α-bromo-11β-hydroxy-4-pregnene-17α,21-diol - 3,20 - dione 21-acetate with tetramethylammonium fluoride in acetonitrile yields a mixture of 6-azido-9α-bromo-11β-hydroxy-4,6-pregnadiene. 17α,21-diol-3,20-dione 21-acetate together with some 6-azido-9β,11β-oxido - 4,6 - pregnadiene-17α,21-diol-3,20-dione 21-acetate which, when separated on a thick layer preparative plate with silica gel yields mainly 6-azido-9α-bromo-11β-hydroxy - 4,6 - pregnadiene-17α,21-diol-3,20-dione 21-acetate.

The 9α-halogeno-11-keto-pregnanes of Formula I may be obtained from the 9α-halogeno-11β-hydroxypregnanes by oxidation of the 11-hydroxy function such as with chromic acid. Alternatively, the 6-azido-9α-halogeno-11-keto-4,6-pregnadienes may be obtained from the 6α,7α-oxido-4-pregnene-precursor according to the process described hereinabove. Thus, 6-azido-9α-fluoro-4,6-pregnadiene-17α,21-diol-3,11,20-trione 21-acetate is formed upon oxidation of 6-azido-9α-fluoro-4,6-pregnadiene-11β,17α,21-triol-3,20-dione 21-acetate with chromic acid. Alternatively, this 9α-fluoro-11-ketopregnane is derived from 6α,7α-oxido-9α-fluoro-4-pregnene-17α,21-diol-3,11,20 - trione 21-acetate which upon treatment with sodium azide in dilute acetic acid is converted to the corresponding 6β-azido-7α-hydroxy intermediate, i.e. 6β-azido-7α-hydroxy-9α-fluoro-4-pregnene-17α,21-diol - 3,11,20 - trione 21-acetate, which after esterification at C-7, such as with acetic anhydride in pyridine, followed by treatment of the thereby formed 7α-acetate ester with tetramethylammonium fluoride yields the 6-azido-9α-fluoro-11-keto - 4,6 - pregnadiene of Formula I, i.e. 6-azido-9α-fluoro-4,6-pregnadiene-17α,21-diol-3,11,20-trione 21-acetate.

GENERAL DESCRIPTION OF ANOTHER PROCESS ASPECT FOR PREPARATION OF 6-AZIDO-4,6-PREGNADIENES

The preferred compounds of this invention, i.e. the 6-azido-21-oxygenated-4,6-pregnadiene - 3,20 - diones of Formula I are also prepared from the 6β-azido-7α-hydroxy-4-pregnene or the 6β-azido-7α-acyloxy-4-pregnene intermediate of the first process aspect (Formulae B and C, Chart A hereinabove) (of which the 21-hydroxy group is preferably protected by an ester group or by formation of a 17α,21-alkylidenedioxy derivative) by reaction of said 6β-azido-7α-hydroxy-4-pregnene of Formula B or the 7α-ester thereof with concentrated hydrochloric acid in acetone or preferably, in a solvent mixture comprising a lower alkanoic acid (e.g. acetic acid) and dioxane.

In carrying out the physical embodiment of this process aspect, we have found that concentrated hydrochloric acid is necessary in order to dehydrate at C-6 and C-7, i.e. to convert the 6β-azido-7α-hydroxy pregnane or 6β-azido-7α-acyloxy pregnane to a 6-azido-6-dehydro pregnane. When other acids are employed such as p-toluenesulfonic acid or sulfuric acid, dehydration does not occur and the 6β-azido-7α-hydroxy or 6β-azido-7α-acyloxy starting compound (B) is recovered even after several days reaction time.

According to our process, a 6β-azido-7α-hydroxy-9α-X-11β-Y-16-W-17α-Q-21-Z-4-pregnene - 3,20 - dione (Formula B, Chart A) or a 7α-acyloxy thereof (Formula C, Chart A) is dissolved in either acetone or preferably a solvent mixture comprising a lower alkanoic acid (usually acetic acid) and dioxane to which concentrated hydrochloric acid is added. The reaction mixture is allowed to remain at room temperature until a thin layer chromatographic analysis of an aliquot of the reaction mixture indicates the absence of a 6β-azido-7α-hydroxy or a 6β-azido-7α-acyloxy intermediate. The reaction time is usually from 24 to 48 hours, although it may take several days to effect completed dehydration in some cases. The resulting 6-azido-4,6-pregnadiene-3,20-dione of Formula I is isolated from the reaction mixture using standard techniques usually by diluting the reaction mixture with a halogenated solvent (e.g. methylene chloride), washing the resulting organic solution with water and aqueous sodium bicarbonate solution, distilling the dried organic solution and purifying the residue via chromatographic techniques.

The 6β-azido - 7α - hydroxy-4-pregnene-3,20-diones of Formula B, and the 6β-azido-7α-acyloxy-4-pregnene-3,20-diones of Formula C (or III shown hereinabove), necessary intermediates in this process aspect, are prepared in the same manner as described hereinabove in the section relating to the first process aspect.

In carrying out the physical embodiment of this process aspect whereby a 6α,7α-oxido-4-pregnene-3,20-dione of Formula A is treated with an alkali metal azide in a non-reactive organic solvent and the thereby formed 6β-azido-7α-hydroxy-4-pregnene precursor (Formula A) desirably ought possess the substituents, (such as at C-9, 11, 16 and 17) which are desired in the 6-azido-4,6-pregnadiene product of Formula I produced thereby. When structural modifications of the pregnane molecule (such as at C-9 or 11) are contemplated, it is usually preferable to utilize as starting compound a 6β-azido-7α-acryloxy-4-pregnene of Formula III (or Formula C) hereinabove and, after carrying out any desired structural modifications on the 7α-acyloxy intermediate, converting the thereby modified steroid (e.g. a 6β-azido-7α-acyloxy-9α-X-11-Y-16-W-17α-Q-21-Z-4-pregnene-3,20-dione of Formula III) to the therapeutically active 6-azido-4,6-pregnadiene of Formula I by treatment thereof with concentrated hydrochloric acid or, preferably, with a tetraalkyl ammonium halide according to the first process aspect of four invention.

GENERAL DESCRIPTION OF THE PROCESS FOR PREPARING 6α - AZIDO - 21 - OXYGENATED - 4-PREGNENE-3,20-DIONES AND THE 1-DEHYDRO ANALOGS THEREOF

The 6,7-dihydro-6α-azido-21-oxygenated-4-pregnenes of Formula I and the 1-dehydro analogs thereof are prepared from a corresponding 6-substituted derivative, preferably a 6β-bromo-, a 6β-chloro-, or a 6β-hydrocarbonsulfonyloxy-21-oxygenated-4-pregnene having up to seven carbon atoms, according to yet another process aspect of our invention whereby a 6β-halogeno- or a 6β-hydrocarbonsulfonyloxy - 21 - oxygenated-4-pregnene-3,20-dione or a 1-dehydro analog thereof is treated with an alkali metal azide (preferably sodium azide) in a non-reactive solvent whereby there occurs replacement with inversion of the halogen or hydrocarbonsulfonyloxy at C-6 by azido and there is formed the corresponding 6α-azido-21-oxygenated-4-pregnene-3,20-dione.

In this process aspect of our invention, as in the first process aspect, the alkali metal reagent of choice is sodium azide, although there may be used other alkali metal azides such as potassium azide, lithium azide, or quaternary ammonium azides such as tetrabutylammonium azides.

Solvents suitable for use in this process are any non-reactive, organic solvent in which the starting 6-substituted-21-oxygenated-4-pregnene and the alkali metal azide reagent are soluble. The term "non-reactive" means any organic solvent which will not react with the steroid substrate or the azide reagent so as to cause transformations which will result in competing side reactions. Included among non-reactive solvents contemplated for this process aspect of our invention are hydroxylated hydrocarbons (e.g. methanol, ethanol, etc.) including glycols such as ethyleneglycol-monomethyl ether, cyclic ethers (e.g. dioxane), dialkyl amides (e.g. dimethylformamide, diethylformamide, etc.), dialkylsulfoxides (e.g. dimethylsulfoxide), and solvent mixtures such as dioxane-water, and dioxane-water-ethanol.

The replacement process whereby a 6β-chloro-, 6β-bromo-, or 6β-hydrocarbonsulfonyloxy-4-pregnene is replaced by a 6α-azido group is usually carried out under mild conditions, usually in temperatures ranging from about 20° C. to about 80° C. with the reaction mixture being stirred for from about 15 minutes to about 2.5 hours, or until the reaction is complete as evidenced by thin layer chromatographic techniques.

Our process is preferably (although not necessarily) carried out under an atmosphere of an inert gas such as argon, krypton, or nitrogen.

Generally, when preparing a 6α-azido-21-oxygenated-4-pregnene-3,20-dione of Formula I (e.g. 6α-azidoprednisone 21-acetate, i.e. 6α-azido-1,4-pregnadiene-17α,21-diol-3,11,20-trione 21-acetate) by our process, the alkali metal azide reagent (e.g. sodium azide) is added to a solution or suspension of a corresponding 6β-halogeno derivative (e.g. 6β-bromo-1,4-pregnadiene-17α,21-diol-3,20-dione 21-acetate or the corresponding 6β-chloro derivative), or 6β-hydrocarbonsulfonyloxy (e.g. methanesulfonyloxy- or p-toluenesulfonyloxy-), the quantities of reagent ranging from 1 to 20 moles of alkali metal azide per mole of steroid, and preferably 1 to 3 moles of alkali metal azide per mole steroid when the starting steroid is substituted at C-9 by bromine or chlorine and at C-11 by hydroxyl, chlorine or bromine when a halogen is present at C-11, equimolar quantities of alkali metal halide and 6β-halogeno-4-pregnene intermediate are advantageously employed to avoid side products caused by replacement of the 11β-halogeno by azido. The reaction is preferably carried out under an inert atmosphere (e.g. under nitrogen) at temperatures in the range of from about 20° C. to about 80° C. and usually at about room temperature until the replacement of 6β-halogeno or 6β-hydrocarbonsulfonyloxy by 6α-azido is complete as evidenced by thin layer chromatographic analysis. (Reaction time usually takes from 45 minutes to about 2 hours. The resulting 6α-azido-21-oxygenated-4-pregnene-3,20-dione of Formula I (e.g. 6α-azido-1,4-pregnadiene-17α,21-diol-3,20-dione 21-acetate) is isolated utilizing known techniques. Usually, the reaction mixture is poured into a large volume of water and the resulting insoluble fraction collected by filtration and air dried to yield a 6α-azido-21-oxygenated-4-pregnene-3,20-dione, e.g. 6α-azido-prednisone 21-acetate (i.e. 6α-azido-1,4-pregnadiene-17α,21-diol-3,11-20-trione 21-acetate). Purification is usually effected by recrystallization or chromatography.

In our process whereby the novel 6α-azido-21-oxygenated-4-pregnene-3,20-diones and 6α-azido-21-oxygenated-1,4-pregnadiene-3,20-diones of Formula I are prepared, the requisite starting steroids are usually 4-pregnene-21-oxygenated-3,20-diones or the 1-dehydro analogs thereof substituted at C-6 by 6β-bromo or 6β-chloro. Alternatively, the substituent at C-6 may be a pseudo-halogen such as tosylate or mesylate.

The C-6 substituted intermediates are prepared from known 6-unsubstituted-3-keto-4-pregnenes. Introduction of the halogeno or pseudohalogeno substituent at C-6 is carried out by any one of several known methods. For example, allylic halogenation of a 3-keto-4-pregnene- or a 3-keto-1,4-pregnadiene with a reagent such as N-bromoacetamide, N-chlorosuccinimide, bromine or chlorine in such solvents as chlorobenzene or dioxane yields the corresponding 6-halogeno-21-oxygenated-4-pregnene-3,20-dione or the 1-dehydro analog thereof. Esterification of a 6-hydroxy-21-oxygenated-4-pregnene-3,20-dione or a 1-dehydro analog thereof can be made to yield the 6-tosylate or 6-mesylate intermediates.

Prior to introducing a substituent at the 6-position of a 4-pregnene or a 1,4-pregnadiene so as to prepare the 6-halogeno immediate precursor of the compounds of our invention, we prefer to esterify the C-21 hydroxyl group. Thus, for example, in preparing 6β-bromo-cortisone and 6β-bromo-16α-methylprednisone for ultimate conversion into 6α-azidocortisone and 6α-azido-16α-methylprednisone, respectively, usually employed as starting compound is a 21-ester of cortisone and 16α-methylprednisone, respectively, e.g. cortisone 21-acetate and 16α-methylprednisone 21-acetate, respectively. It is apparent that the 6α-azido-21-oxygenated-4-pregnene-3,20-diones and the 6α-azido-21-oxygenated-1,4-pregnadiene-3,20-diones prepared by our process from the corresponding 6β-halogeno derivatives will thus contain the original ester protective group at C-21. These ester groups may be conveniently hydrolyzed either chemically or microbiologically by means of *Flavobacterium dehydrogenans* according to known analogous procedures. The 6α-azido-polyhydroxy-4-pregnenes and 1,4-pregnadienes thus obtained may be selectively re-esterified at C-21 by methods well known in the art.

This process aspect of our invention whereby a 6β-substituted (preferably a 6β-halogeno)-21-oxygenated-4-pregnene-3,20-dione upon reaction with an alkali metal azide in a non-reactive organic solvent is converted to the corresponding 6α-azido-4-pregnene- is applicable to any steroid containing a 3-keto-4-dehydro-configuration. Thus, any pregnene containing a 3-keto-4-dehydro moiety which will form a 6-substituted derivative such as the 6-halogeno-, 6-tosyloxy-, or 6-mesyloxy-, a requisite starting intermediate, will form the corresponding 6α-azido compound upon treatment with an alkali-metal azide in a non-reactive organic solvent according to our invention.

GENERAL DESCRIPTION OF PROCESS FOR PREPARING 6-AZIDO-21-OXYGENATED-1,4,6-PREGNATRIENE-3,20-DIONES

The 6-azido-21-oxygenated-1,4,6-pregnatriene-3,20-diones of Formula I are prepared from the corresponding 6-azido-21-oxygenated-4,6-pregnadiene-3,20-diones of Formula I by the fourth process aspect of our invention by reaction of said 6-azido-4,6-pregnadiene in an inert solvent (preferably dioxane) with 2,3-dichloro-5,6-dicyanobenzoquinone (hereinafter referred to as DDQ) in the presence of a strong acid (preferably hydrochloric acid) and usually also in the presence of water.

According to our process, a 6-azido-21-oxygenated-4,6-pregnadiene-3,20-dione of Formula I (e.g. 6-azido-4,6-pregnadiene-17α,21-diol-3,11,20-trione 21-acetate) is treated with an excess (based upon molar ratios) of DDQ in a non-reactive, organic solvent (usually benzene or preferably dioxane) in the presence of a strong acid (e.g. trifluoroacetic, sulfuric or, preferably, hydrochloric acid) advantageously in amounts at least equimolar to the 6-azido-4,6-pregnadiene, and usually also in the presence of water.

The amount of water preferably employed in our process is dependent upon the strong acid catalyst used; with hydrochloric acid as strong acid the presence of from 5% to 10% water in dioxane produces optimum yields when converting 6-azido-4,6-pregnadiene-17α,21-diol-3,11,20-trions 21-acetate at 60° C. to the corresponding 6-azido-1,4,6-pregnatriene. When trifluoroacetic acid is employed as the strong acid, the yields and purity of product obtained are similar whether derived from a reaction mixture containing only a trace of water in dioxane or a reaction mixture containing 10% water in dioxane; however, the reaction rate appears faster with only a trace of water present.

Our reaction is preferably carried out at temperatures in the range of from 60° C. to 80° C. At lower temperatures, the rate of reaction is slower; at higher temperatures, side reactions occur resulting in lower yields of 6-azido-1,4,6-pregnatriene.

Our reaction whereby a 6-azido-4,6-pregnadiene upon treatment with DDQ and a strong acid is converted to a 6-azido-1,4,6-pregnatriene, is preferably carried out utilizing concentrated hydrochloric acid as the strong acid. We have found that optimum yields of 21-oxygenated-6-azido-1,4,6-pregnatriene-3,20-dione with minimum side reactions are obtained from a 21-oxygenated-6-azido-4,6-pregnadiene-3,20-dione when there is employed from about one to five moles of concentrated hydrochloric acid per mole of steroid and said reaction is carried out at about 60° C. to 80° C. with the aqueous organic solvent being dioxane containing from about 5% to about 10% water and with the concentration of hydrochloric acid and of the steroid in the aqueous dioxane preferably being from about 1% to about 5% by volume.

We have found that when greater or smaller quantities of acid and/or water are used than those falling within the preferred range, the yield of 6-azido-1,4,6-pregnatriene diminishes with a concomitant increase of side product formation. Additionally, when the concentration of hydrochloric acid or of 6-azido-4,6-pregnadiene in the aqueous dioxane reaction mixture falls outside the 1% to 5% by volume range, or when high temperatures, e.g. over 100° C., are employed, lower yields of 6-azido-1,4,6-pregnatriene with lesser purity are obtained.

We have found a convenient water-solvent-acid for use in our process to be one containing about 9.0% water in dioxane and about 0.4% hydrochloric acid (i.e. a solution containing 49.5 ml. dioxane, 0.5 ml. concentrated hydrochloric acid an 5 ml. water). Optimum yields of 6-azido-1,4,6-pregnatriene are obtained by our DDQ dehydrogenation process when a sufficient quantity of the aforementioned aqueous dioxane-hydrochloric acid is added to a 6-azido-4,6-pregadiene so there is present in the reaction mixture from one to five moles concentrated hydrochloric acid per mole of steroid.

In carrying out the physical embodiment of a preferred method of this process, the reaction mixture comprising a 6-azido-4,6-pregnadiene and hydrochloric acid in aqueous dioxane is usually heated under an inert gas, e.g. nitrogen, at temperatures in the range of from about 60° C. to about 80° C. The dehyldrogenation reaction is usually completed in from 30 minutes to about 2 hours as indicated by the absence of 6-azido-4,6-pregnadiene starting compounds, as determined by thin layer chromatographic techniques, for example. The 6-azido-1,4,6-pregnatriene thereby formed is isolated via conventional techniques such as pouring the reaction mixture into water, extracting with an organic solvent and separating the products utilizing chromatographic techniques.

Our process is advantageously (although not necessarily) carried out in the absence of oxygen. Aqueous hydrochloric acid is preferred as strong acid catalyst although other strong acids such as sulfuric and trifluoroacetic may also be used, usually in the presence of water.

The 6-azido-1,4,6-pregnatrienes of this invention are not easily formed by the usual methods known in the art. Thus, for example, isolatable quantities of 6-azido-1,4,6-pregnatriene are not obtained when the corresponding 6-azido-4,6-pregnadienes are treated in anhydrous dioxane with DDQ alone or with DDQ in the presence of a weak acid such as benzoic acid, or when subjected to the action of microbiological dehydrogenating agents such as *Corynebacterium simplex* and *Bacillus spaericus* utilizing conventional techniques. Similarly, treatment of a 6β-azido-7α-acyloxy-1,4-pregnadiene with a tetraalkyl-ammonium halide according to the first process aspect described hereinabove does not yield isolatable quantities of a 6-azido-1,4,6-pregnatriene of Formula I. It is thus unexpected and particularly advantageous that treatment of a 6-azido-4,6-pregnadiene of Formula I with DDQ in the presence of a strong acid will yield a 6-azido-1,4,6-pregnatriene of our invention.

PREPARATION OF ESTERS OF OUR INVENTION 6-azido-4-pregnenes of Formula I having ester groups such as at C-16, C-17, and C-21 can be converted in known manner into 6-azido-4-pregnenes having the hydroxyl groups as, for example, by the action of acidic or alkaline saponification agents. When the 6-azido-4-pregnene of Formula I contains a chlorohydrin or bromohydrin at C-9 and C-11 (i.e. wherein X is halogen and Y is (H,βOH), we prefer to hydrolyze in a slightly acid medium, e.g. utilizing 70% perchloric acid in methanol-chloroform to minimize epoxide formation at C-9 and C-11. When hydrolyzing ester groups of compounds of Formula I not containing a 9(11)-chlorohydrin or bromohydrin, we usually prefer to use methanolic sodium hydroxide keeping the reaction medium at about 0° C. and under an inert atmosphere, e.g. Argon. If an ester group is present at C-11, such as in 6α-azido-prednisolone triacetate, it is convenient to convert the esterified compound to the free hydroxy analog by the action of the microorganism *Flavobacterium dehydrogenans*.

Similarly, alkylidenedioxy functions at C-17(21) in a 6-azido-4-pregnene of Formula I can be converted in known manner to the corresponding 17,21-dihydroxy steroid in an acidic medium (e.g. 50% aqueous acetic acid) under an atmosphere of nitrogen.

Compounds of Formula I, prepared in accordance with our invention, which possess a 21-hydroxyl group, can be converted into pharmacologically acceptable esters utilizing known procedures. When preparing hydrocarbon carboxylic acid esters of hydroxy groups at C-21 and most secondary hydroxy groups such as at C-7 and at C-16, we prefer to utilize as esterification medium an acid anhydride in pyridine at room temperature, e.g. acetic anhydride, propionic anhydride, valeric anhydride in pyridine. When an ester of an aromatic carboxylic acid is desired, the acyl halide, e.g. benzoyl chloride, toluyl chloride, in pyridine is preferably utilized as esterification agent.

Similarly, procedures known in the art are utilized to convert a 17,21-dihydroxy compound of our invention, e.g. of Formula I to the corresponding 17-mono-acyl or 17,21-di-acyl derivative, e.g. of Formula I. Thus, 17α,21-diesters may be prepared by acylation of the corresponding 17α,21-diols or 17α-hydroxy-21-acyloxy compounds. This is preferably effected by reaction of the steroid with an appropriate acid anhydride in the presence of a strong acid catalyst such as, e.g. p-toluenesulfonic acid, perchloric acid or strongly acidic cation exchange resins, or by using trifluoroacetic anhydride with an appropriate lower alkanoic acid. The reaction may be carried out in the absence of a solvent or in a non-polar solvent, e.g. carbon tetrachloride, benzene, toluene, methylene chloride and chloroform. Heating may or may not be necessary according to the reactivity of the reaction components.

When preparing a compound of Formula I having different acyl groups at C-17 and C-21, one may first prepare a 21-monoester and then esterify the C-21 monoacylate under more forcing conditions to introduce a different acyl group in the 17α-position.

The 17,21-diesters may also be prepared by acylation of the corresponding 21-hydroxy-17α-monoesters by treatment thereof with the appropriate acid anhydride or acid chloride under basic conditions, preferably in the presence of a tertiary organic base, e.g. pyridine, quinoline, N-methylpiperidine, N-methylmorpholine or dimethylanilino. The reaction may be carried out with or without solvents or with or without heat as may be necessary.

The 17-monoesters of our invention may be prepared by hydrolysis of a corresponding 17,21-ortho ester or 17α,21-diester.

In preparing 17-monoesters via hydrolysis of a 17,21-ortho ester, the 17,21-ortho ester is conveniently prepared by reaction of the 17α,21-diol with an alkylortho ester followed by hydrolysis of the resulting 17,21-ortho ester under mild conditions, i.e. hydrolysis in the presence of an acid catalyst, e.g. a lower alkanoic acid such as acetic or propionic, or a strong mineral acid such as hydrochloric sulfuric acid.

The acyl groups at C-17 and at C-21 of the 17-monoacyloxy and 17,21-diacyloxy-6-azido-4-pregnenes of Formula I may be introduced either before or after the 6-azido function is present in the molecule. It is preferred, however, when preparing 17,21-diacylates of Formula I that the ester groups be present prior to introducing the 6-azido group; whereas esterification at C–17 to produce a 17-mono-acylate of Formula I is preferably carried out on a 6-azido-17α-hydroxy-4-pregnene of Formula I utilizing techniques known in the art as described hereinabove.

The novel 20-keto-16α,17α,21-trihydroxy compounds of Formula I may be converted to the 16α,17-alkylidenedioxy derivatives utilizing procedures known in the art, e.g. by reacting a 16α,17α-hydroxy steroid of Formula I (e.g. 6-azido-16α-hydroxy-6-dehydrocortisone) with a ketone or aldehyde (e.g. acetone, acetylaldehyde) in the presence of a mineral acid (e.g. hydrochloric acid) whereby is obtained the corresponding 16α,17α-alkylidenedioxy derivative (e.g. 6-azido-16α,17α-isopropylidenedioxy-4,6-pregnadiene-21-ol-3,11,20-trione).

Similarly, 17,21-alkylidenedioxy derivatives of Formula I may be prepared from the corresponding 17,21-dihydroxy-20-keto-derivatives by treatment with a ketone, aldehyde, acetal, or lower alkyl ketal in the presence of a small amount of acid utilizing known techniques. For example, 6-azido-6-dehydrohydrocortisone and 2,2 - dimethoxypropane in dimethylformamide in the presence of a catalytic amount of p-toluenesulfonic acid produces 6-azido-17α,21-isopropylidenedioxy - 4,6 - pregnadiene-3,11,20-trione.

The following examples are illustrative of the procedure employed in preparing the compounds of this invention, but are not to be construed as limiting the scope thereof, the scope of our invention being defined only by the appended claims.

PHARMACEUTICAL FORMULATIONS

Following are examples of pharmaceutical compositions comprising 6-azido-4,6-pregnadiene-17α,21-diol-3,11,20-trione 21-acetate which are illustrative of formulations in which the compounds of our invention may be incorporated.

(I) PARENTERAL COMPOSITIONS

A. Intramuscular or subcutaneous aqueous suspension

|  | Mg./ml. |
|---|---|
| 6 - azido - 6 - dehydrocortisone 21-acetate (sterile, microcrystalline) | 5.0 |
| Monobasic sodium phosphate | 3.0 |
| Dibasic sodium phosphate, anhydrous | 6.0 |
| Polysorbate 80, USP | 0.5 |
| Benzyl alcohol, N.F. | 9.0 |
| Methylparaben, USP | 1.8 |
| Propylparaben, USP | 0.2 |
| Sodium carboxymethylcellulose, USP | 5.0 |
| Disodium edetate, USP | 0.1 |
| Polyethylene glycol 4000, USP | 20.0 |
| Water for injection, USP q.s. ad 1.00 ml. | |

(B) Intramuscular or subcutaneous oil injection

|  | Mg./ml. |
|---|---|
| 6-azido - 6 - dehydrocortisone 21-acetate (sterile, microcrystalline) | 5.0 |
| Aluminum monostearate, USP | 20.0 |
| Propylparaben, USP | 1.0 |
| Sesame oil, USP q.s. ad 1.00 ml. | |

(C) Intra-articular injection

|  | Mg./ml. |
|---|---|
| 6-azido-6-dehydrocortisone 21-acetate (Sterile, microcrystalline) | 5.0 |
| Sodium chloride USP | 9.0 |
| Sodium carboxymethylcellulose, USP | 5.0 |
| Polysorbate 80, USP | 0.5 |
| Benzyl alcohol, N.F. | 9.0 |
| Water for injection, USP q.s. ad 1.00 ml. | |

(D) Intravenous infusion

|  | Mg./ml. |
|---|---|
| 6-azido-6-dehydrocortisone 21-acetate | 5.0 |
| Dimethylacetamide q.s. 1.00 ml. | |

Note: This infusion is to be diluted with 500 ml. 50% dextrose injection, U.S.P. before administration.

(II) OPHTHALMIC COMPOSITIONS (A) Ointment

|  | Mg./g. |
|---|---|
| 6-azido-6-dehydrocortisone 21-acetate (microcrystalline, sterile) | 5.0 |
| Sodium sulfacetamide, U.S.P. | 100.0 |
| Methylparaben, U.S.P. | 0.5 |
| Propylparaben, U.S.P. | 0.1 |
| Mineral oil, U.S.P. | 179.0 |
| White petrolatum, U.S.P. | 715.4 |

(B) Suspension

|  | Mg./ml. |
|---|---|
| 6-azido-6-dehydrocortisone 21-acetate (sterile, microcrystalline) | 5.0 |
| Monobasic sodium phosphate | 1.25 |
| Dibasic sodium phosphate, anhydrous | 0.26 |
| Sodium chloride, USP | 6.4 |
| Triton WR–1339 | 1.0 |
| Benzalkonium chloride, U.S.P. | 0.25 |
| Disodium edetate, USP | 0.1 |
| Purified water, USP, distilled q.s. ad 1.00 ml. | |

(C) Suspension

|  | Mg./ml. |
|---|---|
| 6-azido-6-dehydrocortisone 21-acetate | 5.0 |
| Sodium sulfacetamide, U.S.P. | 100.0 |
| Sodium thiosulfate, USP | 3.14 |
| Triton WR–1339 | 1.0 |
| Disodium edetate, USP | 0.1 |
| Monobasic sodium phosphate | 1.25 |
| Dibasic sodium phosphate, anhydrous | 0.26 |
| Benzalkonium chloride, U.S.P. | 0.25 |
| Purified water U.S.P., distilled q.s. ad 1.00 ml. | |

(III) OTIC COMPOSITIONS (A) Suspension

|  | Mg./g. |
|---|---|
| 6-azido-6-dehydrocortisone 21-acetate (sterile, microcrystalline) | 5.0 |
| Cetylpyridinium chloride, N.F. | 0.2 |
| Glyceryl triacetate | 880.0 |
| Polyethylene glycol 200 q.s. ad 1.0 g. | |

(B) Suspension

|  | Mg./ml. |
|---|---|
| 6-azido-6-dehydrocortisone 21-acetate (sterile, microcrystalline) | 5.0 |
| Neomycin sulfate, U.S.P. | 6.0 |
| Sodium propionate, N.F. | 50.0 |
| Polyvinylpyrrolidone (Plasdone K29–32) | 30.0 |
| Propionic acid 99% R. | 0.0025 ml. |
| Purified water, U.S.P., distilled 1.00 ml. | |

(C) Solution

|  | Mg./ml. |
|---|---|
| 6-azido-6-dehydrocortisone 21-acetate (sterile, microcrystalline) | 5.0 |
| Cetylpyridinium chloride, N.F. | 0.2 |
| Glycerin U.S.P. | 250.0 |
| Propylene glycol, USP q.s. 1.00 ml. | |

(IV) ORAL COMPOSITIONS

(A) Liquid

| | Mg./ml. |
|---|---|
| 6-azido-6-dehydrocortisone 21-acetate | 0.500 |
| Sodium benzoate, U.S.P. | 1.000 |
| Citric acid, U.S.P. | 3.000 |
| Sodium chloride, U.S.P. | 0.500 |
| Standard granulated sugar, food grade | 550.000 |
| Sorbitol solution, U.S.P. | 200.000 |
| Propylene glycol, U.S.P. | 50.000 |
| F.D.C. yellow #5, certified | .050 |
| Imitation cherry flavor, Ungerer | .010 |
| Terpeneless organic extract, Ungerer | .005 |
| Alcohol, U.S.P. | 5.000 |
| Purified water, U.S.P. to make 1.000 ml. | |

| | Mg./Tablet | |
|---|---|---|
| B. Tablets: | | |
| 6-azido-6-dehydrocortisone 21-acetate (micronized) | 2.50 | 5.00 |
| Lactose, hydrous, impalpable powder, U.S.P. | 81.70 | 79.00 |
| Pregelatinized corn starch | 0.50 | 0.50 |
| Corn starch, food grade | 15.00 | 15.20 |
| Magnesium stearate, U.S.P. | 0.30 | 0.30 |
| Total weight | 100.00 | 100.00 |
| C. Tablets: | | |
| 6-azido-6-dehydrocortisone 21-acetate (micronized) | 2.30 | 5.00 |
| Lactose, hydrous, impalpable powder, U.S.P. | 77.00 | 74.50 |
| Polyvinylpyrrolidone (Plasdone K29-32) | 5.00 | 5.00 |
| Sodium lauryl sulfate, U.S.P. | 5.00 | 5.00 |
| Corn starch, food grade | 10.00 | 10.00 |
| Magnesium stearate, U.S.P. | 0.50 | 0.50 |
| Total weight | 100.00 | 100.00 |
| D. Capsules: | | |
| 6-azido-6-dehydrocortisone 21-acetate (micronized) | 2.500 | 5.00 |
| Lactose, hydrous, impalpable powder, U.S.P. | 212.000 | 209.50 |
| Sodium lauryl sulfate, U.S.P. | 10.000 | 10.00 |
| Magnesium stearate, U.S.P. | 0.500 | 0.50 |
| Total | 225.000 | 225.00 |

(V) TOPICAL COMPOSITIONS

(A) Ointment

| | Mg./gm. |
|---|---|
| 6-azido-6-dehydrocortisone 21-acetate (micronized) | 5.0 |
| Mineral oil, U.S.P. | 50.0 |
| White petrolatum, U.S.P. to make 1.0 g. | |

(B) Ointment

| | Mg./gm. |
|---|---|
| 6-azido-6-dehydrocortisone 21-acetate (micronized) | 5.0 |
| Stearyl alcohol, U.S.P. | 50.0 |
| Polyethylene glycol 400, U.S.P. | 600.0 |
| Polyethylene glycol 4000, U.S.P. to make 1.0 g. | |

(C) Cream

| | Mg./gm. |
|---|---|
| 6-azido-6-dehydrocortisone 21-acetate (micronized) | 5.0 |
| Stearyl alcohol, U.S.P. | 90.0 |
| White petrolatum, U.S.P. | 10.0 |
| Propylene glycol, U.S.P. | 50.0 |
| Sodium lauryl sulfate, U.S.P. | 15.0 |
| 4-chloro-m-cresol, pharmaceutical grade | 1.0 |
| Purified water, U.S.P. to make 1.0 gm. | |

(D) Cream

| | Mg./gm. |
|---|---|
| 6-azido-6-dehydrocortisone 21-acetate (micronized) | 5.0 |
| Stearic acid, U.S.P. | 60.0 |
| Glyceryl monostearate, cosmetic | 100.0 |
| Propylene glycol, U.S.P. | 50.0 |
| Polyoxyethylene sorbitan monopalmitate, cosmetic | 50.0 |
| Sorbitol solution, U.S.P. | 30.0 |
| Benzyl alcohol, N.F. | 10.0 |
| Purified water, U.S.P. to make 1.0 gm. | |

EXAMPLE 1

6-azido-4,6-pregnadiene-17α,21-diol-3,11,20-trione 21-acetate (6-azido-6-dehydrocortisone 21-acetate)

(A) 6β-azido-7α,17α,21-trihydroxy-4-pregnene-3,11,20-trione 21-acetate (1) To a solution of 3.7 g. of 6α,7α-epoxy-17α,21-dihydroxy-4-pregnene-3,11,20-trione 21-acetate in 250 ml. dioxane and 600 ml. methanol, add a solution of 12 g. sodium azide in 150 ml. water and 10 ml. acetic acid. Allow the reaction mixture to stand overnight at room temperature then pour in water and extract the aqueous mixture with chloroform. Dry the combined extracts over magnesium sulfate and evaporate the solvent to a residue comprising 6β-azido-7α,17α,21-trihydroxy-4-pregnene-3,11,20-trione 21-acetate; yield 3.9 g. Purify by crystallization from methylene chloride to give 3.04 g. of 6β-azido-7α,17α,21-trihydroxy-4-pregnene-3,11,20-trione 21-acetate.

$[\alpha]_D^{26} + 123°$ (dioxane); $\lambda_{max.}^{methanol}$ 231 mμ ($\epsilon = 12,975$)

(2) Alternatively the compound of this example is prepared as follows. To a solution of 200 mg. of 6α,7α-epoxy-17α,21-dihydroxy-4-pregnene-3,11,20-trione 21-acetate in 40 ml. of methanol, add 400 mg. of sodium azide and a solution of 40 mg. boric acid in 5 ml. of water. Stir the mixture at 50° C. for 35 minutes, add 100 ml. of water, then extract with chloroform. Wash the combined chloroform extracts with water, dry over magnesium sulfate, then concentrate in vacuo to a residue comprising 6β-azido-7α,17α,21-trihydroxy-4-pregnene-3,11,20-trione 21-acetate which can be utilized without further purification in esterification procedure (1)(B) immediately following.

(B) 6β-azido-7α,17α-21-trihydroxy-4-pregnene-3,11,20-trione 7,21-diacetate

Add 14 ml. of acetic anhydride to a solution of 3.04 g. of 6β-azido-7α,17α,21-trihydroxy-4-pregnene-3,11,20-trione 21-acetate in 30 ml. of pyridine and allow the reaction mixture to stand at room temperature for 18 hours. Pour the reaction mixture into 400 ml. of water and stir for 20 minutes. Collect the insoluble fraction by filtration and dry in vacuo to yield 3.031 g. of product comprising 6β-azido-7α,17α,21-trihydroxy-4-pregnene-3,11,20-trione 7,21-diacetate.

$[\alpha]_D^{26} + 89.2°$ (dioxane); $\lambda_{max.}^{methanol}$ 229 mμ ($\epsilon = 12,470$)

(C) 6-azido-17α-21-dihydroxy-4,6-pregnadiene-3,11,20-trione 21-acetate (1) Add 1 g. of 6β-azido-7α,17α,21-trihydroxy-4-pregnene-3,11,20-trione 7,21-diacetate to a suspension of 1 g. of tetramethylammonium fluoride in 100 ml. of acetonitrile. Allow the reaction mixture to stand at 60° C. for 35 minutes then distill the solvent in vacuo and dissolve the resultant residue in chloroform and pour the chloroform solution into water. Separate the aqueous layer from the organic solution layer and wash the organic solution with aqueous sodium bicarbonate. Dry the organic solution over magnesium sulfate and evaporate the solvent under a steam of nitrogen to obtain a residue comprising 6-azido-17α,21-dihydroxy-4,6-pregnadiene-3,11,20-trione 21-acetate. Purify by crystallization in methanol and filtration of the resultant crystallized product to obtain 511 mg. of 6 - azido - 17α,21 - dihydroxy - 4,6 - pregnadiene - 3,11,20 - trione 21 - acetate which crystallizes with a mole of water as solvent.

$[\alpha]_D^{26}+300.7°$ (dioxane); $\lambda_{max.}^{methanol}$ 250 mµ $\epsilon=13,176$); $\lambda_{max.}^{methanol}$ 294 mµ ($\epsilon=12,274$)

Calcd. for $C_{23}H_{27}O_6N_3 \cdot H_2O$: $N_2=9.15\%$. Found: $N_2=9.07\%$.

(2) Alternatively, above procedure 1(C)(1) may be carried out at room temperature for 18 hours (rather than at 60° C. for 35 minutes) and there is formed 6-azido - 17α,21 - dihydroxy - 4,6 - pregnadiene - 3,11,20-trione 21-acetate.

(3) Alternatively, the compound of this example is prepared as follows. Dissolve 4 g. of tetramethylammonium fluoride pentahydrate in 200 ml. of acetonitrile and evaporate in vacuo to a residue. Repeat this procedure once again. To the resulting dry residue comprising tetramethylammonium fluoride add 2 g. of 6β - azido - 7α,17α-21 - trihydroxy - 4 - pregnene - 3,11,20 - trione 7,21 - diacetate in 100 ml. of acetonitrile. Stir the reaction mixture under an atmosphere of argon at 25° C. for two hours. Distill the solvent in vacuo to a residue comprising 6 - azido - 17α,21 - dihydroxy - 4,6 - pregnadiene-3,11,20 - trione 21 - acetate. Purify by chromatographing on Florisil (pre-washed with hexane) eluting the product with acetone. Evaporate the combined eluates, then crystallize the resultant residue with methanol, to obtain 6-azido - 17α,21 - dihydroxy - 4,6 - pregnadiene - 3,11,20-trione 21-acetate (i.e. 6-azido - 6 - dehydrocortisone 21-acetate).

(4) Alternatively the compound of this example is prepared utilizing tetramethylammonium fluoride pentahydrate rather than with anhydrous tetramethylammonium fluoride in a manner such as the following. Add 2 g. of tetramethylammonium fluoride pentahyddate to 200 ml. of acetonitrile and heat the mixture with stirring until the tetramethylammonium fluoride pentahydrate liquifies. Cool to 25° C. under an atmosphere of nitrogen then add 2 g. of 6β - azido - 7α,17α,21 - trihydroxy-4-pregnene-3,11,20-trione 7,21-diacetate and stir the reaction mixture under an atmosphere of nitrogen at 25° C. for three hours. Concentrate the reaction mixture to about 100 ml. in vacuo at 25° C. then pour into 1 liter of water and extract the aqueous mixture with 10 100 ml. portions of dichloromethane. Wash the combined dichloromethane extracts with 2 50 ml. portions of water, dry the dichloromethane over magnesium sulfate then evaporate in vacuo to a residue, triturate the residue with about 25 ml. of boiling ether, cool to −20° C. and filter the solid fraction comprising 6 - azido - 17α,21 - dihydroxy-4,6-pregnadiene - 3,11,20 - trione 21 - acetate. Purify by crystallization in methanol to obtain 6 - azido - 7α,21 - dihydroxy - 4,6 - pregnadiene - 3,11,20 - trione 21 - acetate which crystallizes with a mole of water as solvent: $[\alpha]_D^{26}$ 300.7° (dioxane).

Alternatively, the compound of this example is prepared from 6β - azido - 7α,17α,21 - trihydroxy - 4 - pregnene - 3,11,20 - trione 21 - acetate (compound of Example 1(A)) according to the following procedures (D) and (E)).

(D) 6β-azido-7α,17α,21-trihydroxy-4-pregnene-3,11,20-trione 7-methanesulfonate 21-acetate To a solution of 3 g. of 6β-azido-7α,17α,21-trihydroxy-4-pregnene-3,11,20-trion 21-acetate in 30 ml. of pyridine add 1.5 ml. of methanesulfonyl chloride and allow the reaction mixture to stand at room temperature for 17 hours. Pour the reaction mixture into water and collect by filtration the resultant precipitate comprising 6β-azido-7α,17α,21-trihydroxy-4-pregnene-3,11,20 - trione 7 - methanesulfonate 21-acetate. Purify by drying the precipitate in vacuo and crystallizing from ether.

In the above procedure, by utlizing 2.2 ml. of p-toluenesulfonyl chloride in place of the 1.5 ml. of methanesulfonyl chloride there is obtained the corresponding 7-p-toluenesulfonate ester, i.e. 6β-azido-7α,17α,21-trihydroxy-4-pregnene-3,11,20-trione 7-p-toluenesulfonate 21-acetate.

(E) 6-azido-4,6-pregnadiene-17α,21-diol-3,11,20-trione 21-acetate

Add 1.5 g. of 6β - azido - 7α,17α,21 - trihydroxy-4-pregnene-3,11,20-trione 7-methanesulfonate 21-acetate to a suspension of 0.750 g. of tetramethylammonium fluoride in 150 ml. acetonitrile. Warm the reaction mixture at 60° C. for 35 minutes then remove the solvent in vacuo. Dissolve the resultant residue in chloroform and pour into water. Separate the solvent layers and wash the organic layer with aqueous sodium bicarbonate, then dry the organic layer over magnesium sulfate and evaporate the solvent to a residue comprising 6-azido-4,6-pregnadiene-17α,21-diol-3,11,20-trione 21-acetate. Purify by separation on preparative silica gel plates. Further purify by crystallizing the isolated product with methanol to obtain 6-azido - 4,6 - pregnadiene - 17α,21-diol-3,11,20-trione 21-acetate.

Similarly, treat 6β - azido - 7α,17α,21-trihydroxy-4-pregnene - 3,11,20 - trione 7-p-toluenesulfonate 2-acetate with tetramethylammonium fluoride in acetonitrile in the above described manner to obtain 6-azido-4,6-pregnadiene-17α,21-diol-3,11,20-trinone 21-acetate.

EXAMPLE 2

6β - Azido - 4,6-Pregnadiene-11β,17α,21-Triol-3,20-Dione 21 - Acetate (6 - Azido-6-Dehydro-Hydrocortisone 21-Acetate)

(A) 6α,7α-oxido-11β,17α,21-trihydroxy-4-pregnene-3,20-dione 21-acetate (1) To a solution of 2 g. of 11β,17α,21-trihydroxy-4,6-pregnadiene-3,20-dione 21-acetate in 75 ml. of acetone add 2 g. of m-chloroperbenzoic acid over a period of 2.5 hours. Heat the reaction mixture at reflux temperature for five hours, distill the solvent, dissolve the resultant residue in methylene chloride and pour the methylene chloride solution into water. Separate the aqueous layer from the organic solution, wash the organic solution with 200 ml. of 0.2 N-sodium hydroxide. Dry the organic solution over magnesium sulfate and remove the solvent in vacuo to a residue comprising 6α,7α-epoxy-11β,17α,21-trihydroxy-4-pregnene-3,20-dione 21-acetate. Purify by dissolving in methylene chloride and separating via preparative thin layer chromatography to obtain 460 mg. of 6α,7α-oxido-11β,17α,21 - trihydroxy-4-pregnene-3,20-dione 21-acetate which is used without further purification in the following Example 2(B).

(2) Alternatively the compound of this example is prepared by treating 11β,17α,21-trihydroxy-4,6-pregnadiene-3,20-dione 21-acetate (7 g.) with monoperphthalic acid (2.7 g.) in chloroform (700 ml.) at room temperature for 60 hours and isolating the resultant product by washing the chloroform solution successively with aqueous sodium bicarbonate, water, ferrous sulfate solution and again with water. Dry the chloroform solution over magnesium sulfate and distill the solvent to a residue comprising 6α,7α-oxido - 11β,17α,21-trihydroxy-4-pregnene-3,20-dione 21-acetate. Purify by crystallization from acetone, M.P. 270° C.

(3) Alternatively, the compound of this example is prepared according to procedure 2(A)(1) but using as solvent 80 ml. of methylene chloride/tert.-butanol (1:1) (rather than acetone) and carrying out the reaction at reflux temperature for hours to obtain 6α,7α - oxido-11β,17α,21-trihydroxy-4-pregnene-3,20-dione 21-acetate.

(B) 6β-azido-7α,11β,17α,21-tetrahydroxy-4-pregnene-3,20-dione 21-acetate

To a solution of 450 mg. of 6α,7α-oxido-11β,17α,21-trihydroxy-4-pregnene-3,20-dione 21-acetate in 20 ml. of dioxane and 60 ml. of methanol add a solution of 1.3 g. sodium azide in 15 ml. water and 1 ml. acetic acid. Allow the reaction mixture to stand at room temperature for 6 days then pour the reaction mixture into water and extract with chloroform. Dry the chloroform solution over magnesium sulfate and evaporate the solvent to a residue comprising 6β - azido-7α,11β,17α,21-tetrahydroxy-4-pregnene-3,20-dione 21-acetate. Purify by dissolving in methylene chloride and separating via thick layer chromatography to obtain 250 mg. of 6β-azido-7α,11β,17α,21-tetrahydroxy-4-pregnene-3,20-dione 21-acetate which is used without further purification in the following Example 2(C).

(C) 6β-azido-7α,11β,17α,21-tetrahydroxy-4-pregnene-3,20-dione 7,21-diacetate

In a manner similar to that described in Example 1(B), treat 6β - azido-7α,11β,17α,21-tetrahydroxy-4-pregnene-3,20-dione 21-acetate with acetic anhydride in pyridine at room temperature for 24 hours. Isolate the resultant product in a manner similar to that described in Example 1(B) to obtain 6β - azido-7α,11β,17α,21-tetrahydroxy-4-pregnene-3,20-dione 7,21-diacetate.

(D) 6-azido-11β,17α,21-trihydroxy-4,6-pregnadiene-3,20-dione 21-acetate

To a solution of 300 mg. tetramethylammonium fluoride in 15 ml. acetonitrile add a solution of 150 mg. of 6β - azido - 7α,11β,17α,21-tetrahydroxy-4-pregnene-3,20-dione 7,21-diacetate in 15 ml. of acetonitrile. Allow the reaction mixture to stand at 60° C. for 40 minutes then remove the solvent in vacuo, dissolve the resultant residue in methylene chloride, pour the methylene chloride solution into water, separate the aqueous layer from the organic layer and wash the organic layer in aqueous sodium bicarbonate solution. Dry the organic layer over magnesium sulfate and remove the solvent in vacuo to a residue comprising 6 - azido-11β,17α,21-trihydroxy-4,6-pregnadiene-3,20-dione 21-acetate. Purify via preparative thin layer chromatography utilizing silica gel to obtain 65 mg. of 6 - azido - 11β,17α,21 - trihydroxy-4,6-pregnadiene-3,20-dione 21-acetate, $\lambda_{max.}^{methanol}$ 351 m$\mu$ ($\epsilon$=12,452); $\lambda_{max.}^{methanol}$ 299 m$\mu$ ($\epsilon$=12,452); $\delta$ (CDCl$_3$), 0.73, 1.31, 2.15, 3.38, 4.66, 5.13, 5.78, 6.12 p.p.m.

EXAMPLE 3

6-azido-4,6-pregnadiene-17α,21-diol-3,20-dione 21-acetate (A) 6β - azido-7α,17α,21-trihydroxy-4-pregnene-3,20-dione 21-acetate.—In a manner similar to that described in Example 1(A)(1) treat a solution of 6α,7α-epoxy-4-pregnene - 17α,21-diol-3,20-dione 21-acetate in dioxane and methanol with a solution of sodium azide in dilute acetic acid. Isolate and purify the resultant product in a manner similar to that described to obtain 6β-azido-7α,17α,21-trihydroxy-4-pregnene-3,20-dione 21-acetate.

(B) 6β - azido-7α,17α,21-trihydroxy-4-pregnene-3,20-dione 7,21-diacetate.—In a manner similar to that described in Example 1(B), treat 6β-azido-7α,17α,21-trihydroxy - 4-pregnene-3,20-dione 21-acetate with acetic anhydride in pyridine at room temperature. Isolate and purify the resultant product in a manner similar to that described in Example 1(B) to obtain 6β-azido-7α,17α,21-trihydroxy-4-pregnene-3,20-dione 7,21-diacetate.

(C) 6-azido-4,6-pregnadiene-17α,21-diol-3,20-dione 21-acetate.—In a manner similar to that described in Example 1(C)(1) treat 6β - azido-7α,17α,21-trihydroxy-4-pregnene 3,20 - dione 7,21-diacetate with tetramethylammonium fluoride in acetonitrile. Isolate and purify the resultant product in a manner similar to that described in Example 1(C)(1) to obtain 6-azido-4,6-pregnadiene-17α,21-diol-3,20-dione 21-acetate.

EXAMPLE 4

6-azido-4,6-pregnadiene-21-ol-3,20-dione 21-acetate (A) 6α,7α-oxido-4-pregnene-21-ol-3,20-dione 21 - acetate.—In a manner similar to that described in Example 2(A)(1) treat 4,6-pregnadiene-21-ol-3,20-dione 21-acetate with m-chloroperbenzoic acid in acetone at reflux temperature. Isolate and purify the resultant product in a manner similar to that described to obtain 6α,7α-oxido-4-pregnene-21-ol-3,20-dione 21-acetate.

(B) 6β-azido-7α,21-dihydroxy-4-pregnene-3,20-dione 21-acetate.—Treat 6α,7α-oxido-4-pregnene-21-ol-3,20 - dione 21-acetate with sodium azide in dilute acetic acid in a manner similar to that described in Example 1(A)(1). Isolate and purify the resultant product in a manner similar to that described to obtain 6β-azido-7α,21-dihydroxy-4-pregnene-3,20-dione 21-acetate.

(C) 6β-azido-7α,21-dihydroxy-4-pregnene-3,20-dione 7,21-diacetate.—Treat 6β-azido-7α,21-dihydroxy - 4 - pregnene-3,20-dione 21-acetate with acetic anhydride in pyridine at room temperature in a manner similar to that described in Example 1(B). Isolate and purify the resultant product in a manner similar to that described to obtain 6β-azido-7α,21-dihydroxy-4-pregnene-3,20-dione 7,21 - diacetate.

(D) 6-azido-4,6-pregnadiene-21-ol-3,20-dione 21-acetate.—Treat 6β-azido-7α,21-dihydroxy-4-pregnene - 3,20-dione 7,21-diacetate with tetramethylammonium fluoride in acetonitrile at 60° C. in a manner similar to that described in Example 1(C)(1). Isolate and purify the resultant product in a manner similar to that described to obtain 6-azido-4,6-pregnadiene-21-ol-3,20-dione 21-acetate.

EXAMPLE 5

6β-azido-7α,17α,21-trihydroxy-4,9(11)-pregnadiene-3,20-dione 7,21-diacetate (A) 6β-azido-7α,11α,17α,21-tetrahydroxy-4-pregnene-3,20-dione 11-p-toluenesulfonate 21-acetate.—In a manner similar to that described in Example 1(A)(1) treat 6α,7α-oxido-11α,17α,21-trihydroxy-4-pregnene-3,20-dione 11-p-toluenesulfonate 21-acetate with sodium azide in dilute acetic acid at room temperature. Isolate and purify the resultant product in a manner similar to that described in Example 1(A)(1) to obtain 6β-azido-7α,11α,17α,21-tetrahydroxy-4-pregnene-3,20-dione 11-p-toluenesulfonate 21-acetate.

(B) 6β-azido-7α,11α,17α,21-tetrahydroxy-4-pregnene-3,20-dione 7,21-diacetate 11-p-toluenesulfonate.—In a manner similar to that described in Example 1(B) treat 6β-azido-7α,11α,17α,21-tetrahydroxy-4-pregnene-3,20 - dione 11-p-toluenesulfonate 21-acetate with acetic anhydride in pyridine. Isolate and purify the resultant product in a manner similar to that described in Example 1(B) to obtain 6β-azido-7α,11α,17α,21-tetrahydroxy-4 - pregnene - 3,20-dione 7,21-diacetate 11-p-toluenesulfonate.

(C) 6β-azido-7α,17α,21-trihydroxy - 4,9(11) - pregnadiene-3,20-dione 7,21-diacetate.—To a solution of 1.9 g. of anhydrous sodium acetate in 20 ml. of acetic acid at about 105° C. and 1 g. of 6β-azido-7α,11α,17α,21-tetrahydroxy-4-pregnene-3,20-dione 7,21-diacetate 11-p-toluenesulfonate. Heat the solution at reflux temperature for 40 minutes then chill in ice and dilute with cold water. Separate the resultant precipitate by filtration, wash with water, dry and crystallize from acetone-hexane to give 6β-azido-7α,17α,21-trihydroxy-4,9(11)-pregnadiene-3,20 - dione 7,21-diacetate.

EXAMPLE 6

6-azido-9α,11β-dichloro-4,6-pregnadiene-17α,21-diol-3,20-dione 21-acetate (A) 6β-azido-7α,17α,21-trihydroxy-9α,11β-dichloro - 4-pregnene-3,20-dione 7,21-diacetate.—To 1.0 g. of 6β-azido-7α,17α,21-trihydroxy-4,9(11)-pregnadiene 7,21-diacetate dissolved in 35 ml. of carbon tetrachloride at 20° C. add 2.1 ml. chlorine gas in carbon tetrachloride (65 mg. $Cl_2$/ml.) and 0.15 ml. of pyridine. Stir the reaction mixture at −20° C. for 20 minutes then allow the reaction mixture to warm to room temperature over 40 minutes. Filter the reaction mixture and concentrate the filtrate in vacuo to a residue comprising 6β-azido-7α,17α,21-trihydroxy-9α,11β-dichloro-4-pregnene-3,20-dione 7,21-diacetate.

(B) 6-azido-9α,11β-dichloro-4,6-pregnadiene - 17α,21-diol-3,20-dione 21-acetate.—In a manner similar to that described in Example 1(C)(2) treat 6β-azido-7,17α,21-trihydroxy-9α,11β-dichloro-4-pregnene-3,20-dione 7,21-diacetate with tetramethylammonium fluoride in acetonitrile at room temperature. Isolate and purify the resultant product in a manner similar to that described in Example 1(C)(2) to obtain 6-azido-9α,11β-dichloro-4,6-pregnadiene-17α,21-diol-3,20-dione 21-acetate.

EXAMPLE 7

6-azido-9α-bromo-11β-fluoro-4,6-pregnadiene-17α,21-diol-3,20-dione 21-acetate (A) 6β-azido-7α,17α,21-trihydroxy-9α - bromo - 11β-fluoro-4-pregnene-3,20-dione 7,21-diacetate.—To a solution of 1.76 g. of 6β-azido-7α,17α,21-trihydroxy-4,9(11)-pregnadiene-3,20-dione 7,21-diacetate and 0.5 g. of N-bromoacetamide in 50 ml. of diethyl acetic acid, at room temperature add a solution of 0.5 g. of hydrogen fluoride in 4.7 ml. of a chloroform-tetrahyrofuran mixture (1:2). Stir the solution at room temperature for 2 hours then pour into ice water with stirring. Bring the reaction mixture to neutrality by adding sodium bicarbonate then decant the aqueous solution from the resultant precipitate which comprises 6β-azido-7α,17α,21-trihydroxy-9α-bromo-11β-fluoro-4-pregnene-3,20-dione 7,21-diacetate. Purify by dissolving the dried precipitate in acetone-ether and filtering through a column of florisil in ether and eluting the column with acetone-ether. Combine the like acetone-ether eluates and evaporate to a residue. Crystallize the residue from methylene chloride in hexane to give 6β-azido-7α,17α,21-trihydroxy-9α-bromo-11β-fluoro - 4 - pregnene-3,20-dione 7,21-diacetate.

(B) 6-azido-9α-bromo-11β-fluoro-4,6-pregnadiene-17α,21-diol-3,20-dione 21-acetate.—In a manner similar to that described in Example 1(C)(2) treat 6β-azido-7α,17α,21 - trihydroxy-9α-bromo-11β-fluoro-4-pregnene-3,20-dione 7,21-diacetate with tetramethylammonium fluoride in acetonitrile. Isolate and purify the resultant product in a manner similar to that described in Example 1(C)(2) to obtain 6-azido-9α-bromo-11β-fluoro-4,6-pregnadiene-17α,21-diol-3,20-dione 21-acetate.

6-azido-9α-chloro-11β-fluoro-4,6-pregnadiene-17α, 21-diol-3,20-dione 21-acetate (A) 6β-azido-7α,17α,21-trihydroxy-9α-chloro-11β-fluoro-4-pregnene-3,20-dione 7,21-diacetate.—To 0.8 g. of 6β-azido-7α,17α,21 - trihydroxy - 4,9(11)-pregnadiene-3,20-dione 7,21-diacetate in 25 ml. of diethylacetic acid add 0.24 g. of N-chlorosuccinimide followed by a solution of 650 mg. of hydrogen fluoride in 3.4 ml. of a tetrahydrofuran-chloroform mixture (1:2). Stir the reaction mixture at room temperature for 46 hours then pour into dilute aqueous sodium carbonate solution. Extract the reaction mixture with methylene chloride and evaporate the combined organic extracts to a residue. Dissolve the residue in acetone-ether and chromatograph on silica gel eluting with acetone-ether. Combine the like eluates and evaporate in vacuo to a residue comprising 6β-azido-7α,17α,21-trihydroxy-9α-chloro-11β-fluoro - 4-pregnene-3,20-dione 7,21-diacetate. Purify by crystallization from acetone-hexane.

EXAMPLE 9

6β-azido - 7α,11β,17α,21 - tetrahydroxy - 9α - fluoro-4-pregnene - 3,20-dione 7,21-diacetate (6β-azido-7α-acetoxy-9α-fluoro hydrocortisone 2-acetate)

(A) 6α,7α-oxido-9α-fluoro-4-pregnene-11β,17α,21-triol-3,20-dione 21-acetate.—In a manner similar to that described in Example 2(A)(1) treat 9α-fluoro-4,6-pregnadiene-11β,17α,21-triol-3,20-dione 21-acetate with m-chloroperbenzoic acid in acetone. Isolate the resultant product in a manner similar to that described to obtain 6α,7α-oxido-9α-fluoro-4-pregnene - 11β,17α,21 - triol-3,20-dione 21-acetate.

Alternatively in a manner similar to that described in the second paragraph of Example 2(A), treat 9α-fluoro-4,6-pregnadiene-11β,17α,21 - triol-3,20-dione 21-acetate with monoperphthalic acid in chloroform at room temperature to obtain 6α,7α-oxido-9α-fluoro-4-pregnene-11β, 17α,21-triol-3,20-dione 21-acetate.

(B) 6β-azido-7α,11β,17α,21 - tetrahydroxy-9α-fluoro-4-pregnene-3,20 - dione 21-acetate (6β-azido-9α-fluoro-4-pregnene-7α,11β,17α,21-tetraol-3,20-dione 21-acetate).—In a manner similar to that described in Example 1(A)(1) treat 6α,7α-oxido-9α-fluoro-4-pregnene-11β,17α,21-triol-3, 20-dione 21-acetate with sodium azide in aqueous methanol. Isolate and purify the resultant product in a manner similar to that described in Example 1(A)(1) to obtain 6β-azido-7α,11β,17α,21 - tetrahydroxy - 9α-fluoro-4-pregnene-3,20-dione 21-acetate.

(C) 6β-azido-7α,11β,17α,21-tetrahydroxy-9α-fluoro-pregnene-3,20-dione 7,21-diacetate.—In a manner similar to that described in Example 1(B) treat 6β-azido-7α,11β,17α,21-tetrahydroxy-9α-fluoro-4-pregnene-3,20-dione 21-acetate with acetic anhydride in pyridine at room temperature. Isolate and purify the resultant product in a manner similar to that described to obtain 6β-azido-7α,11β,17α, 21-tetrahydroxy-9α-fluoro-4-pregnene-3,20-dione 7,21-diacetate.

Alternatively the compound of this example is also prepared according to the following procedures (D), (E), and (F).

(D) 6β-azido-7α,11β,17α,21-tetrahydroxy-9α-bromo-4-pregnene-3,20-dione 7,21-diacetate (6β-azido-7α-acetoxy-9α-bromo-hydrocortisone 21-acetate).—To a mixture of 0.24 g. of 6β-azido-7α,17α,21-trihydroxy-4,9(11)-pregnadiene-3,20-dione 7,21-diacetate in 20 ml. of dioxane (which has been purified by refluxing over sodium followed by distillation) and 2 ml. of water, add 0.07 g. of N-bromoacetamide and 1 ml. of 1.5 N-perchloric acid. Allow the mixture to stand for 2 hours then add a solution of 0.2 g. of sodium sulfite in 2 ml. of water. Extract the reaction mixture with methylene chloride and wash the combined organic extracts with water then dry ovre magnesium sulfate and evaporate to a residue comprising 6β-azido-7α,11β,17α,21-tetrahydroxy-9α-bromo-4-pregnene-3,20-dione 7,21-diacetate. Purify by crystallization from acetone.

(E) 6β-azido-7α,11β,17α,21 - trihydroxy - 9β,11β-oxido-4-pregnene-3,20-dione 7,21-diacetate.—To 0.25 g. of 6β-azido-7α,11β,17α,21-tetrahydroxy - 9α-bromo-4-pregnene-3,20-dione 7,21-diacetate in 30 ml. of acetone add 0.3 g. of potassium acetate. Heat the reaction mixture at reflux temperature for 6 hours then distill the acetone and add water to the resultant residue. Filter the solid which separates and crystallize the solid from methanol-water to give 6β-azido-7α,17α,21-trihydroxy - 9β,11β-oxido-4-pregnene-3,20-dione 7,21-diacetate.

(F) 6β-azido-7α,11β,17α,21 - tetrahydroxy-9α-fluoro-4-pregnene-3,20-dione 7,21-diacetate.—To 3.5 g. of hydrogen fluoride in 20 ml. of chloroform and 0.6 ml. of tetrahydrofuran at −10° C. add 1.0 g. of 6β-azido-7α,17α,21-trihydroxy-9β,11β-oxido - 4-pregnene-3,20-dione 7,21-diacetate. Keep the reaction mixture at −10° C. for 3 hours, then pour into aqueous sodium carbonate solution. Separate the organic solvent layer from the water and evaporate the organic solvent to a residue comprising 6β-azido-7α,11β,17α,21 - tetrahydroxy-9α - fluoro-4-pregnene-3,20-dione 7,21-diacetate. Purify by crystallization from methanol.

In a similar manner the 9α-chloro analog of the 9α-fluoro derivative of Example 9(F) is prepared as described in the following Example 9(G).

(G) 6β-azido-7α,11β,17α,21-tetrahydroxy-9α - chloro-4-pregnene-3,20-dione 7,21-diacetate.—Dissolve 0.2 g. of 6β-azido-7α,17α,21-trihydroxy-9β,11β-oxido - 4 - pregnene-3,20-dione 7,21-diacetate in 30 ml. of alcohol-free chloroform and cool the solution to 0° C. Saturate the solution at 0° C. with anhydrous hydrogen chloride and allow the reaction mixture to stand for 6 hours at 0° C. Distill the solvent in vacuo to a residue comprising 6β-azido-7α,11β,17α,21-tetrahydroxy-9α-chloro - 4 - pregnene-3,20-dione 7,21-diacetate. Purify by crystallization from acetone.

EXAMPLE 10

6-azido-9α-halogeno - 4,6 - pregnadiene-11β,17α,21-triol-3,20-dione 21-acetate (6-azido-9α-halogeno-6-dehydrohydrocortisone 21-acetate)

In a manner similar to that described in Example 1 (C)(2) treat each of

6β-azido-7α,11β,17α,21-tetrahydroxy-9α-fluoro-4-pregnene-3,20-dione,21-diacetate,
6β-azido-7α,11β,17α,21-tetrahydroxy-9α-chloro-4-pregnene-3,20-dione 7,21-diacetate, and
6β-azido-7α,11β,17α,21-tetrahydroxy-9α-bromo-4-pregnene-3,20-dione 7,21-diacetate with tetramethylammonium fluoride in acetonitrile. Isolate and purify the resultant respective products in a manner similar to that described in Example 1(C)(2) to obtain respectively, 6-azido-9α-fluoro-4,6-pregnadiene-11β,17α,21-triol-3,20-dione 21-acetate,
6-azido-9α-chloro-4,6-pregnadiene-11β,17α,21-triol-3,20-dione 21-acetate, and
6-azido-9α-bromo-4,6-pregnadiene-11β,17α,21-triol-3,20-dione 21-acetate.

EXAMPLE 11

6-azido-9α-halogeno - 4,6 - pregnadiene-17α,21-diol-3,11,20-Trione 21-Acetate (6-Azido-9α-Halogeno-6-Dehyrocortisone 21-acetate)

(A) 6α,7α-oxido-9α-fluoro-4-pregnene-17α,21-diol-3,11,20-trione 21-acetate

In a manner similar to that described in Example 2(A)(1) treat 9α-fluoro-4,6-pregnadiene-17α,21-diol-3,11,20-trione-21-acetate with m-chloroperbenzoic acid in acetone at reflux temperature. Isolate and purify the resultant product in a manner similar to that described to obtain 6α,7α-oxido-9α-halogeno-4,6-pregnadiene-17α,21-diol-3,11,20-trione 21-acetate.

Alternatively the compound of this example is prepared in a manner similar to that described in Example 2(A)(2), i.e. by treating 9α-fluoro-4,6-pregnadiene-17α,21-diol-3,11,20-trione 21-acetone with excess monoperphthalic acid in chloroform at room temperature for 60 hours. Isolate and purify the resultant product in a manner similar to that described in Example 2(A)(1) to obtain 6α,7α-oxido-9α-fluoro-4-pregnene-17α,21-diol-3,11,20-trione 21-acetate.

(B) 6β-azido-7α,17α,21-triol-9α-fluoro-4-pregnene-3,11,20-trione 21-acetate

In a manner similar to that described in Example 1(A), treat a solution of 6α,7α-oxido-9α-fluoro-4-pregnene-17α,21-diol-3,11,20-trione 21-acetate in dioxane and methanol with a solution of sodium azide in dilute acetate acid. Isolate and purify the resultant product in a manner similar to that described to obtain 6β-azido-7α,17α,21-triol-9α-fluoro-4-pregnene-3,11,20-trione 21-acetate.

(C) 6β-azido-7α,17α,21-triol-9α-fluoro-4-pregnene-3,11,20-trione 7,21-diacetate (1) In a manner similar to that described in Example 1(B) treat 6β-azido-7α,17α,21-trihydroxy - 9α - fluoro-4-pregnene-3,11,20-trione 21-acetate with acetic anhydride in pyridine. Isolate and purify the resultant product in a manner similar to that described in Example 1(C) to obtain 6β-azido-7α,17α,21-trihydroxy-9α-fluoro-4-pregnene-3,11,20-trione 7,21-diacetate.

(2) Alternatively the compound of this example is prepared as follows:

To 0.5 g. of 6β-azido-7α,11β,17α,21-tetrahydroxy-9α-fluoro-4-pregnene-3,20-dione 7,21-diacetate in 15 ml. of acetic acid add a solution of 60 mg. of chromium trioxide in 1 ml. of water and 3 ml. acetic acid. Allow the mixture to stand at room temperature for 6 hours then add water and extract the mixture with methylene chloride. Wash the combined organic extracts with water, dry over magnesium sulfate, filter and evaporate to a residue comprising 6β-azido-7α,17α,21-triol-9α-fluoro-4-pregnene-3,11,20-trione 7,21-diacetate. Purify by crystallization from methanol.

(D) 6β-azido-7α,17α,21-trihydroxy-9α-chloro-4-pregnene-3,11,20-trione 7,21-diacetate 6β-azido-7α,17α,21-trihydroxy-9α-bromo - 4 - pregnene-3,11,20-trione 7,21-diacetate.—In a manner similar to that described in Example 11(C)(2) treat each of 6β-azido-7α,11β,17α,21-tetrahydroxy-9α-chloro - 4 - pregnene-3, 20-dione 7,21-diacetate and 6β-azido-7α,11β,17α,21-tetrahydroxy-9α-bromo-4-pregnene-3,20-dione 7,21 - diacetate with chromium trioxide in aqueous acetic acid. Isolate and purify the resultant products in a manner similar to that described in Example 11(C)(2) to obtain, respectively, 6β-azido-7α,17α,21-trihydroxy-9α-chloro-4-pregnene-3,11,20-trione 7,21-diacetate and
6β-azido-7α,17α,21-trihydroxy-9α-bromo-4-pregnene-3,11,20-trione 7,21-diacetate.

(E) 6-azido-9α-halogeno-4,6-pregnadiene-17α,21-diol-3,11,20-trione 21-acetate

In a manner similar to that described in Example 1(C)(2) treat each of 6β-azido-7α,17α,21-trihydroxy-9α-fluoro-4-pregnene-3,11,20-trione 7,21 - diacetate, 6β-azido-7α,17α,21-trihydroxy-9α-chloro - 4 - pregnene-3,11, 20-trione 7,21-diacetate and 6β-azido-7α,17α,21-trihydroxy-9α-bromo-4-pregnene-3,11,20-trione 7,21-diacetate with tetramethylammonium fluoride in acetonitrile. Isolate and purify the resultant products in a manner similar to that described in Example 1(C)(2) to obtain respectively, 6-azido-9α-fluoro-4,6-pregnadiene-17α,21-diol-3,11,20-trione 21-acetate,
6-azido-9α-chloro-4,6-pregnadiene-17α,21-diol-3,11,20-trione 21-acetate, and
6-azido-9α-bromo-4,6-pregnadiene-17α,21-diol-3,11,20-trione 21-acetate.

EXAMPLE 12

11-Substituted-6-Azido-16-Lower Alkyl-4,6-Pregnadiene-17α,21-Diol-3,20-Dione 21-Lower Alkanoates (A) 11-substituted-16-lower alkyl-4,6-pregnadiene-17α,21-diol-3,20-dione 21-lower alkanoates (1) To 2.5 g. of 16β-methyl-4-pregnene-17α,21-diol-3,11,20-trione 21-acetate add 5 g. of chloranil in 100 ml. of tert.-butanol-dioxane (4:1). Heat the reaction mixture at reflux temperature for 13 hours under an atmosphere of nitrogen. Evaporate the reaction mixture to a residue and extract the residue with ethyl acetate. Wash the combined organic extract with cold 7% aqueous sodium hydroxide, then with water, dry over magnesium sulfate, filter and evaporate to a residue comprising 16β-methyl-4,6-pregnadiene-17α,21-diol-3,11,20-trione 21 - acetate. Purify by crystallization from acetone-hexane.

(2) Alternatively the compound of this example is prepared by adding 10.2 g. of dichlorodicyanobenzoquinone to 12 g. of 16β-methyl-4-pregnene-17α,21-diol-3,11,20-trione 21-acetate in 600 ml. of dioxane then bubbling in anhydrous hydrogen chloride for five minutes with stirring. Continue stirring at ambient temperature for 2.5 hours. Filter the reaction mixture and evaporate in vacuo to a residue comprising 16β-methyl-4,6-pregnadiene-17α,21-diol-3,11,20-trione 21-acetate. Purify by dissolving in ethyl acetate, washing the ethyl acetate solution with dilute sodium hydroxide, then water. Dry the organic solution over magnesium sulfate and evaporate in vacuo to a residue. Crystallize the residue in acetone-hexane to give 16β-methyl-4,6-pregnadiene-17α,21-diol-3,11,20-trione 21-acetate.

(3) In a manner similar to that described in paragraph 12(A)(2) hereinabove, treat each of the following 16-lower alkyl-4-pregnenes with dichlorodicyanobenzoquinone in dioxane.

16α-methyl-4-pregnene-17α,21-diol-3,11,20-trione 21-acetate,
16β-methyl-4-pregnene-11β,17α,21-triol-3,20-dione 21-acetate,
16α-methyl-4-pregnene-11β,17α,21-triol-3,20-dione 21-acetate,
16α-n-butyl-4-pregnene-17α,21-diol-3,11,20-trione 21-acetate,
16α-n-butyl-4,6-pregnadiene-17α,21-diol-3,11,20-trione 21-propionate,
16β-n-butyl-4-pregnene-17α,21-diol-3,11,20-trione 21-acetate,
9α-bromo-16β-methyl-4-pregnene-11β,17α,21-triol-3,20-dione 21-acetate,
9α-chloro-16β-methyl-4-pregnene-11β,17α,21-triol-3,20-dione 21-acetate,
9α-fluoro-16β-methyl-4-pregnene-11β,17α,21-triol-3,20-dione 21-acetate,
9α-bromo-16α-methyl-4-pregnene-11β,17α,21-triol-3,20-dione 21-acetate,
9α-chloro-16α-methyl-4-pregnene-11β,17α,21-triol-3,20-dione 21-acetate,
9α-fluoro-16α-methyl-4-pregnene-11β,17α,21-triol-3,20-dione 21-acetate,
9α-bromo-16α-methyl-4-pregnene-11β,17α,21-triol-3,20-dione 21-acetate,
9α-chloro-16α-methyl-4-pregnene-11β,17α,21-triol-3,20-dione 21-acetate,
9α-fluoro-16α-methyl-4-pregnene-11β,17α,21-triol-3,20-dione 21-acetate,
9α-bromo-16α-methyl-4-pregnene-17α,21-diol-3,11,20-trione 21-acetate,
9α-chloro-16α-methyl-4-pregnene-17α,21-diol-3,11,20-trione 21-acetate,
9α-fluoro-16α-methyl-4-pregnene-17α,21-diol-3,11,20-trione 21-acetate,
16α-ethyl-4-pregnene-17α,21-diol-3,11,20-trione 21-acetate,
16α-ethyl-4-pregnene-11β,17α,21-triol-3,20-dione 21-acetate,
9α,11β-dichloro-16β-methyl-4-pregnene-17α,21-diol-3,20-dione 21-acetate,
9α-chloro-11β-fluoro-16β-methyl-4-pregnene-17α,21-diol-3,20-dione 21-acetate,
9α,11β-dichloro-16α-methyl-4-pregnene-17α,21-diol-3,20-dione 21-acetate, and
9α,11β-dichloro-16α-ethyl-4-pregnene-17α,21-diol-3,20-dione 21-acetate.

Isolate and purify the resultant respective products in a manner similar to that described in Example 12(A)(2) hereinabove to obtain respectively, 16α-methyl-4,6-pregnadiene-17α,21-diol-3,11,20-trione 21-acetate,
16β-methyl-4,6-pregnadiene-11β,17α,21-triol-3,20-dione 21-acetate,
16α-methyl-4,6-pregnadiene-11β,17α,21-triol-3,20-dione 21-acetate,
16α-n-butyl-4,6-pregnadiene-17α,21-diol-3,11,20-trione 21-acetate,
16α-n-butyl-4,6-pregnadiene-17α,21-diol-3,11,20-dione 21-propionate,
16β-n-butyl-4,6-pregnadiene-17α,21-diol-3,11,20-trione 21-acetate,
9α-bromo-16β-methyl-4,6-pregnadiene-11β,17α,21-triol-3,20-dione 21-acetate,
9α-chloro-16β-methyl-4,6-pregnadiene-11β,17α,21-triol-3,20-dione 21-acetate,
9α-fluoro-16β-methyl-4,6-pregnadiene-11β,17α,21-triol-3,20-dione 21-acetate,
9α-bromo-16α-methyl-4,6-pregnadiene-11β,17α,21-triol-3,20-dione 21-acetate,
9α-chloro-16α-methyl-4,6-pregnadiene-11β,17α,21-triol-3,20-dione 21-acetate,
9α-fluoro-16α-methyl-4,6-pregnadiene-11β,17α,21-triol-3,20-dione 21-acetate,
9α-bromo-16α-methyl-4,6-pregnadiene-17α,21-diol-3,11,20-trione 21-acetate,
9α-chloro-16α-methyl-4,6-pregnadiene-17α,21-diol-3,11,20-trione 21-acetate,
9α-fluoro-16α-methyl-4,6-pregnadiene-17α,21-diol-3,11,20-trione 21-acetate,
16α-ethyl-4,6-pregnadiene-17α,21-diol-3,11,20-trione 21-acetate,
16α-ethyl-4,6-pregnadiene-11β,17α,21-triol-3,20-dione 21-acetate,
9α,11β-dichloro-16β-methyl-4,6-pregnadiene-17α,21-diol-3,20-dione 21-acetate,
9α-chloro-11β-fluoro-16β-methyl-4,6-pregnadiene-17α,21-diol-3,20-dione 21-acetate,
9α-bromo-11β-chloro-16β-methyl-4,6-pregnadiene-17α,21-diol-3,20-dione 21-acetate,
9α,11β-dichloro-16α-methyl-4,6-pregnadiene-17α,21-diol-3,20-dione 21-acetate, and
9α,11β-dichloro-16α-ethyl-4,6-pregnadiene-17α,21-diol-3,20-dione 21-acetate.

(B) 11-substituted-6α,7α-oxido-16-lower alkyl-4-pregnene-17α,21-diol-3,20-dione 21-lower alkanoates In a manner similar to that described in Example 2(A)(2) treat each of the 11-substituted-16-lower alkyl-4,6-pregnadienes prepared as described in Examples 12(A)(1) and 12(A)(3) with monoperphthalic acid in chloroform. Isolate and purify the resultant respective products in a manner similar to that described in Example 2(A)(2) to obtain, respectively:

6α,7α-oxido-16β-methyl-4-pregnene-17α,21-diol-3,11,20-trione 21-acetate,
6α,7α-oxido-16α-methyl-4-pregnene-17α,21-diol-3,11,20-trione 21-acetate,
6α,7α-oxido-16β-methyl-4-pregnene-11β,17α,21-triol-3,20-dione 21-acetate,
6α,7α-oxido-16α-methyl-4-pregnene-11β,11α,21-triol-3,20-dione 21-acetate,
6α,7α-oxido-16α-n-butyl-4-pregnene-17α,21-diol-3,11,20-trione 21-acetate,
6α,7α-oxido-16α-n-butyl-4-pregnene-17α,21-diol-3,11,20-trione 21-propionate,
6α,7α-oxido-16β-n-butyl-4-pregnene-17α,21-diol-3,11,20-trione 21-acetate,
6α,7α-oxido-9α-bromo-16β-methyl-4-pregnene-11β,17α,21-triol-3,20-dione 21-acetate,
6α,7α-oxido-9α-chloro-16β-methyl-4-pregnene-11β,17α,21-triol-3,20-dione 21-acetate, 6α,7α-oxido-9α-fluoro-16β-methyl-4-pregnene-11β,17α,
21-triol-3,20-dione 21-acetate,
6α,7α-oxido-9-bromo-16-α-methyl-4-pregnene-11β,17α,
21-triol-3,20-dione 21-acetate
6α,7α-oxido-9α-chloro-16α-methyl-4-pregnene-11β-17α,
21-triol-3,20-dione 21-acetate,
6α,7α-oxido-9α-fluoro-16α-methyl-4-pregnene-11β,17α,
21-triol-3,20-dione 21-acetate,
6α,7α-oxido-9α-bromo-16α-methyl-4-pregnene-17α,21-
diol-3,11,20-trione 21-acetate
6α,7α-oxido-9α-chloro-16α-methyl-4-pregnene-17α,21-
diol-3,11,20-trione 21-acetate,
6α,7α-oxido-9α-fluoro-16α-methyl-4-pregnene-17α,21-
diol-3,11,20-trione 21-acetate,
6α,7α-oxido-16α-ethyl-4-pregnene-17α,21-diol-3,11,20-
trione 21-acetate,
6α,7α-oxido-16α-ethyl-4-pregnene-17α,21-diol-3,20-
dione 21-acetate,
6α,7α-oxido-9α,11β-dichloro-16β-methyl-4-pregnene-17α-
21-diol-3,20-dione 21-acetate,
6α,7α-oxido-9α-chloro-11β-fluoro-16β-methyl-4-preg-
nene-17α,21-diol-3,20-dione 21-acetate,
6α,7α-oxido-9α-bromo-11β-chloro-16β-methyl-4-preg-
nene-17α,21-diol-3,20-dione 21-acetate,
6α,7α-oxido-9α,11β-dichloro-16α-methyl-4-pregnene-
17α,21-diol-3,20-dione 21acetate, and
6α,7α-oxido-9α,11β-dichloro-16α-ethyl-pregnene-17α,
21-diol-3,20-dione 21-acetate.

(C) 11-substituted-6β-azido-7α-hydroxy-16-lower alkyl-4-
pregnene-17α,21-diol-3,20-dione 21-lower alkanoates In a manner similar to that described in Example
1(A)(1) treat each of the 11-substituted-6α,7α-oxido-16-
lower alkyl-4-pregnene-17α,21-diol-3,20-dione 21 - lower
alkanoates prepared as described in Example 12(B) with
sodium azide in aqueous acetic acid at room temperature.
Isolate and purify the resultant respective products in a
manner similar to that described in Example 1(A)(1) to
obtain, respectively:

6β-azido-7α,17α,21-trihydroxy-16β-methyl-4-pregnene-
3,11,20-trione 21-acetate,
6β-azido-7α,17α,21-trihydroxy-16α-methyl-4-pregnene-
3,11,20-trione 21-acetate,
6β-azido-7α,11β,17α,21-tetrahydroxy-16β-methyl-4-preg-
nene-3,20-dione 21-acetate,
6β-azido-7α,11β,17α,21-tetrahydroxy-16α-methyl-4-preg-
nene-3,20-dione 21-acetate,
6β-azido-7α,17α,21-trihydroxy-16α-n-butyl-4-pregnene-
3,11,20-trione 21-acetate,
6β-azido-7α,17α,21-trihydroxy-16α-n-butyl-4-pregnene-
3,11,20-trione 21-propionate,
6β-azido-7α,17α,21-trihydroxy-16β-n-butyl-4-pregnene-
3,11,20-trione 21-acetate,
6β-azido-7α,11β,17α,21-tetrahydroxy-9α-bromo-16β-
methyl-4-pregnene-3,20-dione 21-acetate,
6β-azido-7α,11β,17α,21-tetrahydroxy-9α-chloro-11β-
methyl-4-pregnene-3,20-dione 21-acetate,
6β-azido-7α,11β,17α,21-tetrahydroxy-9α-fluoro-16β-
methyl-4-pregnene-3,20-dione 21-acetate,
6β-azido-7α,11β,17α,21-tetrahydroxy-16α-methyl-4-preg-
nene-3,20-dione 21-acetate,
6β-azido-7α,11β,17α,21-tetrahydroxy-9α-chloro-16α-
methyl-4-pregnene-3,20-dione 21-acetate,
6β-azido-7α,11β,17α,21-tetrahydroxy-9α-fluoro-16α-
methyl-4-pregnene-3,20-dione 21-acetate,
6β-azido-7α,17α,21-trihydroxy-9α-bromo-16α-methyl-4-
pregnene-3,11,20-trione 21-acetate,
6β-azido-7α,17α,21-triol-4-pregnene-3,11,20-trione
21-acetate,
6β-azido-7α,17α,21-trihydroxy-9α-fluoro-16α-methyl-4-
pregnene-3,11,20-trione 21-acetate,
6β-azido-7α,17α,21-trihydroxy-16α-ethyl-4-pregnene-
3,11,20-trione 21-acetate,
6β-azido-7α,11β,17α,21-tetrahydroxy-16α-ethyl-4-
pregnene-3,20-dione 21-acetate,
6β-azido-7α,17α,21-trihydroxy-9α,11β-dichloro-16β-
methyl-4-pregnene-3,20-dione 21-acetate,
6β-azido-7α,17α,21-trihydroxy-9α-chloro-11β-fluoro-16β-
methyl-4-pregnene-3,20-dione 21-acetate,
6β-azido-7α,17α,21-trihydroxy-9α-bromo-11β-chloro-16β-
methyl-4-pregnene-3,20-dione 21-acetate,
6β-azido-7α,17α,21-trihydroxy-9α,11β-dichloro-16α-
methyl-4-pregnene-3,20-dione 21-acetate, and
6β-azido-7α,17α,21-trihydroxy-9α,11β-dichloro-16α-
ethyl-4-pregnene-3,20-dione 21-acetate.

(D) 11-substituted-6β-azido-7α-acetoxy - 16 - lower alkyl-
4-pregnene-17α-,21-diol-3,20-dione 21-lower alkanoates In a manner similar to that described in Example 1(B)
treat each of the 6β-azido-7α-hydroxy-16-lower alkyl-4-
pregnenes prepared in Example 12(C) with acetic anhy-
dride in pyridine. Isolate and purify the resultant respec-
tive products in a manner similar to that described in
Example 1B to obtain the corresponding 7-acetate, namely 6β-azido-7α,17α,21-trihydroxy-16β-methyl-4-pregnene-
3,11,20-trione 7,21-diacetate,
6β-azido-7α,17α,21-trihydroxy-16α-methyl-4-pregnene-
3,11,20-trione 7,21-diacetate,
6β-azido-7α,11β,17α,21-tetrahydroxy-16β-methyl-4-
pregnene-3,20-dione 7,21-diacetate,
6β-azido-7α,11β,21-tetrahydroxy-16α-methyl-4-pregnene-
3,20-dione 7,21-diacetate,
6β-azido-7α,17α,21-trihydroxy-16α-n-butyl-4-pregnene-
3,11,20-trione 7,21-diacetate,
6β-azido-7α,17α,21-trihydroxy-16α-n-butyl-4-pregnene-
3,11,20-trione 7-acetate 21-propionate,
6β-azido-7α,17α,21-trihydroxy-16β-n-butyl-4-pregnene-
3,11,20-trione 7,21-diacetate,
6β-azido-7α,11β,17α,21-tetrahydroxy-9α-bromo-16β-
methyl-4-pregnene-3,20-dione 7,21-diacetate,
6β-azido-7α,11β,17α,21-tetrahydroxy-9α-chloro-11β-
methyl-4-pregnene-3,20-dione 7,21-diacetate,
6β-azido-7α,11β,17α,21-tetrahydroxy-9α-fluoro-16β-
methyl-4-pregnene-3,20-dione, 7,21-diacetate,
6β-azido-7α,11β,17α,21-tetrahydroxy-16α-methyl-4-
pregnene-3,20-dione 7,21-diacetate,
6β-azido-7α,11β,17α,21-tetrahydroxy-9α-chloro-16α-
methyl-4-pregnene-3,20-dione 7,21-diacetate,
6β-azido-7α,11β,17α,21-tetrahydroxy-9α-fluoro-16α-
methyl-4-pregnene-3,20-dione 7,21diacetate,
6β-azido-7α,17α,21-trihydroxy-9α-bromo-16α-methyl-4-
pregnene-3,11,20-trione 7,21-diacetate,
6β-azido-7α,17α,21-triol-4-pregnene-3,11,20-trione 7,21-
diacetate,
6β-azido-7α,17α,21-trihydroxy-9α-fluoro-16α-methyl-4-
pregnene-3,11,20-trione 7,21-diacetate,
6β-azido-7α,17α,21-trihydroxy-16α-ethyl-4-pregnene-3,
11,20-trione 7,21-diacetate,
6β-azido-7α,11β,17α,21-tetrahydroxy-16α-ethyl-4-
pregnene-3,20-dione 7,21-diacetate,
6β-azido-7α, 17α,21-trihydroxy-9α,11β-dichloro-16β-
methyl-4-pregnene-3,20-dione 7,21-diacetate,
6β-azido-7α,17α,21-trihydroxy-9α-chloro-11β-fluoro-16β-
methyl-4-pregnene-3,20-dione 7,21-diacetate,
6β-azido-7α,17α,21-trihydroxy-9α-bromo-11β-chloro-
16β-methyl-4-pregnene-3,20-dione 7,21-diacetate,
6β-azido-7α,17α,21-trihydroxy-9α,11β-dichloro-16α-
methyl-4-pregnene-3,20-dione 7,21-diacetate, and
6β-azido-7α,17α,21-trihydroxy-9α,11β-dichloro-16α-ethyl-
4-pregnene-3,20-dione 7,21-diacetate, respectively.

(E) 11-substituted - 6 - azido-16-lower alkyl-4,6-pregna-
diene-17α,21-diol-3,20-dione 21-lower alkanoates In a manner similar to that described in Example
1(C)(2) treat each of the 6β-azido-7α-acetoxy-16-lower
alkyl-4-pregnenes prepared in Example 12(D) with tetra-
methylammonium fluoride in acetonitrile. Isolate and pur-
ify the resultant respective products in a manner similar
to that described in Example 1(C)(2) to obtain respec-
tively, 6-azido-16β-methyl-4,6-pregnadiene-17α,21-diol-3,11,20-trione 21-acetate,
6-azido-16α-methyl-4,6-pregnadiene-17α,21-diol-3,11,20-trione 21-acetate,
6-azido-16β-methyl-4,6-pregnadiene-11β,17α,21-triol-3,20-dione 21-acetate,
6-azido-16α-methyl-4,6-pregnadiene-11β,17α,21-triol-3,20-dione 21-acetate,
6-azido-16α-n-butyl-4,6-pregnadiene-17α,21-diol-3,11,20-trione 21-acetate,
6-azido-16α-n-butyl-4,6-pregnadiene-17α,21-diol-3,11,20-trione 21-propionate,
6-azido-16β-n-butyl-4,6-pregnadiene-17α,21-diol-3,11,20-trione 21-acetate,
6-azido-9α-bromo-16β-methyl-4,6-pregnadiene-11β,17α,21-triol-3,20-dione 21-acetate,
6-azido-9α-chloro-16β-methyl-4,6-pregnadiene-11β,17α,21-triol-3,20-dione 21-acetate,
6-azido-9α-fluoro-16β-methyl-4,6-pregnadiene-11β,17α,21-triol-3,20-dione 21-acetate,
6-azido-9α-bromo-16α-methyl-4,6-pregnadiene-11β,17α,21-triol-3,20-dione 21-acetate,
6-azido-9α-chloro-16α-methyl-4,6-pregnadiene-11β,17α,21-triol-3,20-dione 21-acetate,
6-azido-9α-fluoro-16α-methyl-4,6-pregnadiene-11β,17α,21-triol-3,20-dione 21-acetate,
6-azido-9α-bromo-16α-methyl-4,6-pregnadiene-17α,21-diol-3,11,20-trione 21-acetate,
6-azido-9α-chloro-16α-methyl-4,6-pregnadiene-17α,21-diol-3,11,20-trione 21-acetate,
6-azido-9α-fluoro-16α-methyl-4,6-pregnadiene-17α,21-diol-3,11,20-trione 21-acetate,
6-azido-16α-ethyl-4,6-pregnadiene-17α,21-diol-3,11,20-trione 21-acetate,
6-azido-16α-ethyl-4,6-pregnadiene-11β,17α,21-triol-3,20-dione 21-acetate,
6-azido-9α,11β-dichloro-16β-methyl-4,6-pregnadiene-17α,21-diol-3,20-dione 21-acetate,
6-azido-9α-chloro-11β-fluoro-16β-methyl-4,6-pregnadiene-17α,21-diol-3,20-dione 21-acetate,
6-azido-9α-bromo-11β-chloro-16β-methyl-4,6-pregnadiene-3,20-dione 21-acetate,
6-azido-9α,11β-dichloro-16α-methyl-4,6-pregnadiene-17α,21-diol-3,20-dione 21-acetate,
6-azido-9α,11β-dichloro-16α-ethyl-4,6-pregnadiene-17α,21-diol-3,20-dione 21-acetate.

EXAMPLE 13

11-substituted-6-azido-16-lower alkylidene-4,6-pregnadiene-17α,21-diol-3,20-dione 21-lower alkanoates (A) 11-substituted - 16 - lower alkylidene-4,6-pregnadiene-17α,21-diol-3,20-dione 21-lower alkanoates.—In a manner similar to that described in Example 12(A)(2) treat each of the following 16-lower alkylidene-4-pregnenes with dichlorodicyanobenzoquinone in dioxane:

16-methylene-4-pregnene-17α,21-diol-3,11-20-trione 21-acetate,
16-methylene-4-pregnene-11β,17α,21-triol-3,20-dione 21-acetate,
9α-fluoro-16-methylene-4-pregnene-11β,17α,21-triol-3,20 dione 21-acetate,
9α-chloro-16-methylene-4-pregnene-11β,17α,21-triol-3,20-dione 21-acetate,
9α-bromo-16-methylene-4-pregnene-11β,17α,21-triol-3,20-dione 21-acetate,
9α-fluoro-16-methylene-4-pregnene-17α,21-diol-3,20-trione 21-acetate,
9α-chloro-16-methylene-4-pregnene-17α,21-diol-3,20-trione 21-acetate,
9α-bromo-16-methylene-4-pregnene-17α,21-diol-3,11,20-21-acetate,
9α-fluoro-16-methylene-4-pregnene-11β,1α,21-triol-3,20-dione 21-tert.-butyl acetate,
16-methylene-4-pregnene-11β,17α,21-triol-3,20-dione 21-tert.-butyl acetate,
16-methylene-4-pregnene-17α,21-diol-3,11,20-trione 21-tert.-butyl acetate,
9α-fluoro-16-methylene-4-pregnene-17α,21-diol-3,11,20-trione 21-tert.-butyl acetate,
16-methylene-4-pregnene-17α,21-diol-3,11,20-trione 21-propionate,
9α,11β-dichloro-16-methylene-4-pregnene-17α,21-diol-3,20-dione 21-acetate, and
16-ethylidene-4-pregnene-17α,21-diol-3,11,20-trione 21-acetate.

Isolate and purify each of the resultant respect products in a manner similar to that described in Example 12(A)(2) to obtain, respectively, 16-methylenne-4,6-pregnadiene-17α,21-diol-3,11,20-trione 21-acetate,
16-methylene-4,6-pregnadiene-11β,17α,21-triol-3,20-dione 21-acetate,
9α-fluoro-16-methylene-4,6-pregnadiene-11β,17α,21-triol-3,20-dione 21-acetate,
9α-chloro-16-methylene-4,6-pregnadiene-11β,17α,21-triol-3,20-dione 21-acetate,
9α-bromo-16-methylene-4,6-pregnadiene-11β,17α,21-triol-3,20-dione 21-acetate,
9α-fluoro-16-methylene-4,6-pregnadiene-17α,21-diol-3,11,20-trione 21-acetate,
9α-chloro-16-methylene-4,6-pregndiene-17α,21-diol-3,11,20-trione 21-acetate,
9α-bromo-16-methylene-4,6-pregnadiene-17α,21-diol-3,11,20-trione 21-acetate,
9α-fluoro-16-methylene-4,6-pregnadiene-11β,17α,21-triol-3,20-dione 21-tert.-butyl acetate;
16-methylene-4,6-pregnadiene-11β,17α,21-triol-3,20-dione 21-tert.-butyl acetate,
16-methylene-4,6-pregnadiene-17α,21-diol-3,11,20-trione 21-tert.-butyl acetate,
9α-fluoro-16-methylene-4,6-pregnadiene-17α,21-diol-3,11,20-trione 21-tert.-butyl acetate,
16-methylene-4,6-pregnadiene-17α,21-diol-3,11,20-trione 21-propionate,
9α,11β-dichloro-16-methylene-4,6-pregnadiene-17α,21-diol-3,20-dione 21-acetate, and
16-ethylidene-4,6-pregnadiene-17α,21-diol-3,11,20-trione 21-acetate.

(B) 11 - substituted-6α,7α-oxido-16-lower alkylidene-4-pregnene-17α,21-diol-3,20-dione 21-lower alkanoates.—In a manner similar to that described in Example 2(A)(2) treat each of the 16-lower alkylidene-4,6-pregnadienes prepared in Example 13(A) with monoperphthalic acid per 5 millimoles of steroid in 200 ml. chloroform. Isolate and purify the resultant respective products in a manner similar to that described in Example 2(A)(2) to obtain, respectively 6α,7α-oxido-16-methylene-4-pregnene-11β,1α,21-diol-3,11,20-trione 21-acetate,
6α,7α-oxido-16-methylene-4-pregnene-11β,17α,21-triol-3,20-dione 21-acetate,
6α,7α-oxido-9α-fluoro-16-methylene-4-pregnene-11β,17α,21-triol-3,20-dione 21-acetate,
6α,7α-oxide-9α-chloro-16-methylene-4-pregnene-11β,17α,21-triol-3,20-dione 21-acetate,
6α,7α-oxido-9α-bromo-16-methylene-4-pregnene-11β,17α,21-triol-3,20-dione 21-acetate,
6α,7α-oxido-9α-fluoro-16-methylene-4-pregnene-17α,21-diol-3,11,20-trione 21-acetate,
6α,7α-oxido-9α-chloro-16-methylene-4-pregnene-17α,21-diol-3,11,20-trione 21-acetate,
6α,7α-oxido-9α-bromo-16-methylene-4-pregnene-17α,21-diol-3,11,20-trione 21-acetate,
6α,7α-oxido-9α-fluoro-16-methylene-4-pregnene-11β,17α,21-triol-3-20-dione 21-tert.-butyl acetate, 6α,7α-oxido-16-methylene-4-pregnene-11β,17α,21-triol-
  3,20-dione 21-tert.-butyl acetate,
6α,7α-oxido-16-methylene-4-pregnene-17α,21-diol-
  3,11,20-trione 21-tert.-butyl acetate,
6α,7α-oxido-9α-fluoro-16-methylene-4-pregnene-17α,21-
  diol-3,11,20-trione 21-tert.-butyl acetate,
6α,7α-oxido-16-methylene-4-pregnene-17α,21-diol-
  3,11,20-trione 21-propionate,
6α,7α-oxido-9α,11β-dichloro-16-methylene-4-pregnene-
  17α,21-diol-3,20-dione 21-acetate, and
6α,7α-oxido-16-ethylidene-4-pregnane-17α,21-diol-
  3,11,20-trione 21-acetate.

(C) 11-substituted-6-azido - 7α,17α,21 - trihydroxy-16-lower alkylidene-4-pregnene-3,20-dione 21-lower alkanoates.—In a manner similar to that described in Example 1(A) treat each of the 6α,7α-oxido-16-lower alkylidene-4-pregnenes prepared in Example 13(B) with sodium azide in dilute acetic acid. Isolate and purify the resultant respective products in a manner similar to that described in Example 1(A) to obtain, respectively, 6β-azido-7α,17α,21-trihydroxy-16-methylene-4-pregnene
  3,11,20-trione 21-acetate,
6β-azido-7α,11β,17α,21-tetrahydroxy-16-methylene-4-
  pregnene-3,20-dione 21-acetate,
6β-azido-7α,11β-17α,21-tetrahydroxy-9α-fluoro-16-
  methylene-4-pregnene-3,20-dione 21-acetate,
6β-azido-7α,11β,17α,21-tetrahydroxy-9α-chloro-16-
  methylene-4-pregnene-3,20-dione 21-acetate,
6β-azido-7α,11β,17α,21-tetrahydroxy-9α-bromo-16-
  methylene-4-pregnene-3,20-dione 21-acetate,
6β-azido-7α,17α,21-trihydroxy-9α-fluoro-16-methylene-4-
  pregnene-3,11,20-trione 21-acetate,
6β-azido-7α,17α,21-trihydroxy-9α-chloro-16-methylene-4-
  pregnene-3,11,20-trione 21-acetate,
6β-azido-7α,17α,21-trihydroxy-9α-bromo-16-methylene-4-
  pregnene-3,11,20-trione 21-acetate,
6β-azido-7α,11β,17α,21-tetrahydroxy-9α-fluoro-16-
  methylene-4-pregnene-3,20-dione 21-tert.-butyl acetate,
6β-azido-7α,11β,17α,21-tetrahydroxy-16-methylene-4-
  pregnene-3,20-dione 21-tert.-butyl acetate,
6β-azido-7α,17α,21-trihydroxy-16-methylene-4-pregnene-
  3,11,20-trione 21-tert.-butyl acetate,
6β-azido-7α,17α,21-trihydroxy-9α-fluoro-16-methylene-4-
  pregnene-3,11,20-trione 21-tert.-butyl acetate,
6β-azido-7α,17α,21-trihydroxy-16-methylene-4-pregnene-
  3,11,20-trione 21-propionate,
6β-azido-7α,17α,21-trihydroxy-9α,11β-dichloro-16-
  methylene-4-pregnene-3,20-dione 21-acetate, and
6β-azido-7α,17α,21-trihydroxy-16-ethylidene-4-pregnene-
  3,11,20-trione 21-acetate.

(D) 11 - substituted - 6β - azido-7α,17α,21-trihydroxy-16-lower alkylidene-4-pregnene-3,20-dione 7-acetate 21-lower alkanoate.—In a manner similar to that described in Example 1(B) treat each of the 6β-azido-7α-hydroxy-16-lower alkylidene-4-pregnenes prepared in Example 13(C) with acetic anhydride in pyridine. Isolate and purify the resultant respective products in a manner similar to that described in Example 1(B) to obtain the corresponding 7-acetate esters.

6β-azido-7α,17α,21-trihydroxy-16-methylene-4-pregnene-
  3,11,20-trione 7,21-diacetate,
6β-azido-7α,11β,17α,21-tetrahydroxy-16-methylene-4-
  pregnene-3,20-dione 7,21-diacetate,
6β-azido-7α,11β,17α,21-tetrahydroxy-9α-fluoro-16-
  methylene-4-pregnene-3,20-dione 7,21-diacetate,
6β-azido-7α,11β,17α,21-tetrahydroxy-9α-chloro-16-
  methylene-4-pregnene-3,20-dione 7,21-diacetate,
6β-azido-7α,11β,17α,21-tetrahydroxy-9α-bromo-16-
  methylene-4-pregnene-3,20-dione 7,21-diacetate,
6β-azido-7α,17α,21-trihydroxy-9α-fluoro-16-methylene-4-
  pregnene-3,11,20-trione 7,21-diacetate,
6β-azido-7α,17α,21-trihydroxy-9α-chloro-16-methylene-4-
  pregnene-3,11,20-trione 7,21-diacetate,
6β-azido-7α,17α,21-trihydroxy-9α-bromo-16-methylene-
  4-pregnene-3,11,20-trione 7,21-diacetate,
6β-azido-7α,11β,17α,21-tetrahydroxy-9α-fluoro-16-
  methylene-4-pregnene-3,20-dione 7-acetate 21-tert.-butyl
  acetate,
6β-azido-7α,11β,17α,21-tetrahydroxy-16-methylene-4-
  pregnene-3,20-dione 7-acetate 21-tert.-butyl acetate,
6β-azido-7α,17α,21-trihydroxy-16-methylene-4-pregnene-
  3,11,20-trione 7-acetate 21-tert.-butyl acetate,
6β-azido-7α,17α,21-trihydroxy-9α-fluoro-16-methylene-4-
  pregnene-3,11,20-trione 7-acetate 21-tert.-butyl acetate,
6β-azido-7α,17α,21-trihydroxy-16-methylene-4-pregnene-
  3,11,20-trione 7-acetate 21-propionate,
6β-azido-7α,17α,21-trihydroxy-9α,11β-dichloro-16-
  methylene-4-pregnene-3,20-dione 7,21-diacetate, and
6β-azido-7α,17α,21-trihydroxy-16-ethylidene-4-pregnene-
  3,11,20-trione 7,21-diacetate.

(E) 11-substituted-6-azido - 16 - lower alkylidene-4,6-pregnadiene-17α,21-diol-3,20-dione 21-lower alkanoates.—In a manner similar to that described in Example 1(C)(2) treat each of the 6β-azido-7α-acetoxy-16-lower alkylidene-4-pregnenes prepared in Example 13(D) with tetramethylammonium fluoride in acetonitrile. Isolate and purify the resultant respective 6-azido-16-lower alkylidene-4,6-pregnadiene products, i.e.

6-azido-16-methylene-4,6-pregnadiene-17α,21-diol-
  3,11,20-trione 21-acetate,
6-azido-16-methylene-4,6-pregnadiene-11β,17α,21-triol-
  3,20-dione 21-acetate,
6-azido-9α-fluoro-16-methylene-4,6-pregnadiene-11β,17α,
  21-triol-3,20-dione 21-acetate,
6-azido-9α-chloro-16-methylene-4,6-pregnadiene-11β,17α,
  21-triol-3,20-dione 21-acetate,
6-azido-9α-bromo-16-methylene-4,6-pregnadiene-11β,17α,
  21-triol-3,20-dione 21-acetate,
6-azido-9α-fluoro-16-methylene-4,6-pregnadiene-17α,21-
  diol-3,11,20-trione 21-acetate,
6-azido-9α-chloro-16-methylene-4,6-pregnadiene-17α,21-
  diol-3,11,20-trione 21-acetate,
6-azido-9α-bromo-16-methylene-4,6-pregnadiene-17α,21-
  diol-3,11,20-trione 21-acetate,
6-azido-9α-fluoro-16-methylene-4,6-pregnadiene-11β,17α,
  21-triol-3,20-dione 21-tert.-butyl acetate,
6-azido-16-methylene-4,6-pregnadiene-11β,17α,21-triol-
  3,20-dione 21-tert.-butyl acetate,
6-azido-16-methylene-4,6-pregnadiene-17α,21-diol-3,11,
  20-trione 21-tert.-butyl acetate,
6-azido-9α-fluoro-16-methylene-4,6-pregnadiene-17α,21-
  diol-3,11,20-trione 21-tert.-butyl acetate,
6-azido-16-methylene-4,6-pregnadiene-17α,21-diol-
  3,11,20-trione 21-propionate,
6-azido-9α,11β-dichloro-16-methylene-4,6-pregnadiene-
  17α,21-diol-3,20-dione 21-acetate, and
6-azido-16-ethylidene-4,6-pregnadiene-17α,21-diol-3,11,20-
  trione 21-acetate.

EXAMPLE 14

11-substituted-16,17-dioxygenated-6-azido-4,6-
pregnadiene-21-ol-3,20-dione 21-lower alkanoates (A) 11-substituted - 16,17-dioxygenated - 4,6 - pregnadiene-21-ol-3,20-dione 21-lower alkanoates.—In a manner similar to that described in Example 12(A)(1) treat each of the following 11-substituted-16,17-oxygenated-4-pregnenes with chloranil in tert.-butanol and dioxane.

4-pregnene-11β,16α,17α,21-tetraol-3,20-dione 16,21-diacetate,
9α-fluoro-4-pregnene-11β,16α,17α,21-tetraol-3,20-dione
  16,21-diacetate,
9α-chloro-4-pregnene-11β,16α,17α,21-tetraol-3,20-dione
  16,21-diacetate,
4-pregnene-16α,17α,21-triol-3,11,20-trione 16,21-diacetate,
16α,17α-iso-propylidenedioxy-4-pregnene-11β,21-diol-
  3,20-dione 21-acetate, 9α-fluoro-16α,17α-iso-propylidenedioxy-4-pregnene-11β,
  21-diol-3,20-dione 21-acetate,
16α,17α-iso-propylidenedioxy-4-pregnene-21-ol-3,11,20-
  trione 21-acetate,
9α-fluoro-16α,17α-iso-butylidenedioxy-4-pregnene-11β,
  21-diol-3,20-dione 21-acetate,
16α,17α-iso-butylidenedioxy-4-pregnene-21-ol-3,20-dione
  21-acetate,
4,9(11)-pregnadiene-16α,17α,21-triol-3,20-dione
  16,21-diacetate,
9α-bromo-4-pregnene-11β,16α,17α,21-tetraol-3,20-dione
  16,21-diacetate,
9α-chloro-4-pregnene-16α,17α,21-triol-3,11,20-trione
  16,21-diacetate,
9α-fluoro-4-pregnene-16α,17α,21-triol-3,11,20-trione
  16,21-diacetate,
9α-fluoro-4-pregnene-11β,16α,17α,21-tetraol-3,20-dione
  21-tert.-butyl acetate,
2α-methyl-4-pregnene-16α,17α,21-triol-3,11,20-trione
  16,21-diacetate,
2α-methyl-4,9(11)-pregnadiene-16α,17α,21-triol-3,20-
  dione 16,21-diacetate,
9α,11β-dichloro-4-pregnene-16α,17α,21-triol-3,20-dione
  16,21-diacetate,
16α,17α-iso-propylidenedioxy-4,9(11)-pregnadiene-21-ol-
  3,20-dione 21-acetate, Isolate and purify the resultant respective products in a manner similar to that described in Example 12(A)(1) to obtain, respectively, 4,6-pregnadiene-11β,16α,17α,21-tetraol-3,20-dione, 16,21-
  diacetate,
9α-fluoro-4,6-pregnadiene-11β,16α,17α,21-tetraol-3,20-
  dione 16,21-diacetate,
9α-chloro-4,6-pregnadiene-11β,16α,17α,21-tetraol-3,20-
  dione 16,21-diacetate,
4,6-pregnadiene-16α,17α,21-triol-3,11,20-trione 16,21-
  diacetate,
16α,17α-iso-propylidenedioxy-4,6-pregnadiene-11β,21-
  diol-3,20-dione 21-acetate,
9α-fluoro-16α,17α-iso-propylidenedioxy-4,6-pregnadiene-
  11β,21-diol-3,20-dione 21-acetatae,
16α,17α-iso-propylidenedioxy-4,6-pregnadiene-21-ol-
  3,11,20-trione 21-acetate,
9α-fluoro-16α,17α-iso-butylidenedioxy-4,6-pregnadiene-
  11β,21-diol-3,20-dione 21-acetate,
16α,17α-iso-butylidenedioxy-4,6-pregnadiene-21-ol-3,20-
  dione 21-acetate,
4,6,9(11)-pregnatriene-16α,17α,21-triol-3,20-dione
  16,21-diacetate,
9α-bromo-4,6-pregnadiene-11β,16α,17α,21-tetraol-3,20-
  dione 16,21-diacetate,
9α-chloro-4,6-pregnadiene-16α,17α,21-triol-3,11,20-
  trione 16,21-diacetate,
9α-fluoro-4,6-pregnadiene-16α,17α,21-triol-3,11,20-
  trione 16,21-diacetate,
9α-fluoro-4,6-pregnadiene-11β,16α,17α,21-tetraol-3,20-
  dione 21-tert.-butyl acetate,
2α-methyl-4,6-pregnadiene-16α,17α,21-triol-3,11,20-
  trione 16,21-diacetate,
2α-methyl-4,6,9(11)-pregnatriene-16α,17α,21-triol-3,20-
  dione 16,21-diacetate,
9α,11β-dichloro-4,6-pregnadiene-16α,17α,21-triol-3,20-
  dione 16,21-diacetate,
16α,17α-iso-propylidenedioxy-4,6,9(11)-pregnatriene-21-
  ol-3,20-dione 21-acetate, (B) 11-substituted-16α,17α-dioxygenated-6α,7α - oxido-4-pregnene - 21 - ol-3,20-dione 21-lower alkanoates.—In a manner similar to that described in Example 2(A)(1) treat each of the 11-substituted-16α,17α-dioxygenated-4,6-pregnadienes prepared as described in Example 14(A) with m-chloro-perbenzoic acid in acetone. Isolate and purify the resultant respective products in a manner similar to that described in Example 2(A)(1) to obtain, respectively, 6α,7α-oxido-4-pregnene-11β,16α,17α,21-tetraol-3,20-
  dione 16,21-diacetate,
6α,7α-oxido-9α-fluoro-4-pregnene-11β,16α,17α,21-
  tetraol-3,20-dione 16,21-diacetate,
6α,7α-oxido-9α-chloro-4-pregnene-11β,16α,17α,21-
  tetraol-3,20-dione 16,21-diacetate,
6α,7α-oxido-4-pregnene-16α,17α,21-triol-3,11,20-trione
  16,21-diacetate,
6α,7α-oxido-16α,17α-iso-propylidenedioxy-4-pregnene-
  11β,21-diol-3,20-dione 21-acetate,
6α,7α-oxido-9α-fluoro-16α,17α-iso-propylidenedioxy-4-
  pregnene-11β,21-diol-3,20-dione 21-acetate,
6α,7α-oxido-16α,17α-iso-propylidenedioxy-4-pregnene-21-
  ol-3,11,20-trione 21-acetate,
6α,7α-oxido-9α-fluoro-16α,17α-iso-butylidenedioxy-4-
  pregnene-11β,21-diol-3,20-dione 21-acetate,
6α,7α-oxido-16α,17α-iso-butylidenedioxy-4-pregnene-21-
  ol-3,20-dione 21-acetate,
6α,7α-oxido-4,9(11)-pregnadiene-16α,17α,21-triol-3,20-
  dione 16,21-diacetate,
6α,7α-oxido-9α-bromo-4-pregnene-11β,16α,17α,21-tetraol-
  3,20-dione 16,21-diacetate,
6α,7α-oxido-9α-chloro-4-pregnene-16α,17α,21-triol-3,11,
  20-trione 16,21-diacetate,
6α,7α-oxido-9α-fluoro-4-pregnene-16α,17α,21-triol-3,11,
  20-trione 16,21-diacetate,
6α,7α-oxido-9α-fluoro-4-pregnene-11β,16α,17α,21-tetraol-
  3,20-dione 21-tert.-butyl acetate,
2α-methyl-6α,7α-oxido-4-pregnene-16α,17α,21-triol-3,11,
  20-trione 16,21-diacetate,
2α-methyl-6α,7α-oxido-4,9(11)-pregnadiene-16α,17α,21-
  triol-3,20-dione 16,21-diacetate,
6α,7α-oxido-9α,11β-dichloro-4-pregnene-16α,17α,21-triol-
  3,20-dione 16,21-diacetate,
6α,7α-oxido-16α,17α-iso-propylidenedioxy-4,9(11)-
  pregnadiene-21-ol-3,20-dione 21-acetate.

(C) 11 - substituted-16α,17α-dioxygenated-6β-azido-7α-hydroxy - 4 - pregnene - 21-ol-3,20-dione 21-lower alkanoates.—In a manner similar to that described in Example 1(A)(1) treat each of the 6α,7α-oxido-16α,17α-dioxygenated-4-pregnenes prepared as described in Example 14(B) with sodium azide in aqueous methanol and dioxane. Isolate and purify the resultant respective products in a manner similar to that described in Example 1(A)(1) to obtain, respectively, 6β-azido-7α,11β,16α,17α,21-pentahydroxy-4-pregnene-
  3,20-dione 16,21-diacetate,
6β-azido-7α,11β,16α,17α,21-pentahydroxy-9α-fluoro-4-
  pregnene-3,20-dione 16,21-diacetate,
6β-azido-7α,11β,16α,17α,21-pentahydroxy-9α-chloro-4-
  pregnene-3,20-dione 16,21-diacetate,
6β-azido-7α,16α,17α,21-tetrahydroxy-4-pregnene-3,11,20-
  trione 16,21-diacetate,
6β-azido-7α,11β,21-trihydroxy-16α,17α-iso-propylidene-
  dioxy-4-pregnene-3,20-dione 21-acetate,
6β-azido-7α,11β,21-trihydroxy-9α-fluoro-16α,17α-iso-
  propylidenedioxy-4-pregnene-3,20-dione 21-acetate,
6β-azido-7α,21-dihydroxy-16α,17α-iso-propylidenedioxy-
  4-pregnene-3,11,20-trione 21-acetate,
6β-azido-7α,11β,21-trihydroxy-9α-fluoro-16α,17α-iso-
  butylidenedioxy-4-pregnene-3,20-dione 21-acetate,
6β-azido-7α,21-dihydroxy-16α,17α-iso-butylidenedioxy-4-
  pregnene-3,20-dione 21-acetate,
6β-azido-7α,16α,17α,21-tetrahydroxy-4,9(11)-pregnadi-
  ene-3,20-dione 16,21-diacetate,
6β-azido-7α,11β,16α,17α,21-pentahydroxy-9α-bromo-4-
  pregnene-3,20-dione 16,21-diacetate,
6β-azido-7α,16α,17α,21tetrahydroxy-9α-chloro-4-
  pregnene-3,11,20-trione 16,21-diacetate,
6β-azido-7α,16α,17α,21-tetrahydroxy-9α-fluoro-4-
  pregnene-3,11,20-trione 16,21-diacetate,
6β-azido-7α,11β,16α,17α,21-pentahydroxy-9α-fluoro-4-
  pregnene-3,20-dione 21-tert.-butyl acetate, 2α-methyl-6β-azido-7α,16α,17α,21-tetrahydroxy-4-
pregnene-3,11,20-trione 16,21-diacetate, 2α-methyl-6β-azido-7α,16α,17α,21-tetrahydroxy-4,9(11)-
pregnadiene-3,20-dione 16,21-diacetate, 6β-azido-7α,16α,17α,21-tetrahydroxy-9α,11β-dichloro-4-
pregnene-3,20-dione 16,21-diacetate, 6β-azido-7α,21-dihydroxy-16α,17α-iso-propylidenedioxy-
4,9(11)-pregnadiene-3,20-dione 21-acetate, (D) 11 - substituted-16α,17α-dioxygenated-6β-azido-7-
acetoxy - 4 - pregnene - 21 - ol-3,20-dione 21-lower alkanoates.—In a manner similar to that described in Example
1(B) treat each of the 6β-azido-7α-hydroxy-16,17-dioxygenated-4-pregnenes prepared in Example 14(C) with
acetic anhydride in pyridine. Isolate and purify the resultant respective products in a manner similar to that
described in Example 1(B) to obtain the corresponding
7-acetate ester, namely 6β-azido-7α,11β,16α,17α,21-pentahydroxy-4-pregnene-
3,20-dione 7,16,21-triacetate, 6β-azido-7α,11β,16α,17α,21-pentahydroxy-9α-fluoro-4-
pregnene-3,20-dione 7,16,21-triacetate, 6β-azido-7α,11β,16α,17α,21-pentahydroxy-9α-chloro-4-
pregnene-3,20-dione 7,16,21-triacetate, 6β-azido-7α,16α,17α,21-tetrahydroxy-4-pregnene-3,11,20-
trione 7,16,21-triacetate, 6β-azido-7α,11β,21-trihydroxy-16α,17α-iso-propylidene-
dioxy-4-pregnene-3,20-dione 7,21-diacetate, 6β-azido-7α,11β,21-trihydroxy-9α-fluoro-16α,17α-iso-propylidenedioxy-4-pregnene-3,20-dione 7,21-diacetate, 6β-azido-7α,21-dihydroxy-16α,17α-iso-propylidenedioxy-4-pregnene-3,11,20-trione 7,21-diacetate, 6β-azido-7α,11β,21-trihydroxy-9α-fluoro-16α,17α-iso-butylidenedioxy-4-pregnene-3,20-dione 7,21-diacetate, 6β-azido-7α,21-dihydroxy-16α,17α-iso-butylidenedioxy-4-pregnene-3,20-dione 7,21-diacetate, 6β-azido-7α,16α,17α,21-tetrahydroxy-4,9(11)-pregnadiene-3,20-dione 7,16,21-triacetate, 6β-azido-7α,11β,16α,17α,21-pentahydroxy-9α-bromo-4-pregnene-3,20-dione 7,16,21-triacetate, 6β-azido-7α,16α,17α,21-tetrahydroxy-9α-chloro-4-pregnene-3,11,20-trione 7,16,21-triacetate, 6β-azido-7α,16α,17α,21-tetrahydroxy-9α-fluoro-4-pregnene-3,11,20-trione 7,16,21-triacetate, 6β-azido-7α,11β,16α,17α,21-pentahydroxy-9α-fluoro-4-pregnene-3,20-dione 7,16-diacetate 21-tert.-butyl acetate, 2α-methyl-6β-azido-7α,16α,17α,21-tetrahydroxy-4-pregnene-3,11,20-trione 7,16,21-triacetate, 2α-methyl-6β-azido-7α,16α,17α,21-tetrahydroxy-4,9(11)-pregnadiene-3,20-dione 7,16,21-triacetate, 6β-azido-7α,16α,17α,21-tetrahydroxy-9α,11β-dichloro-4-pregnene-3,20-dione 7,16,21-triacetate, 6β-azido-7α,21-dihydroxy-16α,17α-iso-propylidenedioxy-4,9(11)-pregnadiene-3,20-dione 7,21-diacetate.

(E) 11 - substituted - 16α,17α - dioxygenated - 4,6-
pregnadiene - 21 - ol - 3,20 - dione 21 - lower alkanoates.—In a manner similar to that described in Example
1(C)(2) treat each of the 6β-azido-7α-acetoxy-16α,17α-
dioxygented - 4 - pregnenes prepared in Example 14(D)
with tetramethylammonium fluoride in acetonitrile. Isolate
and purify the resultant respective products in a manner
similar to that described in Example 1(C)(2) to obtain,
respectively, 6-azido-4,6-pregnadiene-11β,16α,17α,21-tetraol-3,20-
dione 16,21-diacetate, 6-azido-9α-fluoro-4,6-pregnadiene-11β,16α,17α,21-tetroal-
3,20-dione 16,21-diacetate, 6-azido-9α-chloro-4,6-pregnadiene-11β,16α,17α,21-tetraol-
3,20-dione 16,21-diacetate, 6-azido-4,6-pregnadiene-16α,17α,21-triol-3,11,20-trione
16,21-diacetate, 6-azido-16α,17α-iso-propylidenedioxy-4,6-pregnadiene-
11β,21-diol-3,20-dione 21-acetate, 6-azido-9α-fluoro-16α,17α-iso-propylidenedioxy-4,6-
pregnadiene-11β,21-diol-3,20-dione 21-acetate, 6-azido-16α,17α-iso-propylidenedioxy-4,6-pregnadiene-
21-ol-3,11,20-trione 21-acetate, 6-azido-9α-fluoro-16α,17α-iso-butylidenedioxy-4,6-
pregnadiene-11β,21-diol-3,20-dione 21-acetate, 6-azido-16α,17α-iso-butylidenedioxy-4,6-pregnadiene-21-
ol-3,20-dione 21-acetate, 6-azido-4,6,9(11)-pregnatriene-16α,17α,21-triol-3,20-
dione 16,21-diacetate, 6-azido-9α-bromo-4,6-pregnadiene-11β,16α,17α,21-tetraol-
3,20-dione 16,21-diacetate, 6-azido-9α-chloro-4,6-pregnadiene-16α,17α,21-triol-
3,11,20-trione 16,21-diacetate, 6-azido-9α-fluoro-4,6-pregnadiene-16α,17α,21-triol-
3,11,20-trione 16,21-diacetate, 6-azido-9α-fluoro-4,6-pregnadiene-11β,16α,17α,21-tetroal-
3,20-dione 16-acetate 21-tert.-butyl acetate, 2α-methyl-6-azido-4,6-pregnadiene-16α,17α,21-triol-
3,11,20-trione 16,21-diacetate, 2α-methyl-6-azido-4,6,9(11)-pregnatriene-16α,17α,21-
triol-3,20-dione 16,21-diacetate, 6-azido-9α,11β-dichloro-4,6-pregnadiene-16α,17α,21-triol-
3,20-dione 16,21-diacetate, 6-azido-16α,17α-iso-propylidenedioxy-4,6,9(11)-
pregnatriene-21-ol-3,20-dione 21-acetate.

EXAMPLE 15

6-azido-9α,11β-dichloro-4,6-pregnadiene-16α,17α,21-triol-
3,20-dione 16,21-diacetate (A) 6β - azido - 7α,16α,17α,21 - tetrahydroxy - 9α,11β-
dichloro-4-pregnene-3,20-dione 7,16,21 - triacetate.—In a
manner similar to that described in Example 6(A), treat
6β - azido - 7α,16α,17α,21 - tetrahydroxy - 4,9(11) - pregnadiene-3,20-dione 7,17,21-triacetate with chlorine gas in
carbon tetrachloride in the presence of pyridine at —20°
C. Isolate and purify the resultant product in a manner
similar to that described in Example 6(A) to obtain 6β-
azido - 7α,16α,17α,21 - tetrahydroxy - 9α,11β - dichloro-
4-pregnene-3,20-dione 7,16,21-triacetate.

In a similar manner treat each of 2α-methyl-6β-azido-
7α,16α,17α,21 - tetrahydroxy - 4,9(11) - pregnadiene-
3,20-dione 7,16,21-triacetate and 6β - azido - 7α,21 - dihydroxy - 16α,17α - iso - propylidenedioxy - 4,9(11) - pregnadiene-3,20-dione 7,21-diacetate with chlorine in carbon
tetrachloride in the presence of pyridine at —20° to obtain, respectively 2α-methyl-6β-azido-7α,16α,17α,21-tetrahydroxy - 9α,11β - dichloro - 4 - pregnene - 3,20 - dione
7,16,21-triacetate and 6β-azido-7α,21-dihydroxy-16α,17α-
iso-propylidenedioxy - 9α,11β - dichloro - 4 - pregnene - 3,
20-dione 7,21-diacetate, (B) In a manner similar to that described in Example
1(C)(2) treat 6β-azido - 7α,16α,17α,21 - tetrahydroxy-9α,
11β-dichloro-4-pregnene-3,20-dione 7,16,21-triacetate with
tetramethylammonium fluoride in acetonitrile. Isolate and
purify the resultant product in a manner similar to that
described in Example 1(C)(2) to obtain 6-azido-9α,11β-
dichloro - 4,6 - pregnadiene - 16α,17α,21 - triol - 3,20-
dione 16,21-diacetate.

In similar manner treat each of 2α-methyl-6β-azido-
7α,16α,17α,21 - tetrahydroxy - 9α,11β - dichloro - 4 - pregnene-3,20-dione 7,16,21-triacetate and 6β-azido-7α,21-dihydroxy - 16α,17α - iso - propylidenedioxy - 9α,11β-dichloro - 4 - pregnene-3,20-dione 7,21-diacetate with tetramethylammonium fluoride in acetonitrile. Isolate and
purify the resultant respective products in a manner similar to that described in Example 1(C)(2) to obtain, respectively 2α - methyl-6-azido-9α,11β-dichloro-4,6-pregnadiene-16α,17α,21-triol-3,20-dione 16,21 - diacetate and 6-
azido - 9α,11β - dichloro - 16α,17α - iso - propylidenedioxy-4,6-pregnadiene-21-ol-3,20-dione 21-acetate.

EXAMPLE 16

6-azido-9α-chloro-11β-fluoro-16α,17α-iso-propylidene-dioxy-4,6-pregnadiene-21-ol-3,20-dione 21-acetate (A) 6β-azido-7α,21-dihydroxy - 16α,17α - iso - propylidenedioxy - 9α - chloro - 11β - fluoro - 4 - pregnene - 21-ol-3,20-dione 7,21-diacetate.—In a manner similar to that described in Example 8(A) treat 6β - azido - 7α,21 - dihydroxy - 16α,17α - iso - propylidenedioxy - 4,6 - pregnadiene-3,20-dione 7,21-diacetate in diethylacetic acid with N-chlorosuccinimide followed by a solution of hydrogen fluoride in tetrahydrofuran in chloroform. Isolate and purify the resultant product in a manner similar to that described to obtain 6β-azido-7α,21-dihydroxy-16α,17α-iso-propylidenedioxy - 9α - chloro - 11β - fluoro - 4 - pregnene-21-ol-3,20-dione 7,21-diacetate.

Similarly, treat each of 6β-azido-7α,16α,17α,21-tetrahydroxy - 4,9(11) - pregnadiene - 3,20 - dione 7,16,21-triacetate and 2α-methyl-6β-azido-7α,16α,17α,21-tetrahydroxy-4,9(11)-pregnadiene-3,20-dione 7,16,21 - triacetate with N-chlorosuccinimide and hydrogen fluoride. Isolate and purify the resultant respective products in a manner similar to that described in Example 8A to obtain, respectively 6β-azido-7α,16α,17α,21-tetrahydroxy-9α-chloro-11β-fluoro-4-pregnene-3,20-dione 7,16,21 - triacetate and 2α-methyl - 6β - azido - 7α,16α,17α,21 - tetrahydroxy - 9α-chloro-11β-fluoro-4-pregnene-3,20-dione 7,21-diacetate.

(B) 6 - azido - 9α - chloro-11β - fluoro - 16α,17α - iso-propylidene-dioxy - 4,6-pregnadiene-21 - ol - 3,20-dione 21-acetate.—In a manner similar to that described in Example 1(C)(2) treat 6β-azido-7α,21-dihydroxy-16α,17α-iso-propylidenedioxy-9α-chloro-11β-fluoro - 4 - pregnene-3,20 - dione 7,21 - diacetate with tetramethylammonium fluoride in acetonitrile at room temperature. Isolate and purify the result product in a manner similar to that described to obtain 6-azido-9α-chloro-11β-fluoro - 16α,17α-iso-propylidenedioxy-4,6-pregnadiene - 21 - ol-3,20-dione 21-acetate.

Similarly, treat each of 6β-azido-16α,17α,21-tetra-hydroxy-9α-chloro-11β-fluoro - 4 - pregnene - 3,20-dione 7α,16α,21-triacetate and 2α - methyl - 6β-azido-7α,16α,17α,21-tetrahydroxy-9α-chloro - 11β-fluoro - 4 - pregnene-3,20-dione 7,21-diacetate with tetramethylammonium fluoride in acetonitrile at room temperature to obtain, respectively, 6-azido-9α-chloro-11β-fluoro-4,6 - pregnadiene - 16α,17α,21-triol-3,20-dione 16,21-diacetate and 2α-methyl-6-azido-9α-chloro-11β-fluoro-4,6-pregnadiene-16α,17α,21 - triol - 3,20-dione 16,21-diacetate.

EXAMPLE 17

6-azido-17α,21-iso-propylidenedioxy-4,6-pregnadiene-3,20-diones (A) 17α,21 - iso-propylidenedioxy - 4,6 - pregnadiene-3,20-diones.—In a manner similar to that described in Example 12(A)(1) but also utilizing calcium carbonate, treat a 0.005 molar quantity of each of the following 17α,21-iso-propylidenedioxy-4-pregnene-3,20 - diones with 5 gm. chloranil and 5 gm. calcium carbonate in 100 ml. tert.-butanol-dioxane (4:1):

17α,21-iso-propylidenedioxy-4-pregnene-3,11,20-trione,
17α,21-iso-propylidenedioxy-4-pregnene-11β-ol-3,20-dione,
9α-fluoro-17α,21-iso-propylidenedioxy-4-pregnene-11β-ol-3,20-dione,
9α-fluoro-16α-methyl-17α,21-iso-propylidenedioxy-4-pregnene-11β-ol-3,20-dione,
9α-fluoro-16β-methyl-17α,21-iso-propylidenedioxy-4-pregnene-11β-ol-3,20-dione,
17α,21-iso-propylidenedioxy-4,9(11)-pregnadiene-3,20-dione,
9α,11β-dichloro-17α,21-iso-propylidenedioxy-4-pregnene-3,20-dione,
9α-fluoro-11β-chloro-17α,21-iso-propylidenedioxy-4-pregnene-3,20-dione,
9α-bromo-11β-fluoro-17α,21-iso-propylidenedioxy-4-pregnene-3,20-dione,
9α,11β-dichloro-16α-methyl-17α,21-iso-propylidenedioxy-4-pregnene-3,20-dione,
9α,11β-dichloro-16-methylene-17α,21-iso-propylidenedioxy-4-pregnene-3,20-dione, and
9α-fluoro-16-methylene-17α,21-iso-propylidenedioxy-4-pregnene-11β-ol-3,20-dione.

Isolate and purify the resultant respective products in a manner similar to that described in Example 12(A)(1) to obtain, respectively:

17α,21-iso-propylidenedioxy-4,6-pregnadiene-3,11,20-trione,
17α,21-iso-propylidenedioxy-4,6-pregnadiene-11β-ol-3,20-dione,
9α-fluoro-17α,21-iso-propylidenedioxy-4,6-pregnadiene-11β-ol-3,20-dione,
9α-fluoro-16α-methyl-17α,21-iso-propylidenedioxy-4,6-pregnadiene-11β-ol-3,20-dione,
9α-fluoro-16β-methyl-17α,21-iso-propylidenedioxy-4,6-pregnadiene-11β-ol-3,20-dione,
17α,21-iso-propylidenedioxy-4,6,9(11)-pregnatriene-3,20-dione,
9α,11β-dichloro-17α,21-iso-propylidenedioxy-4,6-pregnadiene-3,20-dione,
9α-fluoro-11β-chloro-17α,21-iso-propylidenedioxy-4,6-pregnadiene-3,20-dione,
9α-bromo-11β-fluoro-17α,21-iso-propylidenedioxy-4,6-pregnadiene-3,20-dione,
9α,11β-dichloro-16α-methyl-17α,21-iso-propylidenedioxy-4,6-pregnadiene-3,20-dione,
9α,11β-dichloro-16-methylene-17α,21-iso-propylidenedioxy-4,6-pregnadiene-3,20-dione, and
9α-fluoro-16-methylene-17α,21-iso-propylidenedioxy-4-pregnene-11β-ol-3,20-dione.

(B) 6α,7α - oxido-17α,21 - iso-propylidenedioxy-4-pregnene-3,20-diones.—In a manner similar to that described in Example 2(A)(2) treat each of the 17α,21-iso-propylidenedioxy-4,6-pregnadiene - 3,20 - diones prepared as described in Example 17(A) with monoperphthalic acid in chloroform at room temperature. Isolate and purify the resultant respective products in a manner similar to that described in Example 2(A)(2) to obtain, respectively:

6α,7α-oxido-17α,21-iso-propylidenedioxy - 4 - pregnene-3,11,20-trione,
6α,7α-oxido-17α,21-iso - propylidenedioxy - 4 - pregnene-11β-ol-3,20-dione,
6α,7α-oxido-9α-fluoro-17α,21-iso-propylidenedioxy-4-pregnene-11β-ol-3,20-dione,
6α,7α-oxido-9α-fluoro-16α-methyl-17α,21-iso-propylidenedioxy-4-pregnene-11β-ol-3,20-dione,
6α,7α-oxido-9α-fluoro-16β-methyl-17α,21-iso-propylidenedioxy-4-pregnene-11β-ol-3,20-dione,
6α,7α-oxido-17α,21-iso-propylidenedioxy-4,9(11)-pregnadiene-3,20-dione,
6α,7α-oxido-9α,11β-dichloro-17α,21-iso-propylidenedioxy-4-pregnene-3,20-dione,
6α,7α-oxido-9α-fluoro-11β-chloro-17α,21-iso-propylidenedioxy-4-pregnene-3,20-dione,
6α,7α-oxido-9α-bromo-11β-fluoro-17α,21-iso-propylidenedioxy-4-pregnene-3,20-dione,
6α,7α-oxido-9α,11β-dichloro-16α-methyl-17α,21-iso-propylidenedioxy-4-pregnene-3,20-dione,
6α,7α-oxido-9α,11β-dichloro-16-methylene-17α,21-iso-propylidene-dioxy-4-pregnene-3,20-dione, and
6α,7α-oxido-9α-fluoro-16-methylene-17α,21-iso-propylidenedioxy-4-pregnene-11β-ol-3,20-dione.

(c) 6β-azido - 7α - hydroxy - 17α,21 - iso - propylidenedioxy-4-pregnene-3,20-diones.—In a manner similar to that described in Example 1(A)(1) but without using acetic acid, treat each of the 6α,7α-oxido-17α,21-iso-propylidenedioxy-4-pregnene-3,20-diones prepared as described in preceding Example 17(B) with sodium azide in aqueous methanol and dioxane at room temperature. Isolate and purify the result respective products in a manner similar to that described in Example 1(A)(1) to obtain, respectively:

6β-azido-7α-hydroxy-17α,21-iso-propylidenedioxy-4-pregnene-3,11,20-trione,
6β-azido-7α,11β-dihydroxy-17α,21-iso-propylidenedioxy-4-pregnene-3,20-dione,
6β-azido-7α,11β-dihydroxy-9α-fluoro-17α,21-iso-propylidenedioxy-4-pregnene-3,20-dione,
6β-azido-7α,11β-dihydroxy-9α-fluoro-16α-methyl-17α,21-isopropylidenedioxy-4-pregnene-3,20-dione.
6β-azido-7α,11β-dihydroxy-9α-fluoro-16β-methyl-17α,21-iso-propylidenedioxy-4-pregnene-3,20-dione,
6β-azido-7α-hydroxy-17α,21-iso-propylidenedioxy-4,9(11)-pregnadiene-3,20-dione,
6β-azido-7α-hydroxy-9α,11β-dichloro-17α,21-iso-propylidenedioxy-4-pregnene-3,20-dione,
6β-azido-7α-hydroxy-9α-fluoro-11β-chloro-17α,21-iso-propylidenedioxy-4-pregnene-3,20-dione,
6β-azido-7α-hydroxy-9α-bromo-11β-fluoro-17α,21-iso-propylidenedioxy-4-pregnene-3,20-dione,
6β-azido-7α-hydroxy-9α,11β-dichloro-16α-methyl-17α,21-iso-propylidenedioxy-4-pregnene-3,20-dione,
6β-azido-7α-hydroxy-9α,11β-dichloro-16-methylene-17α,21-iso-propylidenedioxy-4-pregnene-3,20-dione, and
6β-azido-7α,11β-dihydroxy-9α-fluoro-16-methylene-17α,21-iso-propylidenedioxy-4-pregnene-3,20-dione.

(D) In a manner similar to that described in Example 1(B) treat each of the 6β-azido-7α-hydroxy-17α,21-iso-propylidenedioxy-4-pregnene-3,20-diones prepared in Example 17(C) with acetic anhydride in pyridine at room temperature. Isolate and purify the resultant respective products in a manner similar to that described in Example 1(B) to obtain the following corresponding 7-acetate esters, namely:

6β-azido-7α,21-iso-propylidenedioxy-4-pregnene-3,11,20-trione 7-acetate,
6β-azido-7α,11β-dihydroxy-17α,21-iso-propylidenedioxy-4-pregnene-3,20-dione 7-acetate,
6β-azido-7α,11β-dihydroxy-9α-fluoro-17α,21-iso-propylidenedioxy-4-pregnene-3,20-dione 7-acetate,
6β-azido-7α,11β-dihydroxy-9α-fluoro-16α-methyl-17α,21-iso-propylidenedioxy-4-pregnene-3,20-dione 7-acetate,
6β-azido-7α,11β-dihydroxy-9α-fluoro-16β-methyl-17α,21-iso-propylidenedioxy-4-pregnene-3,20-dione 7-acetate,
6β-azido-7α-hydroxy-17α,21-iso-propylidenedioxy-4,9(11)-pregnadiene-3,20-dione 7-acetate,
6β-azido-7α-hydroxy-9α,11β-dichloro-17α,21-iso-propylidenedioxy-4-pregnene-3,20-dione 7-acetate,
6β-azido-7α-hydroxy-9α-fluoro-11β-chloro-17α,21-iso-propylidenedioxy-4-pregnene-3,20-dione 7-acetate,
6β-azido-7α-hydroxy-9α-bromo-11β-fluoro-17α,21-iso-propylidenedioxy-4-pregnene-3,20-dione 7-acetate,
6β-azido-7α-hydroxy-9α,11β-dichloro-16α-methyl-17α,21-iso-propylidenedioxy-4-pregnene-3,20-dione 7-acetate,
6β-azido-7α-hydroxy-9α,11β-dichloro-16-methylene-17α,21-iso-propylidenedioxy-4-pregnene-3,20-dione 7-acetate, and
6β-azido-7α,11β-dihydroxy-9α-fluoro-16-methylene-17α,21-iso-propylidenedioxy-4-pregnene-3,20-dione 7-acetate.

(E) 6-azido - 17α,21 - iso - propylidenedioxy-4,6-pregnadiene-3,20-diones.—In a manner similar to that described in Example 1(C)(2) treat each of the 6β-azido-7α - acetoxy - 17α,21 - iso - propylidenedioxy-4-pregnene-3,20-diones prepared in Example 17(D) with tetramethylammonium fluoride in acetonitrile at room temperature. Isolate and purify the resultant respective product in a manner similar to that described in Example 1(C)(2) to obtain, respectively:

6-azido-17α,21-iso-propylidenedioxy-4,6-pregnadiene-3,11,20-trione,
6-azido-17α,21-iso-propylidenedioxy-4,6-pregnadiene-11β-ol-3,20-dione,
6-azido-9α-fluoro-17α,21-iso-propylidenedioxy-4,6-pregnadiene-11β-ol-3,20-dione,
6-azido-9α-fluoro-16α-methyl-17α,21-iso-propylidenedioxy-4,6-pregnadiene-11β-ol-3,20-dione,
6-azido-9α-fluoro-16β-methyl-17α,21-iso-propylidenedioxy-4,6-pregnadiene-11β-ol-3,20-dione,
6-azido-17α,21-iso-propylidenedioxy-4,6,9(11)-pregnatriene-3,20-dione,
6-azido-9α,11β-dichloro-17α,21-iso-propylidenedioxy-4,6-pregnadiene-3,20-dione,
6-azido-9α-fluoro-11β-chloro-17α,21-iso-propylidenedioxy-4,6-pregnadiene-3,20-dione,
6-azido-9α-bromo-11β-fluoro-17α,21-iso-propylidenedioxy-4,6-pregnadiene-3,20-dione,
6-azido-9α,11β-dichloro-16α-methyl-17α,21-iso-propylidenedioxy-4,6-pregnadiene-3,20-dione,
6-azido-9α,11β-dichloro-16-methylene-17α,21-iso-propylidenedioxy-4,6-pregnadiene-3,20-dione, and
6-azido-9α-fluoro-16-methylene-17α,21-iso-propylidenedioxy-4,6-pregnadiene-11β-ol-3,20-dione.

EXAMPLE 18

6-azido-16-halogenomethylene-4,6-pregnadiene-17α,21-diol-3,20-diones (A) 16-halogenomethylene-4,6 - pregnadiene - 17α,21-diol-3,20-diones.—In a manner similar to that described in Example 12(A)(1) treat each of the following 16-halogenomethylene-4-pregnenes with chloranil in tert.-butanol and dioxane at reflux temperature under an atomsphere of nitrogen:

16-chloromethylene-4-pregnene-17α,21-diol-3,20-dione 21-acetate,
16-chloromethylene-4-pregnene-17α,21-diol-3,11,20-trione 21-acetate,
16-chloromethylene-4-pregnene-11β,17α,21-triol-3,20-dione 21-acetate,
16-fluoromethylene-4-pregnene-17α,21-diol-3,20-dione 21-acetate,
16-fluoromethylene-4-pregnene-17α,21-diol-3,11,20-trione 21-acetate,
16-fluoromethylene-4-pregnene-11β,17α,21-triol-3,20-dione 21-acetate,
9α-bromo-16-fluoromethylene-4-pregnene-11β,17α,21-triol-3,20-dione 21-acetate,
9α-fluoro-16-fluoromethylene-4-pregnene-11β,17α,21-triol-3,20-dione 21-acetate,
16-fluoromethylene-4-pregnene-11β,17α,21-triol-3,20-dione 21-tertiary butyrate.

Isolate and purify the resultant respective products in a manner similar to that described in Example 12(A)(1) to obtain, respectively:

16-chloromethylene-4,6-pregnadiene-17α,21-diol-3,20-dione 21-acetate,
16-chloromethylene-4,6-pregnadiene-17α,21-diol-3,11,20-trione 21-acetate,
16-chloromethylene-4,6-pregnadiene-11β,17α,21-triol-3,20-dione 21-acetate,
16-fluoromethylene-4,6-pregnadiene-17α,21-diol-3,20-dione 21-acetate,
16-fluoromethylene-4,6-pregnadiene-17α,21-diol-3,11,20-trione 21-acetate,
16-fluoromethylene-4,6-pregnadiene-11β,17α,21-triol-3,20-dione 21-acetate,
9α-bromo-16-fluoromethylene-4,6-pregnadiene-11β,17α,21-triol-3,20-dione 21-acetate, 9α-fluoro-16-fluoromethylene-4,6-pregnadiene11β,17α,21-triol-3,20-dione 21-acetate, and
16-fluoromethylene-4,6-pregnadiene-11β,17α,21-triol-3,20-dione 21-tertiary butyrate.

(B) 6α,7α-oxido-16-halogenomethylene - 4 - pregnene-17α,21-diol-3,20-diones.—Treat each of the 16-halogenomethylene-4,6-pregnadienes prepared as described in above Example 18(A) with mono-perphthalic acid in chloroform at room temperature in a manner similar to that described in Example 2(A)(2). Isolate and purify the resultant respective products in a manner similar to that described in Example 2(A)(2) to obtain, respectively:

6α,7α-oxido-16-chloromethylene-4-pregnene-17α,21-diol-3,20-dione 21-acetate,
6α,7α-oxido-16-chloromethylene-4-pregnene-17α,21-diol-3,11,20-trione 21-acetate,
6α,7α-oxido-16-chloromethylene-4-pregnene-11β,17α,21-triol-3,20-dione 21-acetate,
6α,7α-oxido-16-fluoromethylene-4-pregnene-17α,21-diol-3,20-dione 21-acetate,
6α,7α-oxido-16-fluoromethylene-4-pregnene-17α,21-diol-3,11,20-trione 21-acetate,
6α,7α-oxido-16-fluoromethylene-4-pregnene-11β,17α,21-triol-3,20-dione 21-acetate,
6α,7α-oxido-9α-bromo-16-fluoromethyelne-4-pregnene-11β,17α,21-triol-3,20-dione 21-acetate,
6α,7α-oxido-9α-fluoro-16-fluoromethylene-4-pregnene-11β,17α,21-triol-3,20-dione 21-acetate, and
6α,7α-oxido-16-fluoromethylene-4-pregnene-11β,17α,21-triol-3,20-dione 21-tertiary butyrate.

(C) 6β-azido-7α-hydroxy-16 - halogenomethylene - 4-pregnene-17α,21-diol-3,20-diones.—Treat each of the 6α,7α-oxido-16-halogenomethylene-4-pregnenes prepared as described in above Example 18(B) with sodium azide in aqueous methanol and acetic acid in a manner similar to that described in Example 1(A)(1). Isolate and purify the resultant respective products in a manner similar to that described in Example 1(A)(1) to obtain, respectively:

6β-azido-7α,17α,21-trihydroxy-16-chloromethylene-4-pregnene-3,20-dione 21-acetate,
6β-azido-7α,17α,21-trihydroxy-16-chloromethylene-4-pregnene-3,11,20-trione 21-acetate,
6β-azido-7α,11β,17α,21-tetrahyroxy-16-chloromethylene-4-pregnene-3,20-dione 21-acetate,
6β-azido-7α,17α,21-trihydroxy-16-fluoromethylene-4-pregnene-3,20-dione 21-acetate,
6β-azido-7α,17α,21-trihydroxy-16-fluoromethylene-4-pregnene-3,11,20-trione 21-acetate,
6β-azido-7α,11β,17α,21-tetrahydroxy-16-fluoromethylene-4-pregnene-3,20-dione 21-acetate,
6β-azido-7α,11β,17α,21-tetrahydroxy-9α-bromo-16-fluoromethylene-4-pregnene-3,20-dione 21-acetate,
6-azido-7α,11β,17α,21-tetrahydroxy-9α-fluoro-16-fluoromethylene-4-pregnene-3,20-dione 21-acetate, and
6β-azido-7α,11β,17α,21-tetrahydroxy-16-fluoromethylene-4-pregnene-3,20-dione 21-tertiary butyrate.

(D) 6β-azido-7α-acetoxy-16-halogenomethylene-4-pregnene-7α,21-diol-3,20-diones.—Treat each of the 6β-azido-7α-hydroxy-16-halogenomethylene-4-pregnenes prepared as described in above Example 18(C) with acetic anhydride in pyridine in a manner similar to that described in Example 1(B). Isolate and purify the resultant respective products in a manner similar to that described in Example 1(B) to obtain the corresponding 7-acetate esters, namely:

6β-azido-7α,17α,21-trihydroxy-16-chloromethylene-4-pregnene-3,20-dione 7,21-diacetate,
6β-azido-7α,17α,21-trihydroxy-16-chloromethylene-4-pregnene-3,11,20-trione 7,21-diacetate,
6β-azido-7α,11β,17α,21-tetrahydroxy-16-chloromethylene-4-pregnene-3,20-dione 7,21-diacetate,
6β-azido-7α,17α,21-trihydroxy-16-fluoromethylene-4-pregnene-3,20-dione 7,21-diacetate,
6β-azido-7α,17α,21-trihydroxy-16-fluoromethylene-4-pregnene-3,11,20-trione 7,21-diacetate,
6β-azido-7α,11β,17α,21-tetrahydroxy-16-fluoromethylene-4-pregnene-3,20-dione 7,21-diacetate,
6β-azido-7α,11β,17α,21-tetrahydroxy-9α-bromo-16-fluoromethylene-4-pregnene-3,20-dione 7,21-diacetate,
6β-azido-7α,11β,17α,21-tetrahydroxy-9α-fluoro-16-fluoromethylene-4-pregnene-3,20-dione 7,21-diacetate, and
6β-azido-7α,11β,17α,21-tetrahydroxy-16-fluoromethylene-4-pregnene-3,20-dione 7-acetate 21-tertiary butyrate.

(E) 6 - azido-16-halogenomethylene-4,6-pregnadiene-17α,21-diol-3,20-diones.—Treat each of the 6β-azido-7α-acetoxy-16-halogenomethylene-4-pregnenes prepared as described in above Example 18(D) with tetramethylammonium fluoride in acetonitrile at room temperature in a manner similar to that described in Example 1(C)(2). Isolate and purify the resultant respective products in a manner similar to that described in Example 1(C)(2) to obtain, respectively:

6-azido-16-chloromethylene-4,6-pregnadiene-17α,21-diol-3,20-dione 21-acetate,
6-azido-16-chloromethylene-4,6-pregnadiene-17α,21-diol-3,11,20-trione 21-acetate,
6-azido-16-chloromethylene-4,6-pregnadiene-11β,17α,21-triol-3,20-dione 21-acetate,
6-azido-16-fluoromethylene-4,6-pregnadiene-17α,21-diol-3,20-dione 21-acetate,
6-azido-16-fluoromethylene-4,6-pregnadiene-17α,21-diol-3,11,20-trione 21-acetate,
6-azido-16-fluoromethylene-4,6-pregnadiene-11β,17α,21-triol-3,20-dione 21-acetate,
6-azido-9α-bromo-16-fluoromethylene-4,6-pregnadiene-11β,17α,21-triol-3,20-dione 21-acetate,
6-azido-9α-fluoro-16-fluoromethylene-4,6-pregnadiene-11β,17α,21-triol-3,20-dione 21-acetate,
6-azido-16-fluoromethylene-4,6-pregnadiene-11β,17α,21-triol-3,20-dione 21-tertiary butyrate.

EXAMPLE 19

6α-azido-1,4-pregnadiene-17α,21-diol-3,20-diones and derivatives thereof (A) 6α - azido - 1,4 - pregnadiene-17α,21-diol-3,11,20-trione 21-acetate.—To a solution of 1 g. of 6β-bromo-1,4-pregnadiene-17α,21-diol-3,11,20-trione 21-acetate in 200 ml. of dimethylformamide under an atmosphere of nitrogen add 0.5 g. sodium azide. Stir at room temperature for 2 hours then pour into 2 liters of water. Collect by filtration the resultant precipitate comprising 6α-azido-1,4-pregnadiene-17α,21-diol-3,11,20-trione 21-acetate. Purify by crystallization from acetone-hexane.

In similar manner treat 6β-bromo-1,4-pregnadiene-17α,21-diol-3,11,20-trione 21-iso-butyrate with sodium azide in dimethylformamide to obtain 6α-azido-1,4-pregnadiene-17α,21-diol-3,11,20-trione 21-iso-butyrate.

(B) In a manner similar to that described in above Example 19(A), treat each of the following 6β-bromo-1,4-pregnadienes with sodium azide in dimethylformamide under an atmosphere of nitrogen:

6β-bromo-9α-fluoro-1,4-pregnadiene-17α,21-diol-3,11,20-trione 21-acetate,
6α,9β-dibromo-1,4-pregnadiene-17α,21-diol-3,11,20-trione 21-acetate,
6β-bromo-9α-chloro-1,4-pregnadiene-17α,21-diol-3,11,20-trione 21-acetate,
6β-bromo-1,4-pregnadiene-11β,17α,21-triol-3,20-dione 21-acetate,
6β-bromo-1,4-pregnadiene-21-ol-3,20-dione 21-acetate,
6β-bromo-9α,11β-dichloro-1,4-pregnadiene-17α,21-diol-3,20-dione 21-acetate, 6β-bromo-9α,11β-dichloro-1,4-pregnadiene-17α,21-diol-3,20-dione 21-phosphate,
6β-bromo-16α-methyl-1,4-pregnadiene-17α,21-diol-3,11,20-trione 21-acetate,
6β-bromo-16β-methyl-1,4-pregnadiene-17α,21-diol-3,11,20-trione 21-acetate,
6β-bromo-16α-methyl-1,4-pregnadiene-17α,21-diol-3,11,20-trione 21-acetate,
6β-bromo-16α-n-butyl-1,4-pregnadiene-17α,21-diol-3,11,20-trione 21-acetate,
6β-bromo-16β-n-butyl-1,4-pregnadiene-17α,21-diol-3,11-20-trione 21-acetate,
6β-bromo-9α-fluoro-16α-methyl-1,4-pregnadiene-17α,21-diol-3,11,20-trione 21-acetate,
6β-bromo-9α-fluoro-16α-methyl-1,4-pregnadiene-11β,17α,21-triol-3,20-dione 21-acetate,
6β-bromo-9α-fluoro-16β-methyl-1,4-pregnadiene-11β,17α,21-triol-3,20-dione 21-acetate,
6β-bromo-9α,11β-dichloro-16α-methyl-1,4-pregnadiene-17α,21-diol-3,20-dione 21-acetate,
6β-bromo-9α,11β-dichloro-16β-methyl-1,4-pregnadiene-17α,21-diol-3,20-dione 21-acetate,
6β-bromo-16-methylene-1,4-pregnadiene-17α,21-diol-3,11,20-trione 21-acetate,
6β-bromo-16-methylene-1,4-pregnadiene-11β,17α,21-triol-3,20-dione 21-acetate,
6β-bromo-9α-fluoro-16-methylene-1,4-pregnadiene-11β,17α,21-triol-3,20-dione 21-acetate,
6β-bromo-9α-fluoro-16-methylene-1,4-pregnadiene-17α,21-diol-3,11,20-trione 21-acetate,
6β-bromo-9α-fluoro-16-methylene-1,4-pregnadiene-11β,17α,21-triol-3,20-dione 21-tertiary butyrate,
6β-bromo-16-chloromethylene-1,4-pregnadiene-17α,21-diol-3,20-dione 21-acetate,
6β-bromo-16-chloromethylene-1,4-pregnadiene-17α,21-diol-3,11,20-trione 21-acetate,
6β-bromo-16-chloromethylene-1,4-pregnadiene-11β,17α,21-triol-3,20-dione 21-acetate,
6β-bromo-16-fluoromethylene-1,4-pregnadiene-11β,17α,21-triol-3,20-dione 21-acetate,
6β-bromo-16-fluoromethylene-1,4-pregnadiene-11β,17α,21-triol-3,20-dione 21-tertiary butyrate,
6β-bromo-16-fluoromethylene-1,4-pregnadiene-17α,21-diol-3,11,20-trione 21-acetate,
6β-bromo-9α-fluoro-16-fluoromethylene-1,4-pregnadiene-11β,17α,21-triol-3,20-dione 21-acetate,
6β-bromo-9α,11β-dichloro-16-fluoromethylene-1,4-pregnadiene-17α,21-diol-3,20-dione 21-acetate,
6β-bromo-1,4-pregnadiene-16α,17α,21-triol-3,11,20-trione 16,21-diacetate,
6β-bromo-1,4-pregnadiene-11β,16α,17α,21-tetrol-3,20-dione 16,21-diacetate,
6β-bromo-9α-fluoro-1,4-pregnadiene-11β,16α,17α,21-tetrol-3,20-dione 16,21-diacetate,
6β-bromo-9α-fluoro-16α,17α-isopropylidenedioxy-1,4-pregnadiene-11β,21-diol-20-one 21-acetate,
6β-bromo-9α-fluoro-16α,17α-iso-propylidenedioxy-1,4-pregnadiene-21-ol-3,11,20-trione 21-acetate,
6β-bromo-9α,11β-dichloro-16α,17α-iso-propylidenedioxy-1,4-pregnadiene-21-ol-3,20-dione 21-acetate,
6β-bromo-17α,21-iso-propylidenedioxy-1,4-pregnadiene-3,11,20-trione,
6β-bromo-17α,21-iso-propylidenedioxy-1,4-pregnadiene-11β-ol-3,20-dione,
6β-bromo-9α-fluoro-16α-methyl-17α,21-iso-propylidenedioxy-1,4-pregnadiene-11β-ol-3,20-dione,
6β-bromo-17α,21-(2-butylidenedioxy)-1,4-pregnadiene-11β-ol-3,20-dione,
6β-bromo-9α,11β-dichloro-17α,21-iso-propylidenedioxy-1,4-pregnadiene-3,20-dione,
6β-bromo-9α,11β-dichloro-16α-methyl-17α,21-iso-propylidenedioxy-1,4-pregnadiene-3,20-dione,
6β-bromo-9α,11β-dichloro-16β-methyl-17α,21-iso-propylidenedioxy-1,4-pregnadiene-3,20-dione,
6β-bromo-9α,11β-dichloro-16-methylene-17α,21-iso-propylidenedioxy-1,4-pregnadiene-3,20-dione, Isolate and purify the resultant respective products in a manner similar to that described in above Example 19(A) to obtain, respectively:

6α-azido-9α-fluoro-1,4-pregnadiene-17α,21-diol-3,11-20-trione 21-acetate,
6α-azido-9α-broom-1,4-pregnadiene-17α,21-diol-3,11,20-trione 21-acetate,
6α-azido-1,4-pregnadiene-11β,17α,21-triol-3,20-dione 21-acetate,
6α-azido-1,4-pregnadiene-21-ol-3,20-dione 21-acetate,
6α-azido-9α,11β-dichloro-1,4-pregnadiene-17α,21-diol-3,20-dione 21-acetate,
6α-azido-9α,11β-dichloro-1,4-pregnadiene-17α,21-diol-3,20-dione 21-phosphate,
6α-azido-16α-methyl-1,4-pregnadiene-17α,21-diol-3,11,20-trione 21-acetate,
6α-azido-16β-methyl-1,4-pregnadiene-17α,21-diol-3,11,20-trione 21-acetate,
6α-azido-16α-methyl-1,4-pregnadiene-17α,21-diol-3,11,20-trione 21-acetate,
6α-azido-16α-n-butyl-1,4-pregnadiene-17α,21-diol-3,11,20-trione 21-acetate,
6α-azido-16β-n-butyl-1,4-pregnadiene-17α,21-diol-3,11,20-trione 21-acetate,
6α-azido-9α-fluoro-16α-methyl-1,4-pregnadiene-17α,21-diol-3,11,20-trione 21-acetate,
6α-azido-9α-fluoro-16α-methyl-1,4-pregnadiene-11β,17α,21-triol-3,20-dione 21-acetate,
6α-azido-9α-fluoro-16β-methyl-1,4-pregnadiene-11β,17α,21-triol-3,20-dione 21-acetate,
6α-azido-9α,11β-dichloro-16α-methyl-1,4-pregnadiene-17α-21-diol-3,20-dione 21-acetate,
6α-azido-9,11β-dichloro-16β-methyl-1,4-pregnadiene-17,21-diol-3,20-dione 21-acetate,
6α-azido-16-methylene-1,4-pregnadiene-17α,21-diol-3,11,20-trione 21-acetate,
6α-azido-16-methylene-1,4-pregnadiene-11β,17α,21-triol-3,20-dione 21-acetate,
6α-azido-9α-fluoro-16-methylene-1,4-pregnadiene-11β,17α,21-triol-3,20-dione 21-acetate,
6α-azido-9α-fluoro-16-methylene-1,4-pregnadiene-17α,21-diol-3,11,20-trione 21-acetate,
6α-azido-9α-fluoro-16-methylene-1,4-pregnadiene-11β,17α,21-triol-3,20-dione 21-tertiary butyrate,
6α-azido-16-chloromethylene-1,4-pregnadiene-17α,21-diol-3,20-dione 21-acetate,
6α-azido-16-chloromethylene-1,4-pregnadiene-17α,21-diol-3,11,20-trione 21-acetate,
6α-azido-16-chloromethylene-1,4-pregnadiene-11β,17α,21-triol-3,20-dione 21-acetate,
6α-azido-16-fluoromethylene-1,4-pregnadiene-11β,17α,21-triol-3,20-dione 21-acetate,
6α-azido-16-fluoromethylene-1,4-pregnadiene-11β,17α,21-triol-3,20-dione 21-tertiary butyrate,
6α-azido-16fluoromethylene-1,4-pregnadiene-17α,21-diol-3,11,20-trione 21-acetate,
6α-azido-9α-fluoro-16-fluoromethylene-1,4-pregnadiene-11β,17α,21-triol-3,20-dione 21-acetate,
6α-azido-9α,11β-dichloro-16-fluoromethylene-1,4-pregnadiene-17α,21-diol-3,20-dione 21-acetate,
6α-azido-1,4-pregnadiene-16α,17α,21-triol-3,11,20-trione 16,21-diacetate,
6α-azido-1,4-pregnadiene-11β,16α,17α,21-tetrol-3,20-dione 16,21-diacetate,
6α-azido-9α-fluoro-1,4-pregnadiene-11β,16α,17α,21-tetrol-3,20-dione 16,21-diacetate,
6α-azido-9α-fluoro-16α,17α-iso-propylidenedioxy-1,4-pregnadiene-11β,21-diol-20-one 21-acetate,
6α-azido-9α-fluoro-16α,17α-iso-propylidenedioxy-1,4-pregnadiene-21-ol-3,11,20-trione 21-acetate,
6α-azido-9α,11β-dichloro-16α,17α-iso-propylidenedioxy-1,4-pregnadiene-21-ol-3,20-dione 21-acetate, 6α-azido-17α,21-iso-propylidenedioxy-1,4-pregnadiene-3,11,20-trione,
6α-azido-17α,21-iso-propylidenedioxy-1,4-pregnadiene-11β-ol-3,20-dione,
6α-azido-9α-fluoro-16α-methyl-17α,21-iso-propylidenedioxy-1,4-pregnadiene-11β-ol-3,20-dione,
6α-azido-17α,21-(2-butylidenedioxy)-1,4-pregnadiene-11β-ol-3,20-dione,
6α-azido-9α-11β-dichloro-17α,21-iso-propylidenedioxy-1,4-pregnadiene-3,20-dione,
6α-azido-9α,11β-dichloro-16α-methyl-17α,21-iso-propylidenedioxy-1,4-pregnadiene-3,20-dione,
6α-azido-9α,11β-dichloro-16β-methyl-17α,21-iso-propylidenedioxy-1,4-pregnadiene-3,20-dione,
6α-azido-9α,11β-dichloro-16-methylene-17α,21-iso-propylidenedioxy-1,4-pregnadiene-3,20-dione.

EXAMPLE 20

6α-Azido-4-Pregnene-17α,21-Diol-3,20-Diones and Derivatives Thereof (A) 6α - azido -4- pregnene-17α,21-diol-3,11,20-trione 21-acetate (6α-azido-cortisone 21-acetate)

(1) To a solution of 1.44 g. of 6β-chloro-4-pregnene-17α,21-diol-3,11,20-trione 21-acetate in 200 ml. of dimethylformamide under an atmosphere of nitrogen add 0.6 g. sodium azide. Stir for 45 minutes under nitrogen then add 2 liters of water and collect by filtration the resultant precipitate comprising 6α-azido-4-pregnene-17α,21-diol-3,11,20-trione 21-acetate. Purify by crystallization from ethyl acetate-hexane.

(2) To a solution of 1 g. of 6β-bromo-4-pregnene-17α,21-diol-3,11,20-trione 21-acetate in 200 ml. of dimethylformamide under an atmosphere of nitrogen add 0.5 g. of sodium azide. Stir the reaction mixture at room temperature under an atmosphere of nitrogen for 2 hours then add 2 liters of water and collect by filtration the resultant precipitate comprising 6α-azido-4-pregnene-17α,21-diol-3,11,20-trione 21-acetate. Purify by crystallization from ethyl acetate-hexane.

(B) In a manner similar to that described in Example 20(A)(2) treat each of the 1,2-dihydro-analogs of the 6β-bromo-1,4-pregnadiene starting compounds of Example 19(B) (i.e. the corresponding 6β-bromo-4-pregnene-17α, 21-diol-3,20-diones and derivatives thereof) with sodium azide in dimethylformamide at room temperature under an atmosphere of nitrogen. Isolate and purify the resultant respective products in a manner similar to that described in Example 20(A)(2) to obtain the following respective 6α - azido-4-pregnene-17α,21-diol-3,20-diones and derivatives thereof:

6α-azido-9α-fluoro-4-pregnene-17α,21-diol-3,11,20-trione 21-acetate,
6α-azido-9α-bromo-4-pregnene-17α,21-diol-3,11,20-trione 21-acetate,
6α-azido-9α-chloro-4-pregnene-17α,21-diol-3,11,20-trione 21-acetate,
6α-azido-4-pregnene-11β,17α,21-triol-3,20-dione 21-acetate,
6α-azido-4-pregnene-21-ol-3,20-dione 21-acetate,
6α-azido-9α,11β-dichloro-4-pregnene-17α,21-diol-3,20-dione 21-acetate,
6α-azido-9α,11β-dichloro-4-pregnene-17α,21-diol-3,20-dione 21-phosphate,
6α-azido-16α-methyl-4-pregnene-17α,21-diol-3,11,20-trione 21-acetate,
6α-azido-16β-methyl-4-pregnene-17α,21-diol-3,11,20-trione 21-acetate,
6α-azido-16α-methyl-4-pregnene-17α,21-diol-3,11,20-trione 21-acetate,
6α-azido-16α-n-butyl-4-pregnene-17α,21-diol-3,11,20-trione 21-acetate,
6α-azido-16β-n-butyl-4-pregnene-17α,21-diol-3,11,20-trione 21-acetate,
6α-azido-9α-fluoro-16α-methyl-4-pregnene-17α,21-diol-3,11,20-trione 21-acetate,
6α-azido-9α-fluoro-16α-methyl-4-pregnene-11β,17α,21-triol-3,20-dione 21-acetate,
6α-azido-9α-fluoro-16β-methyl-4-pregnene-11β,17α,21-triol-3,20-dione 21-acetate,
6α-azido-9α,11β-dichloro-16α-methyl-4-pregnene-17α,21-diol-3,20-dione 21-acetate,
6α-azido-9α,11β-dichloro-16β-methyl-4-pregnene-17α,21-diol-3,20-dione 21-acetate,
6α-azido-16-methylene-4-pregnene-17α,21-diol-3,11,20-trione 21-acetate,
6α-azido-16-methylene-4-pregnene-11β-17α,21-triol-3,20-dione 21-acetate,
6α-azido-9α-fluoro-16-methylene-4-pregnene-11β,17α,21-triol-3,20-dione 21-acetate,
6α-azido-9α-fluoro-16-methylene-4-pregnene-17α,21-diol-3,11,20-trione 21-acetate,
6α-azido-9α-fluoro-16-methylene-4-pregnene-11β,17α,21-triol-3,20-dione 21-tertiary butyrate,
6α-azido-16-chloromethylene-4-pregnene-17α,21-diol-3,20-dione 21-acetate,
6α-azido-16-chloromethylene-4-pregnene-17α,21-diol-3,11,20-trione 21-acetate,
6α-azido-16-chloromethylene-4-pregnene-11β,17α,21-triol-3,20-dione 21-acetate,
6α-azido-16-fluoromethylene-4-pregnene-11β,17α,21-triol-3,20-dione 21-acetate,
6α-azido-16-fluoromethylene-4-pregnene-11β,17α,21-triol-3,20-dione 21-tertiary butyrate,
6α-azido-16-fluoromethylene-4-pregnene-17α,21-diol-3,11,20-trione 21-acetate,
6α-azido-9α-fluoro-16-fluoromethylene-4-pregnene-11β,17α,21-triol-3,20-dione 21-acetate,
6α-azido-9α,11β-dichloro-16-fluoromethylene-4-pregnene-17α,21-diol-3,20-dione 21-acetate,
6α-azido-4-pregnene-16α,17α,21-triol-3,11,20-trione 16,21-diacetate,
6α-azido-4-pregnene-11β,16α,17α,21-tetrol-3,20dione 16,21-diacetate,
6α-azido-9α,fluoro-4-pregnene-11β,16α,17α,21-tetrol-3,20-dione 16,21-diacetate,
6α-azido-9α-fluoro-16α,17α-iso-propylidenedioxy-4-pregnene-11β,21-diol-20-one 21-acetate,
6α-azido-9α-fluoro-16α,17α-iso-propylidenedioxy-4-pregnene-21-ol-3,11,20-trione 21-acetate,
6α-azido-9α,11β-dichloro-16α,17α-iso-propylidenedioxy-4-pregnene-21-ol-3,20-dione 21-acetate,
6α-azido-17α,21-iso-propylidenedioxy-4-pregnene-3,11,20-trione,
6α-azido-17α,21-iso-propylidenedioxy-4-pregnene-11β-ol-3,20-dione,
6α-azido-9α-fluoro-16α-methyl-17α,21-iso-propylidenedioxy-4-pregnene-11β-ol-3,20-dione,
6α-azido-17α,21-(2-butylidenedioxy)-4-pregnene-11β-ol-3,20-dione,
6α-azido-9α,11β-dichloro-17α,21-iso-propylidenedioxy-4-pregnene-3,20-dione,
6α-azido-9α,11β-dichloro-16α-methyl-17α,21-iso-propylidenedioxy-4-pregnene-3,20-dione,
6α-azido-9α,11β-dichloro-16β-methyl-17α,21-iso-propylidenedioxy-4-pregnene-3,20-dione,
6α-azido-9α,11β-dichloro-16-methylene-17α,21-iso-propylidenedioxy-4-pregnene-3,20-dione,

EXAMPLE 21

Hydrolysis of 6 - azido-4-pregnene-17α,21-diol-3,20-dione 21-lower alkanoates to the corresponding 21-hydroxy derivative (A) 6 - Azido - 4,6 - pregnadiene-17α,21-diol-3,11,20-trione.—To a solution of 2.2 g. of 6-azido-4,6-pregnadiene - 17α,21-diol-3,11,20-dione 21-acetate in 15 ml. of tetrahydrofuran, 10 ml. methanol and 5 ml. of water at 0° C. add dropwise 5 ml. of 1-N-aqueous sodium hydroxide over a half-hour period with stirring while bubbling nitrogen through the solution. Continue stirring at 0° C. under a blanket of nitrogen for another 1.5 hours, then neutralize with acetic acid. Pour into water and filter the resultant precipitate comprising 6-azido-4,6-pregnadiene-17α,21-diol-3,11,20-trione. Purify by crystallization from acetone-hexane.

(B) In a similar manner treat each of the following 6 - azido-4,6-pregnadiene-17α,21-diol-3,20-dione 21-acetates with sodium hydroxide in aqueous methanol and tetrahydrofuran at 0° C.:

6-azido-4,6-pregnadiene-11β,17α,21-triol-3,20-dione 21-acetate,
6-azido-4,6-pregnadiene-17α,21-diol-3,20-dione 21-acetate,
6-azido-4,6-pregnadiene-21-ol-3,20-dione 21-acetate,
6-azido-9α,11β-dichloro-4,6-pregnadiene-17α,21-diol-3,20-dione 21-acetate,
6-azido-9α-fluoro-4,6-pregnadiene-17α,21-diol-3,11,20-trione 21-acetate,
6-azido-16α-methyl-4,6-pregnadiene-17α,21-diol-3,11,20-trione 21-acetate,
6-azido-16β-methyl-4,6-pregnadiene-17α,21-diol-3,11,20-trione 21-acetate,
6-azido-16-methylene-4,6-pregnadiene-17α,21-diol-3,11,20-trione 21-acetate, and
6-azido-4,6-pregnadiene-16α,17α,21-triol-3,11,20-trione 16,21-diacetate.

Isolate and purify the resultant respective products in a manner similar to that described in Example 21(A) to obtain, respectively:

6-azido-4,6-pregnadiene-11β,17α,21-triol-3,20-dione,
6-azido-4,6-pregnadiene-17α,21-diol-3,20-dione,
6-azido-4,6-pregnadiene-21-ol-3,20-dione,
6-azido-9α,11β-dichloro-4,6-pregnadiene-17α,21-diol-3,20-dione,
6-azido-9α-fluoro-4,6-pregnadiene-17α,21-diol-3,11,20-trione,
6-azido-16α-methyl-4,6-pregnadiene-17α,21-diol-3,11,20-trione,
6-azido-16β-methyl-4,6-pregnadiene-17α,21-diol-3,11-20-trione,
6-azido-16-methylene-4,6-pregnadiene-17α,21-diol-3,11,20-trione, and
6-azido-4,6-pregnadiene-16α,17α,21-triol-3,11,20-trione.

(C) In a manner similar to that described in Example 21(A), hydrolyze the 6-azido-4-pregnene-17,21-diol-3,20-dione 21-lower alkanoates such as those prepared in preceding Examples 12, 13, 14, 15, 18, 19, and 20 with sodium hydroxide in aqueous methanol and tetrahydrofuran at 0° C. to obtain the corresponding 21-hydroxy derivative.

In those instances where more than one ester function is present in the molecule, e.g. in 6-azido-9α-fluoro-4,6-pregnadiene-11β,16α,17α,21-tetrol-3,20-dione 16,21diacetate, add an additional 5 ml. of 1-N-aqueous sodium hydroxide for each additional ester function.

EXAMPLE 22

Acid hydrolysis of 6-azido-9α-halogeno-4,6-pregnadiene-11β,17α,21-triol-3,20-dione 21-lower alkanoates (A) 6 - azido - 9α-chloro-16β-methyl-4,6-pregnadiene-11β,17α,21-triol-3,20-dione.—To a solution of 10 ml. of methanol and 0.6 ml. of chloroform containing 0.365 ml. of 70% perchloric acid add 0.18 g. of 6-azido-9α-chloro-16β - methyl-4,6-pregnadiene-11β,17α,21-triol-3,20-dione 21-acetate. Stir the reaction mixture at room temperature for about 18 hours, then pour into 100 ml. of water. Pass nitrogen into the reaction mixture for 45 minutes. Filter the resultant precipitate comprising 6-azido-9α-chloro-16β-methyl-4,6-pregnadiene-11β,17α,21-triol-3,20-dione.

(B) Similarly, treat each of the following 9α-halogeno-11β - hydroxy-6-azido-4-pregnene-17α,21-diol-3,20-dione 21-lower alkanoates with 70% perchloric acid in chloroform-methanol at room temperature:

6-azido-9α-chloro-16α-methyl-4,6-pregnadiene-11β,17α,21-triol-3,20-dione 21-acetate,
6-azido-9α-fluoro-16α-methyl-4,6-pregnadiene-11β,17α,21-triol-3,20-dione 21-acetate,
6-azido-9α-fluoro-16β-methyl-4,6-pregnadiene-11β,17α,21-triol-3,20-dione 21-acetate,
6-azido-9α-bromo-16α-methyl-4,6pregnadiene-11β,17α,21-triol-3,20-dione 21-acetate,
6-azido-9α-bromo-16β-methyl-4,6-pregnadiene-11β,17α,21-triol-3,20-dione 21-acetate,
6-azido-9α-chloro-16-methylene-4,6-pregnadiene-11β,17α,21-triol-3,20-dione 21-acetate,
6-azido-9α-fluoro-16-methylene-4,6-pregnadiene-11β,17α,21-triol-3,20-dione 21-tertiary butyrate,
6-azido-9α-bromo-16-fluoromethylene-4,6-pregnadiene-17α,21-diol-3,20-dione 21-acetate,
6α-azido-9α-fluoro-1,4-pregnadiene-11β,17α,21-triol-3,20-dione 21-acetate, and
6α-azido-9α-fluoro-4-pregnene-11β,17α,21-triol-3,20-dione 21-acetate.

Isolate and purify the resultant respective products in a manner similar to that described in Example 22(A) to obtain, respectively:

6-azido-9α-chloro-16α-methyl-4,6-pregnadiene-11β,17α,21-triol-3,20-dione,
6-azido-9α-fluoro-16α-methyl-4,6-pregnadiene-11β,17α,21-triol-3,20-dione,
6-azido-9α-fluoro-16β-methyl-4,6-pregnadiene-11β,17α,21-triol-3,20-dione,
6-azido-9α-bromo-16α-methyl-4,6-pregnadiene-11β,17α,21-triol-3,20-dione,
6-azido-9α-bromo-16β-methyl-4,6-pregnadiene-11β,17α,21-triol-3,20-dione,
6-azido-9α-chloro-16-methylene-4,6-pregnadiene-11β,17α,21-triol-3,20-dione,
6-azido-9α-fluoro-16-methylene-4,6-pregnadiene-11β,17α,21-triol-3,20-dione,
6-azido-9α-bromo-16-fluoromethylene-4,6-pregnadiene-17α,21-diol-3,20-dione,
6α-azido-9α-fluoro-1,4-pregnadiene-11β,17α,21-triol-3,20-dione, and
6α-azido-9α-fluoro-4-pregnene-11β,17α,21-triol-3,20-dione.

(C) In a manner similar to that described in Example 22(A) treat each of the 6-azido-4-pregnene-17α,21-diol-3,20-dione 21-lower alkanoates prepared in preceding Examples 1–20 with 70% perchloric acid in methanol-chloroform to obtain the corresponding 21-hydroxy derivatives.

EXAMPLE 23

The cleavage of the 17α,21-alkylidenedioxy function in 6-azido-17α,21-alkylidenedioxy-4-pregnene-3,20-diones (A) 6 - azido - 4,6 - pregnadiene-17α,21-diol-3,11,20-trione.—Heat a solution of 6-azido-17α,21-iso-propylidenedioxy - 4,6 - pregnadiene-3,11,20-trione in 10 ml. of acetic acid and 10 ml. of water at about 60° C. under a nitrogen atmosphere for 1.5 hours. Concentrate the reaction solution in vacuo to a residue comprising 6-azido-4,6-pregnadiene-17α,21-diol-3,11,20 - trione. Purify by crystallizing the residue from acetone-hexane.

(B) In a similar manner cleave each of the 17α,21-alkylidenedioxy derivatives prepared as described in Example 17 to obtain the corresponding 17,21-diols, namely:

6-azido-4,6-pregnadiene-17α,21-diol-3,11,20-trione,
6-azido-4,6-pregnadiene-11β,17α,21-diol-3,20-dione,
6-azido-9α-fluoro-4,6-pregnadiene-11β,17α,21-triol-3,20-dione,
6-azido-9α-fluoro-16α-methyl-4,6-pregnadiene-11β,17α,21-triol-3,20-dione,
6-azido-9α-fluoro-16β-methyl-4,6-pregnadiene-11β,17α,21-triol-3,20-dione,
6-azido-4,6,9(11)-pregnatriene-17α,21-diol-3,20-dione, 6-azido-9α,11β-dichloro-4,6-pregnadiene-17α,21-diol-3,20-dione,
6-azido-9α-fluoro-11β-chloro-4,6-pregnadiene-17α,21-diol-3,20-dione,
6-azido-9α-bromo-11β-fluoro-4,6-pregnadiene-17α,21-diol-3,20-dione,
6-azido-9α,11β-dichloro-16α-methyl-4,6-pregnadiene-17α,21-diol-3,20-dione,
6-azido-9α,11β-dichloro-16-methylene-4,6-pregnadiene-17α,21-diol-3,20-dione, and
6-azido-9α-fluoro-16-methylene-4,6-pregnadiene-11β,17α-21-triol-3,20-dione.

EXAMPLE 24

6-Azido-4-Pregnene-17α,21-Diol-3,20-Dione 21-Phosphates and the Disodium Salt Thereof (A) 6-azido-4-pregnene-17α,21-diol-3,20-dione 21-methanesulfonates (1) To a solution of 5 g. of 6-azido-4,6-pregnadiene-17α,21-diol-3,11,20-trione in 50 ml. of pyridine cooled to −20° C., add dropwise 5 ml. of methanesulfonyl chloride. Stir at −20° C. for 30 minutes then pour into water and stir for 2 hours longer at room temperature. Filter and dry the resultant precipitate comprising 6-azido-4,6-pregnadiene - 17α,21-diol-3,11,20-trione 21-methanesulfonate. Purify by crystallization from acetone-hexane.

(2) In a similar manner treat each of the following with methanesulfonyl chloride in pyridine at −20° C.:

6-azido-4,6-pregnadiene-11β,17α,21-triol-3,20-dione,
6-azido-9α-fluoro-16α-methylene-4,6-pregnadiene-11β,17α,21-triol-3,20-dione,
6-azido-9α-fluoro-16β-methyl-4,6-pregnadiene-11β,17α,21-triol-3,20-dione,
6-azido-16α-methyl-4,6-pregnadiene-17α,21-diol-3,11,20-trione,
6-azido-16β-methyl-4,6-pregnadiene-17α,21-diol-3,11,20-trione,
6-azido-9α-fluoro-16α,17α-iso-propylidenedioxy-4,6-pregnadiene-11β,21-diol-3,20-dione, and
6-azido-9α-fluoro-16-methylene-4,6-pregnadiene-11β,17α,21-triol-3,20-dione.

Isolate and purify the resultant respective products in a manner similar to that described in Example 24(A)(1) to obtain, respectively:

6-azido-4,6-pregnadiene-11β,17α,21-triol-3,20-dione 21-methanesulfonate,
6-azido-9α-fluoro-16α-methyl-4,6-pregnadiene-11β,17α,21-triol-3,20-dione 21-methanesulfonate,
6-azido-9α-fluoro-16β-methyl-4,6-pregnadiene-11β,17α,21-triol-3,20-dione 21-methanesulfonate,
6-azido-16α-methyl-4,6-pregnadiene-17α,21-diol-3,11,20-trione 21-methanesulfonate,
6-azido-16β-methyl-4,6-pregnadiene-17α,21-diol-3,11,20-trione 21-methanesulfonate,
6-azido-9α-fluoro-16α,17α-iso-propylidenedioxy-4,6-pregnadiene-11β,21-diol-3,20-dione 21-methanesulfonate, and
6-azido-9α-fluoro-16-methylene-4,6-pregnadiene-11β,17α,21-triol-3,20-dione 21-methanesulfonate, (B) 6-azido-21-iodo-4-pregnene-17α-ol-3,11,20-triones (1) To 3.5 g. of 6-azido-4,6-pregnadiene-17α,21-diol-3,11,20-trione 21-methanesulfonate in 52.5 ml. of acetone add 3.5 g. of sodium iodide. Heat the reaction mixture at reflux temperature for 20 minutes then pour into 500 ml. of water, filter and air dry the resultant precipitate comprising 6-azido-21-iodo - 4,6 - pregnadiene-17α-ol-3,11,20-trione. Purify by crystallization from acetone-hexane.

(2) In a similar mannner treat each of the methanesulfonate ester derivatives prepared as described in Example 24(A)(2) with sodium iodide in acetone in the manner describer in Example 24(B)(1) to obtain, respectively:

6-azido-21-iodo-4,6-pregnadiene-11β,17α-diol-3,20-dione,
6-azido-9α-fluoro-21-iodo-16α-methyl-4,6-pregnadiene-11β,17α-diol-3,20-dione,
6-azido-9α-fluoro-21-iodo-16β-methyl-4,6-pregnadiene-11β,17α-diol-3,20-dione,
6-azido-16α-methyl-21-iodo-4,6-pregnadiene-17α-ol-3,11,20-trione,
6-azido-16β-methyl-21-iodo-4,6-pregnadiene-17α-ol-3,11,20-trione,
6-azido-9α-fluoro-2-iodo-16α,17α-iso-propylidenedioxy-4,6-pregnadiene-11β-ol-3,20-dione,
6-azido-9α-fluoro-21-iodo-16-methylene-4,6-pregnadiene-11β,17α-diol-3,20-dione.

(C) 6-azido-4-pregnene-17α,21-diol-3,20-dione 21-phosphate esters (1) To 43 ml. of methanol at room temperature add dropwise with stirring 24 ml. of 85% aqueous phosphoric acid. Add cautiously 75.4 ml. of triethylamine followed by 12.7 g. of 6-azido-21-iodo-4,6-pregnadiene-17α-ol-3,11,20-trione. Warm the reaction mixture on a steam bath for 30 minutes then with stirring pour the reaction mixture into water (260 ml.) containing concentrated hydrochloric acid (72.5 ml.). Filter the resultant precipitate comprising 6 - azido-4,6-pregnadiene-17α,21-diol-3,11,20-trione 21-phosphate. Purify by crystallization from aqueous acetone.

(2) In a similar manner treat each of the 21-iodo-4-pregnenes prepared as described in Example 24(B)(2) with 85% phosphoric acid in triethylamine and methanol. Isolate and purify the resultant respective products in a manner similar to that described to obtain respectively:

6-azido-4,6-pregnadiene-11β,17α,21-triol-3,20-dione 21-phosphate,
6-azido-9α-fluoro-16α-methyl-4,6-pregnadiene-11β,17α,21-triol-3,20-dione 21-phosphate,
6-azido-9α-fluoro-16β-methyl-4,6-pregnadiene-11β,17α,21-triol-3,20-dione 21-phosphate,
6-azido-16α-methyl-4,6-pregnadiene-17α,21-diol-3,11,20-trione 21-phosphate,
6-azido-16β-methyl-4,6-pregnadiene-17α,21-diol-3,11,20-trione 21-phosphate,
6-azido-9α-fluoro-16α,17α-iso-proplidenedioxy-4,6-pregnadiene-11β,21-diol-3,20-dione 21-phosphate, and
6-azido-9α-fluoro-16-methylene-4,6-pregnadiene-11β,17α,21-triol-3,20-dione 21-phosphate.

(D) 6-azido-4-pregnene-17α,21-diol-3,20-dione disodium phosphate esters (1) To a solution of 2 g. of 6-azido-4,6-pregnadiene-17α,21 - diol-3,11,20-trione 21-phosphate in 100 ml. of aqueous methanol (1:3) add with stirring aqueous sodium hydroxide until the solution is at pH 9.5. Pour the reaction mixture into 600 ml. of acetone and filter an air dry the resultant precipitate comprising 6-azido-4,6-pregnadiene-17α,21-diol-3,11,20-trione 21 - disodium phosphate.

(2) In a manner similar to that described above, treat each of the 21-phosphate esters prepared as described in Example 24(C)(2) with aqueous sodium hydroxide to obtain the following 21-disodium phosphate esters:

6-azido-4,6-pregnadiene-11β,17α,21-triol-3,20-dione 21-disodium phosphate,
6-azido-9α-fluoro-16α-methyl-4,6-pregnadiene-11β,17α,21-triol-3,20-dione 21-disodium phosphate,
6-azido-9α-fluoro-16β-methyl-4,6-pregnadiene-11β,17α,21-triol-3,20-dione 21-disodium phosphate,
6-azido-16α-methyl-4,6-pregnadiene-17α,21-diol-3,11,20-trione 21-disodium phosphate,
6-azido-16β-methyl-4,6-pregnadiene-17α,21-diol-3,11,20-trione 21-disodium phosphate, 6-azido-9α-fluoro-16α,17α-iso-propylidenedioxy-4,6-pregnadiene-11β,21-diol-3,20-dione 2-disodium phosphate, and
6-azido-9α-fluoro-16-methylene-4,6-pregnadiene-11β,17α,21-triol-3,20-dione 21-disodium phosphate.

EXAMPLE 25

Hydrolysis of 21-phosphate esters of 6-azido-4-pregnene-17α,21-diol-3,20-diones

To 300 mg. of 6-azido-9α-fluoro-16β-methyl-4,6-pregnadiene-11β,17α,21-triol - 3,20 - dione 21-phosphate dissolved in 4 ml. of a one molar aqueous trishydroxymethylaminomethane solution titrated to pH 8 with hydrochloric acid add 0.2 ml. of bacterial alkaline phosphates (Worthington Biochemical Corp., Freehold, N.J.—chromatographically purified grade). Maintain the reaction mixture at 37° C. for 20 minutes, cool to 25° C., add water and filter the resultant precipitate comprising 6-azido-9α-fluoro-16β-methyl - 4,6 - pregnadiene-11β,17α,21-triol-3,20-dione. Purify by thin layer chromatography utilizing as solvent chloroform-ethyl acetate (1:1). From the preparative plate extract the more polar product with chloroform-ethyl acetate (1:1). Concentrate the ethyl acetate-chloroform extract and recrystallize the resultant residue from acetone-hexane.

In similar mannner each of the 21-phosphate esters prepared as described in Example 24(C)(1) and 2 may be hydrolyzed utilizing bacterial alkaline phosphates.

EXAMPLE 26

The 17-mono-alkanoates, 21-mono-alkanoates and 17,21-di-alkanoates of 6-azido-4,6-pregnadiene-17α,21-diol-3,20-diones (A) 6 - azido-17α,21-(1'-methoxy-1'-n-butylmethylenedioxy)-4,6-pregnadiene-3,11,20-trione.—To a solution of 1 g. of 6-azido-4,6-pregnadiene-17α,21-diol-3,11,20-trione in 40 ml. of dioxane add 0.27 mg. of p-toluenesulfonic acid monohydrate and 0.7 ml. of methylorthovalerate and allow the solution to stand at room temperature for five hours. Pour the reaction mixture into 400 ml. of dilute aqueous sodium bicarbonate and isolate by filtration the resultant precipitate comprising 6-azido-17α,21-(1'-methoxy-1'-n-butylmethylenedioxy)-4,6-pregnadiene - 3,11,20-trione. Wash with water and air dry and use without further purification in the procedure of the following Example 26(B).

In similar manner treat each of the following 6-azido-4,6-pregnadienes with p-toluenesulfonic acid monohydrate and methylorthovalerate in dioxane at room temperature for 10 minutes.

6-azido-9α-fluoro-4,6-pregnadiene-17α,21-diol-3,11,20-trione,
6-azido-4,6-pregnadiene-11β,17α,21-triol-3,20-dione,
6-azido-9α-fluoro-4,6-pregnadiene-11β,17α,21-triol-3,20-dione,
6-azido-16α-methyl-4,6-pregnadiene-17α,21-diol-3,11,20-trione,
6-azido-16β-methyl-4,6-pregnadiene-17α,21-diol-3,11,20-trione,
6-azido-9α-fluoro-16α-methyl-4,6-pregnadiene-17α,21-diol-3,11,20-trione,
6-azido-9α-fluoro-16β-methyl-4,6-pregnadiene-17α,21-diol-3,11,20-trione,
6-azido-16α-methyl-4,6-pregnadiene-11β,17α,21-triol-3,20-dione,
6-azido-16β-methyl-4,6-pregnadiene-11β,17α,21-triol-3,20-dione,
6-azido-9α-fluoro-16α-methyl-4,6-pregnadiene-11β,17α,21-triol-3,20-dione,
6-azido-9α-fluoro-16β-methyl-4,6-pregnadiene-11β,17α,21-triol-3,20-dione,
6-azido-16-methylene-4,6-pregnadiene-17α,21-diol-3,11,20-trione,
6-azido-9α-fluoro-16-methylene-4,6-pregnadiene-17α,21-diol-3,11,20-trione,
6-azido-16-methylene-4,6-pregnadiene-11β,17α,21-triol-3,20-dione,
6-azido-9α-fluoro-16-methylene-4,6-pregnadiene-11β,17α,21-triol-3,20-dione, and
6-azido-9α,11β-dichloro-4,6-pregnadiene-17α,21-diol-3,20-dione.

In a manner similar to that described hereinabove, isolate and purify the resultant respective precipitates comprising, respectively 6-azido-9α-fluoro-17α,21-(1'-methoxy-1'-n-butylmethylenedioxy)-4,6-pregnadiene-3,11,20-trione,
6-azido-17α,21-(1'-methoxy-1'-n-butylmethylenedioxy)-4,6-pregnadiene-11β-ol-3,20-dione,
6-azido-9α-fluoro-17α,21-(1'-methoxy-1'-n-butylmethylenedioxy)-4,6-pregnadiene-11β-ol-3,20-dione,
6-azido-16α-methyl-17α,21-(1'-methoxy-1'-n-butylmethylenedioxy)-3,11,20-trione,
6-azido-16β-methyl-17α,21-(1'-methoxy-1'-n-butylmethylenedioxy)-4,6-pregnadiene-3,11,20-trione,
6-azido-9α-fluoro-16α-methyl-17α,21-(1'-methoxy-1'-n-butylmethylenedioxy)-4,6-pregnadiene-3,11,20-trione,
6-azido-9α-fluoro-16β-methyl-17α,21-(1'-methoxy-1'-n-butylmethylenedioxy)-4,6-pregnadiene-3,11,20-trione,
6-azido-16α-methyl-17α,21-(1'-methoxy-1'-n-butylmethylenedioxy)-4,6-pregnadiene-11β-ol-3,20-dione,
6-azido-16β-methyl-17α,21-(1'-methoxy-1'-n-butylmethylenedioxy)-4,6-pregnadiene-11β-ol-3,20-dione,
6-azido-9α-fluoro-16α-methyl-17α,21-(1'-methoxy-1'-n-butylmethylenedioxy)-4,6-pregnadiene-11β-ol-3,20-dione,
6-azido-9α-fluoro-16β-methyl-17α,21-(1'-methoxy-1'-n-butylmethylenedioxy)-4,6-pregnadiene-11β-ol-3,20-dione,
6-azido-16-methylene-17α,21-(1'-methoxy-1'-n-butylmethylenedioxy)-4,6-pregnadiene-3,11,20-trione,
6-azido-9α-fluoro-16-methylene-17α,21-(1'-methoxy-1'-n-butylmethylenedioxy)-4,6-pregnadiene-3,11,20-trione,
6-azido-16-methylene-17α,21-(1'-methoxy-1'-n-butylmethylenedioxy)-4,6-pregnadiene-11β-ol-3,20-dione,
6-azido-9α-fluoro-16-methylene-17α,21-(1'-methoxy-1'-n-butylmethylenedioxy)-4,6-pregnadiene-11β-ol-3,20-dione, and
6-azido-9α,11β-dichloro-17α-(1'-methoxy-1'-n-butylmethylenedioxy)-4,6-pregnadiene-3,20-dione.

(B) 6-azido-4,6-pregnadiene-17α,21-diol-3,11,20-trione 17-valerate.—Dissolve the 6-azido-17α,21-(1'-methoxy-1'-n-butylmethylenedioxy) - 4,6 - pregnadiene-3,11,20-trione prepared as described in Example 26(A) in 25 ml. of 95% aqueous acetic acid. Allow the solution to stand at room temperature for 10 minutes then pour into 500 ml. of water. Separate by filtration the resultant precipitate comprising 6-azido-4,6-pregnadiene-17α,21-diol-3,11,20-trione 17-valerate. Purify by dissolving the resultant precipitate in acetone, drying the solution over magnesium sulfate, filtering, and evaporating the solution to a residue, crystallizing the residue twice from a solvent mixture comprising hexane-acetone to give 6-azido-4,6-pregnadiene-17α,21-diol-3,11,20-trione 17-valerate.

In a similar manner treat each of the 6-azido-17α,21-(1'-methoxy-1'-n-butylmethylenedioxy) - 4,6 - pregnadiene-3,20-diones prepared as described in the second paragraph of Example 26(A) with 95% acetic acid at room temperature. Isolate and purify the resultant respective products in a manner similar to that described hereinabove to give, respectively 6-azido-9α-fluoro-4,6-pregnadiene-17α,21-diol-3,11,20-trione 17-valerate,
6-azido-4,6-pregnadiene-11β,17α,21-triol-3,20-dione 17-valerate,
6-azido-9α-fluoro-4,6-pregnadiene-11β,17α,21-triol-3,20-dione 17-valerate, 6-azido-16α-methyl-4,6-pregnadiene-17α,21-diol-3,11,20-trione 17-valerate,
6-azido-16β-methyl-4,6-pregnadiene-17α,21-diol-3,11,20-trione 17-valerate,
6-azido-9α-fluoro-16α-methyl-4,6-pregnadiene-17α,21-diol-3,11,20-trione 17-valerate,
6-azido-9α-fluoro-16β-methyl-4,6-pregnadiene-17α,21-diol-3,11,20-trione 17-valerate,
6-azido-16α-methyl-4,6-pregnadiene-11β,17α,21-triol-3,20-dione 17-valerate,
6-azido-16β-methyl-4,6-pregnadiene-11β,17α,21-triol-3,20-dione 17-valerate,
6-azido-9α-fluoro-16α-methyl-4,6-pregnadiene-11β,17α,21-triol-3,20-dione 17-valerate,
6-azido-9α-fluoro-16β-methyl-4,6-pregnadiene-11β,17α,21-triol-3,20-dione 17-valerate,
6-azido-16-methylene-4,6-pregnadiene-17α,21-diol-3,11,20-trione 17-valerate,
6-azido-9α-fluoro-16-methylene-4,6-pregnadiene-17α,21-diol-3,11,20-trione 17-valerate,
6-azido-16-methylene-4,6-pregnadiene-11β,17α,21-triol-3,20-dione 17-valerate,
6-azido-9α-fluoro-16-methylene-4,6-pregnadiene-11β,17α,21-triol-3,20-dione 17-valerate, and
6-azido-9α,11β-dichloro-4,6-pregnadiene-17α,21-diol-3,20-dione 17-valerate.

(C) 6-azido-4,6-pregnadiene-17α,21-diol-3,11,20-trione 17,21-divalerate.—Add 3.0 ml. of valeric anhydride to a solution of 0.5 g. of 6-azido-4,6-pregnadiene-17α,21-diol-3,11,20-trione 17-valerate in 30 ml. of pyridine and allow the reaction mixture to stand at room temperature for 18 hours. Pour the reaction mixture into 400 ml. of water and stir for 20 minutes. Collect the insoluble fraction by filtration, dry in vacuo to yield 6-azido-4,6-pregnadiene-17α,21-diol-3,11,20-trione 17,21-divalerate.

6-azido-4-pregnenes having different acyl groups at C-17 and C-21 are prepared by treating a 17-acylate such as 6-azido-4,6-pregnadiene-11β,21-diol-3,11,20-trione 17-valerate in pyridine in the manner described hereinabove but utilizing in place of valeric anhydride the anhydride of another lower alkanoic acid, e.g. acetic anhydride and propionic anhydride, to obtain the corresponding 17-valerate 21-acetate and 17-valerate 21-propionate, respectively, of 6-azido-4,6-pregnadiene-17α,21-diol-3,11,20-trione.

In a manner similar to that described hereinabove, treat each of the 6-azido-4,6-pregnadiene-17α,21-diol-3,20-dione 17-valerate esters obtained as described in the second paragraph of Example 26(B) with an acid anhydride such as valeric anhydride, acetic anhydride and propionic anhydride in pyridine to obtain the corresponding 17,21-divalerate, 17-valerate, 21-acetate, and 17-valerate, 21-propionate, respectively of the 6-azido-4,6-pregnadiene-17α,21-diol-3,20-dione starting compounds listed in the second paragraph of Example 26(A).

(D) 6-azido-4,6-pregnadiene-17α,21-diol-3,11,20-trione 21-valerate.—Treat 6-azido-4,6-pregnadiene-17α,21-diol-3,11,20-trione with valeric anhydride in pyridine in a manner similar to that described in Example 26(C) (paragraph 1). Isolate and purify the resultant product in a manner similar to that described to obtain 6-azido-4,6-pregnadiene-17α,21-diol-3,11,20-trione 21-valerate.

In the above procedure, by substituting for valeric anhydride other acid anhydrides, e.g. caproic anhydride and butyric anhydride, there is obtained the corresponding 21-lower alkanoate, e.g. 6-azido-4,6-pregnadiene-17α,21-diol-3,11,20-trione 21-caproate and 21-butyrate, respectively.

In a manner similar to that described hereinabove, treat each of the 6-azido-4,6-pregnadiene-17α,21-diol-3,20-dione starting steroids listed in the second paragraph of Example 26(A) with a lower alkanoic acid anhydride, e.g. propionic anhydride, caproic anhydride and butyric anhydride in pyridine. Isolate and purify the resultant respective products in a manner similar to that described to obtain the corresponding 21-lower alkanoate, e.g. the 21-propionate, 21-caproate and 21-butyrate, respectively thereof.

EXAMPLE 27

The 17-mono-propionates, 17-mono-butyrates, 17,21-di-propionates and 17,21-di-butyrates of 6-azido-4,6-pregnadiene-17α,21-diol-3,20-diones (A) 6-azido - 17α,21 - (1'-methoxy-1'-alkylmethylenedioxy)-4,6-pregnadiene-3,20-diones.—In a manner similar to that described in Example 26(A), treat each of the following 6-azido-4,6-pregnadienes in dioxane with p-toluenesulfonic acid monohydrate and methylortho-n-butyrate:

6-azido-4,6-pregnadiene-17α,21-diol-3,11,20-trione,
6-azido-9α-fluoro-4,6-pregnadiene-17α,21-diol-3,11,20-trione,
6-azido-4,6-pregnadiene-11β,17α,21-triol-3,20-dione,
6-azido-9α-fluoro-4,6-pregnadiene-11β,17α,21-triol-3,20-dione,
6-azido-16α-methyl-4,6-pregnadiene-17α,21-diol-3,11,20-trione,
6-azido-16β-methyl-4,6-pregnadiene-17α,21-diol-3,11,20-trione,
6-azido-9α-fluoro-16α-methyl-4,6-pregnadiene-17α,21-diol-3,11,20-trione,
6-azido-9α-fluoro-16β-methyl-4,6-pregnadiene-17α,21-diol-3,11,20-trione,
6-azido-16α-methyl-4,6-pregnadiene-11β,17α,21-triol-3,20-dione,
6-azido-16β-methyl-4,6-pregnadiene-11β,17α,21-triol-3,20-dione,
6-azido-9α-fluoro-16α-methyl-4,6-pregnadiene-11β,17α,21-triol-3,20-dione,
6-azido-9α-fluoro-16β-methyl-4,6-pregnadiene-11β,17α,21-triol-3,20-dione,
6-azido-16-methylene-4,6-pregnadiene-17α,21-diol-3,11,20-trione,
6-azido-9α-fluoro-16-methylene-4,6-pregnadiene-17α,21-diol-3,11,20-trione,
6-azido-16-methylene-4,6-pregnadiene-11β,17α,21-triol-3,20-dione,
6-azido-9α-fluoro-16-methylene-4,6-pregnadiene-11β,17α,21-triol-3,20-dione, and
6-azido-9α,11β-dichloro-4,6-pregnadiene-17α,21-diol-3,20-dione.

Isolate and purify the resultant respective product in a manner similar to that described in Example 26(A) to obtain, respectively:

6-azido-17α,21-(1'-methoxy-1'-n-propylmethylenedioxy)-4,6-pregnadiene-3,11,20-trione,
6-azido-9α-fluoro-17α,21-(1'-methoxy-1'-n-propylmethylenedioxy)-4,6-pregnadiene-3,11,20-trione,
6-azido-17α,21-(1'-methoxy-1'-n-propylmethylenedioxy)-4,6-pregnadiene-11β,ol-3,20-dione,
6-azido-9α-fluoro-17α,21-(1'-methoxy-1'-n-propylmethylenedioxy)-4,6-pregnadiene-11β,ol-3,20-dione,
6-azido-16α-methyl-17α,21-(1'-methoxy-1'-n-propylmethylenedioxy)-3,11,20-trione,
6-azido-16α-methyl-17α,21-(1'-methoxy-1'-n-propylmethylenedioxy)-4,6-pregnadiene-3,11,20-trione,
6-azido-9α-fluoro-16α-methyl-17α,21-(1'-methoxy-1'-n-propylmethylenedioxy)-4,6-pregnadiene-3,11,20-trione,
6-azido-9α-fluoro-16β-methyl-17α,21-(1'-methoxy-1-n-propylmethylenedioxy)-4,6-pregnadiene-3,11,20-trione,
6-azido-16β-methyl-17α,21-(1'-methoxy-1'-n-propylmethylenedioxy)-4,6-pregnadiene-11β-ol-3,20-dione,
6-azido-9α-fluoro-16α-methyl-17α,21-(1'-methoxy-1'-n-propylmethylenedioxy)-4,6-pregnadiene-11β-ol-3,20-dione, 6-azido-9α-fluoro-16β-methyl-17α,21-(1'-methoxy-1'-n propylmethylenedioxy)-4,6-pregnadiene-11β-ol-3,20-dione,
6-azido-16-methylene-17α,21-(1'-methoxy-1'-n-propyl-methylenedioxy)-4,6-pregnadiene-3,11,20-trione,
6-azido-9α-fluoro-16-methylene-17α,21-(1'-methoxy-1'-n-propylmethylenedioxy)-4,6-pregnadiene-3,11,20-trione,
6-azido-16-methylene-17α,21-(1'-methoxy-1'-n-propyl-methylenedioxy)-4,6-pregnadiene-11β-ol-3,20-dione,
6-azido-9α,fluoro-16-methylene-17α,21-(1'-methoxy-1'-n-propylmethylenedioxy)-4,6-pregnadiene-11β-ol-3,20-dione, and
6-azido-9α,11β-dichloro-17α-(1'-methoxy-1'n-propyl-methylenedioxy)-4,6-pregnadiene-3,20-dione.

Similarly, when each of the starting compounds listed hereinabove is treated with p-toluenesulfonic acid monohydrate and methylorthopropionate in dioxane, and the resultant products isolated and purified in a manner similar to that described in Example 26(A), there is obtained the 6-azido-17α,21-(1'-methoxy-1'-ethylmethylenedioxy)-4,6-pregnadiene-3,20-dione derivative, respectively.

(B) 6 - azido - 4,6 - pregnadiene-17α,21-diol-3,20-dione - 17 - valerate esters.—In a manner similar to that described in Example 26(B), treat each of the 6-azido-17α,21-(1'-methoxy-1'-n - propylmethylenedioxy) - 4,6-pregnadiene-3,20-diones prepared as described in the first paragraph of Example 27(A) with aqueous acetic acid. Isolate and purify the resultant respective products in a manner similar to that described in Example 26(B) to obtain, respectively:

6-azido-4,6-pregnadiene-17α,21-diol-3,11,20-trione 17-n-butyrate,
6-azido-9α-fluoro-4,6-pregnadiene-17α,21-diol-3,11,20-trions 17-n-butyrate,
6-azido-4,6-pregnadiene-11β,17α,21-triol-3,20-dione 17-n-butyrate,
6-azido-9α-fluoro-4,6-pregnadiene-11β,17α,21-triol-3,20-dione 17-n-butyrate,
6-azido-16α-methyl-4,6-pregnadiene-17α,21-diol-3,11,20-trione 17-n-butyrate,
6-azido-16β-methyl-4,6-pregnadiene-17α,21-diol-3,11,20-trione 17-n-butyrate,
6-azido-9α-fluoro-16α-methyl-4,6-pregnadiene-17α,21-diol-3,11,20-trione 17-n-butyrate,
6-azido-9α-fluoro-16β-methyl-4,6-pregnadiene-17α,21-diol-3,11,20-trione 17-n-butyrate,
6-azido-16α-methyl-4,6-pregnadiene-11β,17α,21-triol-3,30-dione 17-n-butyrate,
6-azido-16β-methyl-4,6-pregnadiene-11β,17α,21-triol-3,20-dione 17-n-butyrate,
6-azido-9α-fluro-16β-methyl-4,6-pregnadiene-11β,17α,21-triol-3,20-dione 17-n-butyrate,
6-azido-16-methylene-4,6-pregnadiene-17α,21-diol-3,11,20- 17-n-butyrate,
6-azido-9α-fluoro-16-methylene-4,6-pregnadiene-17α,21-diol-3,11,20-trione 17-n-butyrate,
6-azido-16-methylene-4,6-pregnadiene-11β,17α,21-triol-3,20-dione 17-n-butyrate,
6-azido-9α-fluoro-16-methylene-4,6-pregnadiene-11β,17α,21-triol-3,20-dione 17-n-butyrate, and
6-azido-9α,11β-dichloro-4,6-pregnadiene-17α,21-diol-3,20-dione 17-n-butyrate.

Similarly, by treating the 6-azido-17α,21-(1'-methoxy-1'-ethylmethylenedioxy) - 4,6 - pregnadines prepared as described in the third paragraph of Example 27(A), there is obtained the 17-monopropionate ester of each of the steroids listed hereinabove.

(C) 6 - azido - 4,6 - pregnadiene - 17α,21-diol-3,20-dione 17,21-butyrate esters.—In a manner similar to that described in Example 26(C) treat each of the 17-mono- butyrate esters prepared as described in Example 27(B), first paragraph, with butyric anhydride in pyridine. Isolate and purify the resultant respective products to obtain, respectively:

6-azido-4,6-pregnadiene-17α,21-diol-3,11,20-trione 17,21-di-butyrate,
6-azido-9α-fluoro-4,6-pregnadiene-17α,21-diol-3,1,20-trione 17,21-di-butyrate,
6-azido-4,6-pregnadiene-11β,17α,21-triol-3,20-dione 17,21-di-butyrate,
6-azido-9α-fluoro-4,6-pregnadiene-11β,17α,21-triol-3,20-dione 17,21-di-butyrate,
6-azido-16α-methyl-4,6-pregnadiene-17α,21-diol-3,11,20-trione 17,21-di-butyrate,
6-azido-16β-methyl-4,6-pregnadiene-17α,21-diol-3,11,20-trione 17,21-di-butyrate,
6-azido-9α-fluoro-16α-methyl-4,6-pregnadiene-17α,21-diol-3,11,20-trione 17,21-di-butyrate,
6-azido-9α-fluoro-16β-methyl-4,6-pregnadiene-17α,21-diol-3,11,20-trione 17,21-di-butyrate,
6-azido-16α-methyl-4,6-pregnadiene-11β,17α,21-triol-3,20-dione 17,21-di-butyrate,
6-azido-16β-methyl-4,6-pregnadiene-11β,17α,21-triol-3,20-dione 17,21-di-butyrate,
6-azido-9α-fluoro-16α-methyl-4,6-pregnadiene-11α,17α,21-triol-3,20-dione 17,21-dibutyrate,
6-azido-9α-fluoro-16β-methyl-4,6-pregnadiene-11β,17α,21-triol-3,20-dione 17,21-di-butyrate,
6-azido-16-methylene-4,6-pregnadiene-17α,21-diol-3,11,20-trione 17,21-di-butyrate,
6-azido-9α-fluoro-16-methylene-4,6-pregnadiene-17α,21-diol-3,11,20-trione 17,21-di-butyrate,
6-azido-16-methylene-4,6-pregnadiene-11β,17α,21-triol-3,20-dione 17,21-di-butyrate,
6-azido-9α-fluoro-16-methylene-4,6-pregnadiene-4,6-pregnadiene-11β,17α,21-triol-3,20-dione 17,21-di-butyrate, and
6-azido-9α,11β-dichloro-4,6-pregnadiene-17α,21-diol-3,20-dione 17,21-di-butyrate.

In similar manner, by treating each of the 17-monopropionates of the starting steroids listed in Example 27A, first paragraph, with propionic anhydride in pyridine, there is obtained the corresponding 17α,21-di-propionate ester, respectively.

EXAMPLE 28

6-azido-1,4,6-pregnatriene-17α,21-diol-3,20-diones

Prepare a hydrochloric acid-dioxane solution by adding 0.5 ml. of concentrated hydrochloric acid and 5 ml. of water to 49.5 ml. of dioxane. To 10 ml. of this hydrochloric acid-dioxane solution, add 125 mg. of 6-azido-4,6-pregnadiene-17α,21-diol-3,11,20-trione 21 propionate and 150 mg. of 2,3-dichloro-5,6-dicyanobenzoquinone (DDQ). Under an atmosphere of nitrogen, warm the solution to 60° C. with stirring for 30 minutes. Pour the reaction mixture into 100 ml. of water and extract with ethyl acetate. Wash the combined ethyl acetate extracts with concentrated aqueous sodium sulfite solution and then with water. Dry the ethyl acetate solution over magnesium sulfate and filter. Pass the solution through a Florisil column. Evaporate the eluant in vacuo to a residue comprising 6-azido-1,4,6-pregnatriene-17α,21-diol-3,11,20 - trione 21-propionate. Purify by fractional crystallization from isopropyl ether-hexane.

In a similar manner treat each of the following 6-azido-4,6-pregnadienes with DDQ and concentrated hydrochloric acid in aqueous dioxane:

6-azido-4,6-pregnadiene-17α,21-diol-3,11,20-trione, or the 21-acetate, 17-mono-valerate, 17,21-di-propionate, or the 17,21-di-butyrate thereof, respectively;
6-azido-9α-fluoro-4,6-pregnadiene-17α,21 - diol - 3,11,20-trione, or the 21-acetate, 17-mono-valerate, 17,21-dipropionate, or the 17,21-di-butyrate thereof, respectively;

6-azido-4,6-pregadiene-11β,17α,21-triol-3,20-dione, or the 21-acetate, 17-mono-valerate, 17,21-di-propionate, or the 17,21-di-butyrate thereof, respectively;

6-azido-9α-fluoro-4,6-pregnadiene-11β,17α,21-triol - 3,20-dione, or the 21-acetate, 17-mono-valerate, 17,21-di-proprionate, or the 17,21-di-butyrate thereof, respectively;

6-azido-16α-methyl-4,6-pregnadiene-17α,21-diol - 3,11,20-trione, or the 21-acetate, 17-mono-valerate, 17,21-di-propionate, or the 17,21-di-butyrate thereof, respectively;

6-azido-9α-fluoro-16α-methyl-4,6 - pregnadiene - 17α,21-diol-3,11,20-trione, or the 21-acetate, 17-mono-valerate, 17,21-di-proprionate, or the 17,21-di-butyrate thereof, respectively;

6-azido-9α-fluoro-16β-methyl-4,6 - pregnadiene - 17α,21-diol-3,11,20-trione, or the 21-acetate, 17-mono-valerate, 17,21-di-propionate, or the 17,21-di-butyrate thereof, respectively;

6-azido-16β-methyl-4,6-pregnadiene-17α,21-diol - 3,11,20-trione, or the 21-acetate, 17-mono-valerate, 17,21-di-proprionate, or the 17,21-di-butyrate thereof, respectively;

6-azido-9α-fluoro-16β-methyl-4,6 - pregnadiene - 17α,21-diol-3,11,20-trione, or the 21-acetate, 17-mono-valerate, 17,21-di-propionate, or the 17,21-di-butyrate thereof, respectively;

6-azido-16α-methyl-4,6-pregnadiene-11β,17α,21 - triol - 3,20-dione, or the 21-acetate, 17-mono-valerate, 17,21-di-propionate, or the 17,21-di-buytrate thereof, respectively;

6-azido-9α-fluoro-16α-methyl-4,6 - pregnadiene - 11β,17α,21-triol-3,20-dione, or the 21-acetate, 17-mono-valerate, 17,21-diproprionate, or the 17,21-di-butyrate thereof, respectively;

6-azido-16β-methyl-4,6-pregnadiene-11β,17α,21 - triol - 3,20-dione, or the 21-acetate, 17-mono-valerate, 17,21-di-proprionate, or the 17,21-di-butyrate thereof, respectively;

6-azido-9α-fluoro-16β-methyl-4,6 - pregnadiene - 11β,17α,21-triol-3,20-dione, or the 21-acetate, 17-mono-valerate, 17,21-dipropionate, or the 17,21-di-butyrate thereof, respectively;

6-azido-16-methylene-4,6-pregnadiene-17α,21 - diol - 3,11,20-trione, or the 21-acetate, 17-mono-valerate, 17,21-di-propionate, or the 17,21-di-buyrate thereof, respectively;

6-azido-9α-fluoro-16-methylene-4,6-pregnadiene - 17α,21-diol-3,11,20-trione, or the 21-acetate, 17-mono-valerate, 17,21-di-propionate, or the 17,21-di-butyrate thereof, respectively;

6-azido-16-methylene-4,6-pregnadiene-11β,17α,21 - triol-3,20-dione, or the 21-acetate, 17-mono-valerate, 17,21-di-propionate, or the 17,21-di-butyrate thereof, respectively;

6-azido-9α-fluoro-16-methylene-4,6-pregnadiene - 11β,17α,21-triol-3,20-dione, or the 21-acetate, 17-mono-valerate, 17,21-di-propionate, or the 17,21-di-butyrate thereof, respectively; and 6-azido-9α,11β-dichloro-4,6-pregnadiene-17α,21 - diol - 3,20-dione, or the 21-acetate, 17-mono-valerate, 17,21-di-propionate, or the 17,21-di-butyrate thereof, respectively.

Isolate and purify the resultant respective products in a manner similar to that described hereinabove to obtain the followed corresponding 1,4,6-pregnatrienes:

6-azido-1,4,6-pregnatriene-17α,21-diol-3,11,20-trione, and the 21-acetate, 17-mono-valerate, 17,21-di-propionate, and the 17,21-di-butyrate thereof, respectively;

6-azido-9α-fluoro-1,4,6-pregnatriene-17α,21-diol - 3,11,20-trione, and the 21-acetate, 17-mono-valerate, 17,21-dipropionate, and the 17,21-di-butyrate thereof, respectively;

6-azido-1,4,6-pregnatriene - 11β,17α,21 - triol-3,20-dione, and the 21-acetate, 17-mono-valerate, 17,21-di-propionate, and the 17,21-di-butyrate thereof, respectively;

6-azido-9α-fluoro-1,4,6 - pregnatriene - 11β,17α,21-triol-3,20-dione, and the 21-acetate, 17-mono-valerate, 17,21-di-propionate, and the 17,21-di-butyrate thereof, respectively;

6-azido-16α-methyl-1,4,6-pregnatriene - 17α,21-diol-3,11,20-trione, and the 21-acetate, 17-mono-valerate, 17,21-di-propionate, and the 17,21-di-butyrate thereof, respectively;

6-azido-9α-fluoro - 16α-methyl-1,4,6-pregnatriene-17α,21-diol-3,11,20-trione, and the 21-acetate, 17-mono-valerate, 17,21-dipropionate, and the 17,21-di-butyrate thereof, respectively;

6-azido-9α-fluoro - 16β-methyl-1,4,6-pregnatriene-17α,21-diol-3,11,20-trione, and the 21-acetate, 17-mono-valerate, 17,21-di-propionate, and the 17,21-di-butyrate thereof, respectively;

6-azido-16β-methyl - 1,4,6-pregnatriene-17α,21-diol-3,11,20-trione, and the 21-acetate, 17-mono-valerate, 17,21-di-propionate and the 17,21-di-butyrate thereof, respectively;

6-azido-9α-fluoro - 16β-methyl-1,4,6-pregnatriene-17α,21-diol-3,11,20-trione, and the 21-acetate, 17-mono-valerate, 17,21-di-propionate, and the 17,21-di-butyrate thereof, respectively;

6-azido-16α-methyl - 1,4,6-pregnatriene-11β,17α,21-triol-3,20-dione, and the 21-acetate, 17-mono-valerate, 17,21-di-propionate, and the 17,21-di-butyrate thereof, respectively;

6-azido-9α-fluoro-16α - methyl-1,4,6 - pregnatriene-11β,17α,21-triol-3,20-dione, and the 21-acetate, 17-mono-valerate, 17,21-di-propionate, and the 17,21-di-butyrate thereof, respectively;

6-azido-16β-methyl-1,4,6 - pregnatriene-11β,17α,21-triol-3,20-dione, and the 21-acetate, 17-mono-valerate, 17,21-di-propionate, and the 17,21-di-butyrate thereof, respectively;

6-azido-9α-fluoro-16β - methyl-1,4,6 - pregnatriene-11β,17α,21-triol-3,20-dione, and the 21-acetate, 17-mono-valerate, 17,21-di-propionate, and the 17,21-di-butyrate thereof, respectively;

6-azido-16-methylene-1,4,6 - pregnatriene-17α,21-diol-3,11,20-trione, and the 21-acetate, 17-mono-valerate, 17,21-di-propionate, and the 17,21-di-butyrate thereof, respectively;

6-azido-9α-fluoro-16 - methylene-1,4,6-pregnatriene-17α,21-diol-3,11,20-trione, and the 21-acetate, 17-mono-valerate, 17,21-di-propionate, or the 17,21-di-butyrate thereof, respectively;

6-azido-16-methylene-1,4,6 - pregnatriene - 11β,17α,21-triol-3,20-dione, and the 21-acetate, 17-mono-valerate, 17,21-di-propionate, and the 17,21-di-butyrate thereof, respectively;

6-azido-9α-fluoro-16-methylene - 1,4,6-pregnatriene-11β,17α,21-triol-3,20-dione, and the 21-acetate, 17-mono-valerate, 17,21-di-propionate, and the 17,21-di-butyrate thereof, respectively; and 6-azido-9α,11β-dichloro - 1,4,6-pregnatriene-17α,21-diol-3,20-dione, and the 21-acetate, 17-mono-valerate, 17,21-di-propionate, and the 17,21-di-butyrate thereof, respectively.

EXAMPLE 29

Alternate method for preparation of 6-azido-4,6-pregnadiene-17α,21-diol-3,11,20-trione 21-acetate Stir a mixture of 100 mg. of 6β-azido-7α,17α,21-trihydroxy-4-pregnene-3,11,20-trione 21-acetate in 3.15 ml. of dioxane, 3.15 ml. acetic acid and 0.7 ml. concentrated hydrochloric acid at 25° C. for 24 hours, then add 60 ml. of methylene chloride and wash the methylene chloride solution with water, then dilute aqueous sodium bicarbonate solution and again with water. Dry the methylene chloride solution over magnesium sulfate, filter, then evaporate the solution in vacuo to a residue comprising 6-azido-4,6-pregnadiene - 17α,21-diol-3,11,20-trione 21-acetate in admixture with the corresponding 21-hydroxy derivative. Re-esterify by treating the product mixture with acetic anhydride in pyridine in a manner similar to that described in Example 1(B) to obtain 6-azido-4,6-pregnadiene-17α,21-diol-3,11,20-trione 21-acetate. Purify by chromatographing on a preparative silica gel plate.

In similar manner treat the 6β-azido-7α-hydroxy-4-pregnene-3,20-diones prepared as described in foregoing Examples 2(B), 4(B), 9(B), 11(B), 12(C) with hydrochloric acid in acetic acid and dioxane followed by isolation and purification of the resultant product to obtain the corresponding 6-azido-4,6-pregnadiene-3,20-dione.

In the above procedure, when the 21-hydroxy compound is desired the product mixture is not re-esterified but is immediately separated via silica gel preparative plate chromatography to obtain the corresponding 6-azido-4,6-pregnadiene-17α,21-diol-3,20-dione.

We claim:

1. A compound selected from the group consisting of 6-azido-4-pregnene-3,20-diones of following Formula I and the 1-dehydro-, 6-dehydro-, and 1,6-bis-dehydro- analogs thereof:

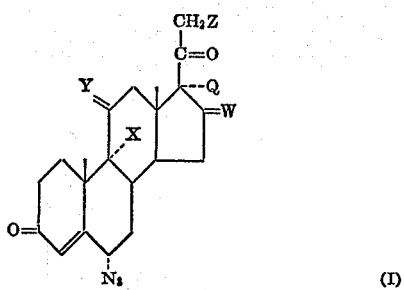

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen, (H,α-lower alkyl), (H,β-lower alkyl), (H,α-hydroxy), (H,α-OR') wherein R' is an acyl radical of hydrocarbon carboxylic acid having up to 12 carbon atoms, =CHT wherein T is a member selected from the group consisting of hydrogen, lower alkyl, fluorine and chlorine, and W taken together with Q when Q is hydroxy and W is (H,α-hydroxy), the 16α, 17α-lower alkylidene derivatives thereof;

X is a member selected from the group consisting of hydrogen and a halogen having an atomic weight less than 100;

Y is a member selected from the group consisting of hydrogen, oxygen, (H,β-OH), and, provided X is halogen, (H,β-halogen of atomic weight less than 100);

Z is a member selected from the group consisting of hydroxy, OR" wherein R" is an acyl radical of an acid selected from the group consisting of a hydrocarbon carboxylic acid having up to 12 carbon atoms, phosphoric acid and the mono- and di-alkali metal and alkaline earth metal salts thereof, and Z taken together with Q when both Q and Z are hydroxy, the 17α,21-lower alkylidene derivatives thereof.

2. A compound according to claim 1 which is a 6-dehydro analog of Formula I.

3. A 6-dehydro compound according to claim 1 wherein W and X are hydrogen, Y is keto and Q and Z are hydroxy, said compound being 6-azido-4,6-pregnadiene-17α-21-diol-3,11,20-trione.

4. A 6-dehydro compound according to claim 1 wherein W and X are hydrogen, Y is keto, Q is hydroxy and Z is acetoxy, said compound being 6-azido-4,6-pregnadiene-17α,21-diol-3,11,20-trione 21-acetate.

5. A 6-dehydro compound according to claim 1 wherein W and X are hydrogen, Y is keto, Q is valeroxy and Z is hydroxy, said compound being 6-azido-4,6-pregnadiene-17α,21-diol-3,11,20-trione 17-valerate.

6. A 6-dehydro compound according to claim 1 wherein W and X are hydrogen, Y is keto, Q and Z are propionoxy, said compound being 6-azido-4,6-pregnadiene-17α,21-diol-3,11,20-trione 17,21-dipropionate.

7. A 6-dehydro compound according to claim 1 wherein W and X are hydrogen and Y, Q and Z are hydroxy, said compound being 6-azido-4,6-pregnadiene-11β,17α,21-triol-3,20-dione.

8. A 6-dehydro compound according to claim 1 wherein W and X are hydrogen, Y and Q are hydroxy and Z is acetoxy, said compound being 6-azido-4,6-pregnadiene-11β,17α,21-triol-3,20-dione 21-acetate.

9. A 6-dehydro compound according to claim 1 wherein W and X are hydrogen, Y and Z are hydroxy, and Q is valeroxy, said compound being 6-azido-4,6-pregnadiene-11β,17α,21-triol-3,20-dione 17-valerate.

10. A 6-dehydro compound according to claim 1 wherein W and X are hydrogen, Y is hydroxy, and Q and Z are each propionoxy, said compound being 6-azido-4,6-pregnadiene-11β,17α,21-triol-3,20-dione 17,21 - dipropionate.

11. A 6-dehydro compound according to claim 1 wherein X is fluoro, Y is (H,βOH), W is (H,α-methyl), Q and Z are each propionoxy, said compound being 6-azido - 9α - fluoro-16α-methyl-4,6-pregnadiene-11β,17α,21-triol-3,20-dione 17,21-dipropionate.

12. A 6-dehydro compound according to claim 1 wherein X is fluoro, Y is (H,βOH), W is (H,α-methyl), Q and Z are each butyroxy, said compound being 6-azido-9α-fluoro - 16α - methyl-4,6-pregnadiene-11β,17α,21-triol-3,20-dione 17,21-dibutyrate.

13. A 6-dehydro compound according to claim 1 wherein X is fluoro, Y is (H,βOH), W is (H,α-methyl), Q is valeroxy and Z is hydroxy, said compound being 6-azido - 9α - fluoro-16α-methyl-4,6-pregnadiene-11β,17α,21-triol-3,20-dione 17-valerate.

14. A 6-dehydro compound according to claim 1 wherein X is fluoro, Y is (H,βOH), W is (H,β-methyl), Q and Z are each propionoxy, said compound being 6-azido-9α-fluoro-16β-methyl-4,6-pregnadiene - 11β,17α,21-triol-3,20-dione 17,21-dipropionate.

15. A 6-dehydro compound according to claim 1 wherein X is fluoro, Y is (H,βOH), W is (H,β-methyl), Q and Z are each butyroxy, said compound being 6-azido-9α-fluoro - 16β - methyl-4,6-pregnadiene-11β,17α,21-triol-3,20-dione 17,21-dibutyrate.

16. A 6-dehydro compound according to claim 1 wherein X is fluoro, Y is (H,βOH), W is (H,β-methyl), Q is valeroxy and Z is hydroxy, said compound being 6-azido-9α-fluoro-16β-methyl-4,6-pregnadiene - 11β,17α,21-triol-3,20-dione 17-valerate.

17. A compound having the following formula:

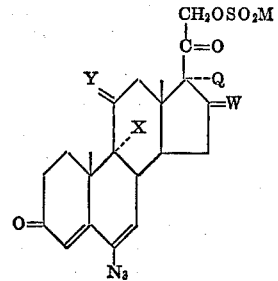

wherein

M is a hydrocarbon radical having up to seven carbon atoms;

Q is a member selected from the group consisting of hydrogen, hydroxy, and OR, R being an acyl radical of a hydrocarbon carboxylic acid having up to 12 carbon atoms;

W is a member selected from the group consisting of hydrogen, (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, chlorine and fluorine, and, together with Q when Q is hydroxy and W is (H,α-hydroxy), the 16α,17α-lower alkylidene derivatives thereof;

X is a member selected from the group consisting of hydrogen and a halogen having an atomic weight less than 100; and Y is a member selected from the group consisting of hydrogen, oxygen, (H,βOH), and, provided X is halogen, (H,β halogen of atomic weight less than 100).

18. A compound according to claim 17 wherein M is methyl.

19. A compound according to claim 17 wherein M is methyl, W and X are hydrogen, Y is keto, and Q is hydroxy, said compound being 6-azido - 4,6 - pregnadiene-17α,21-diol-3,11,20-trione 21-methanesulfonate.

20. A compound selected from the group consisting of 6β-azido-7α-oxygenated-4-pregnene-3,20-diones of the following formula and the 1-dehydro analogs thereof:

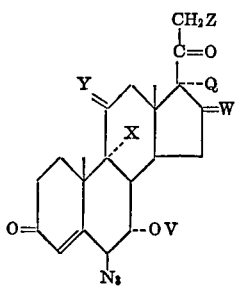

wherein

Q is a member selected from the group consisting of hydrogen, hydroxy, and OR, R being an acyl radical of a hydrocarbon carboxylic acid having up to 12 carbon atoms;

V is a member selected from the group consisting of hydrogen and an acyl radical of an acid selected from the group consisting of a hydrocarbon carboxylic acid having up to 8 carbon atoms and a hydrocarbonsulfonic acid having up to 7 carbon atoms;

W is a member selected from the group consisting of hydrogen, (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene derivatives thereof;

X is a member selected from the group consisting of hydrogen and a halogen having an atomic weight less than 100;

Y is a member selected from the group consisting of hydrogen, keto, (H,βOH), and, provided X is halogen, (H,β halogen of atomic weight less than 100) and, provided X is hydrogen, (H,αOV') V' being a member selected from the group consisting of hydrogen and an acyl radical of a hydrocarbon sulfonic acid having up to 7 carbon atoms, and Y and X taken together are members selected from the group consisting of a 9(11)-dehydro bond and a 9β,11β-epoxy group;

Z is a member selected from the group consisting of hydroxy, OR" wherein R" is an acyl radical of an acid selected from the group consisting of a hydrocarbon carboxylic acid having up to 12 carbon atoms, phosphoric acid and the mono- and di-alkali metal and alkaline earth metal salts thereof, and when taken together with Q when both Q and Z are hydroxy, the 17α,21-lower alkylidene derivatives thereof.

21. A compound according to claim 20 wherein V is acetyl and Z is OR", R" being acetyl.

22. A compound according to claim 20 wherein V is hydrogen and Z is OR", R" being acetyl.

23. A compound according to claim 20 wherein Y is oxygen, Q is hydroxy, Z is OR", R" being acetyl, and X, V, and W are hydrogen, said compound being 6β-azido-7α-hydroxy - 4 - pregnene-17α,21-diol-3,11,20-trione 21-acetate.

24. A compound according to claim 20 wherein Y is oxygen, Q is hydroxy, Z is OR", R" being acetyl, V is acetyl and X and W are hydrogen, said compound being 6β-azido-7α-acetoxy - 4 - pregnene-17α,21-diol-3,20-dione 21-acetate.

25. A 1-dehydro analog according to claim 20 wherein Y is oxygen, Q is hydroxy, Z is OR", R" being acetyl and X, V, and W are hydrogen, said compound being 6β-azido-7α-hydroxy - 1,4 - pregnadiene-17α,21-diol-3,11,20-trione 21-acetate.

26. A 1-dehydro analog according to claim 20 wherein Y is oxygen, Q is hydroxy, Z is OR", R" being acetyl and X and W are hydrogen and V is acetyl, said compound being 6β-azido-7α-acetoxy-1,4-pregnadiene-17α,21-diol-3,11,20-trione 21-acetate.

27. A process for preparing 6-azido-4,6-pregnadiene-3,20-diones of the following Formula I:

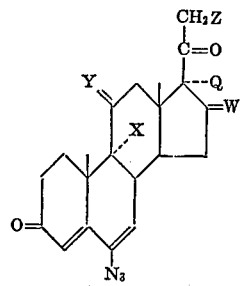

(I)

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene derivatives thereof;

X is a member selected from the group consisting of hydrogen and a halogen having an atomic weight less than 100;

Y is a member selected from the group consisting of hydrogen, oxygen, (H,βOH), and provided X is halogen (H,β halogen of atomic weight less than 100);

Z is a member selected from the group consisting of hydroxy, OR" wherein R" is an acyl radical of an acid selected from the group consisting of a hydrocarbon carboxylic acid having up to 12 carbon atoms, phosphoric acid and the mono- and di-alkali metal and alkaline earth metal salts thereof, and when taken together with Q when both Q and Z are hydroxy the 17α,21-lower alkylidene derivatives thereof;

which comprises treating a 6α,7α-oxido-4-pregnene-3,20-dione of the following Formula A:

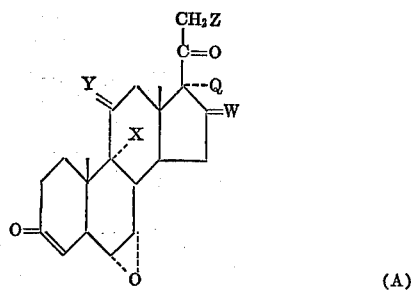

(A)

wherein

Q, W, X, Y, and Z are as hereinabove defined for Formula I, with an alkali metal azide in a non-reactive, organic solvent, treating the resulting 6β-azido-7α-hydroxy-4-pregnene-3,20-dione of the following Formula B:

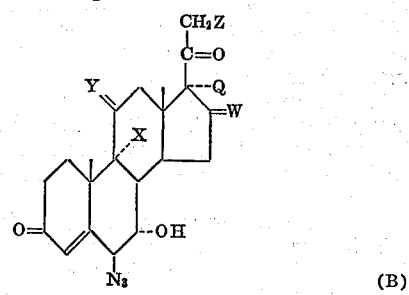

(B)

wherein

Q, W, X, Y and Z are as hereinabove defined for Formula I, with an acylating reagent selected from the group consisting of an acid anhydride of a hydrocarbon carboxylic acid having up to 8 carbon atoms and an acyl halide of an acid selected from the group consisting of a hydrocarbon carboxylic acid having up to 8 carbon atoms and a hydrocarbon sulfonic acid having up to seven carbon atoms;

and treating the resulting 6β-azido-7α-acyloxy-4-pregnene-3,20-dione of the following Formula C:

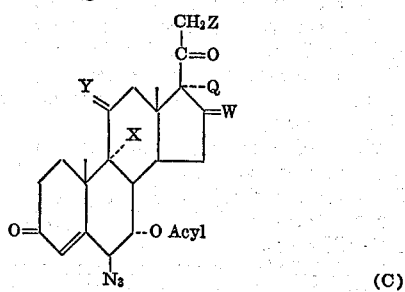

(C)

wherein

Q, W, X, Y, and Z are as defined hereinabove for Formula I;

with a tetraalkylammonium halide in an aprotic solvent.

28. The process according to claim 27 including the step of isolating the 6-azido-4,6-pregnadiene of Formula I produced thereby.

29. The process according to claim 27 wherein said alkali metal azide in a non-reactive solvent is sodium azide in aqueous dioxane-methanol;
wherein said acylating reagent is acetic anhydride in pyridine; and
wherein said tetraalkylammonium halide in an aprotic solvent is tetramethylammonium fluoride in acetonitrile, said process for preparing a 6-azido-4,6-pregnadiene of Formula I comprising treating a 6α,7α-oxido-4-pregnene of Formula A with sodium azide in aqueous dioxane-methanol;
treating the resulting 6β-azido-7α-hydroxy-4-pregnene of Formula B with acetic anhydride in pyridine, and
treating the resulting 6β-azido-7α-acetoxy-4-pregnene of Formula C wherein acyl is acetyl, with tetramethylammonium fluoride in acetonitrile.

30. The process according to claim 27 wherein said 6α,7α-oxido-4-pregnene-3,20-dione is a compound of Formula A wherein X and W are hydrogen, Y is oxygen, Q is hydroxy, and Z is OR″ with R″ being acetyl, and wherein said compound of Formula A is treated with an alkali metal azide in a nonreactive solvent in the presence of acetic acid, said alkali metal azide in a non-reactive solvent being sodium azide in aqueous dioxane-methanol;
and wherein said acylating reagent is acetic anhydride in pyridine and said tetraalkyl-ammonium halide is tetramethylammonium fluoride in acetonitrile;
said process comprising treating 6α,7α-oxido-4-pregnene-17α,21-diol-3,11,20-trione 21-acetate with sodium azide in aqueous dioxane-methanol in the presence of acetic acid;
treating the resulting 6β-azido-7α-hydroxy-4-pregnene-17α,21-diol-3,11,20-trione 21-acetate with acetic anhydride in pyridine;
and treating the resulting 6β-azido-7α-acetoxy-4-pregnene-17α,21-diol-3,11,20-trione 21-acetate with tetramethylammonium fluoride in acetonitrile, whereby is prepared 6-azido-4,6-pregnadiene-17α,21-diol-3,11,20-trione 21-acetate.

31. The process according to claim 30 and including the step of isolating the 6-azido-4,6-pregnadiene-17α,21-diol-3,11,20-trione 21-acetate thereby formed.

32. A process for preparing 6-azido-4,6-pregnadiene-3,20-diones of the following Formula I:

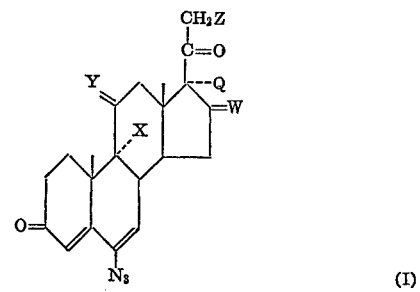

(I)

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen, (H,α-lower alkyl), (H,β-lower alkyl), (H,α-hydroxy), (H,α-OR′) wherein R′ is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene derivatives thereof;

X is a member selected from the group consisting of hydrogen and a halogen having an atomic weight less than 100;

Y is a member selected from the group consisting of hydrogen, oxygen, (H,βOH), and, provided X is halogen (H,β halogen of atomic weight less than 100);

Z is a member selected from the group consisting of hydroxy, OR″ wherein R″ is an acyl radical of an acid selected from the group consisting of a hydrocarbon carboxylic acid having up to 12 carbon atoms, phosphoric acid and the mono- and dialkali metal and alkaline earth metal salts thereof, and when taken together with Q when both Q and Z are hydroxy, the 17α,21-lower alkylidene derivatives thereof;

which comprises treating a 6β-azido-4-pregnene-3,20-dione of the following Formula A:

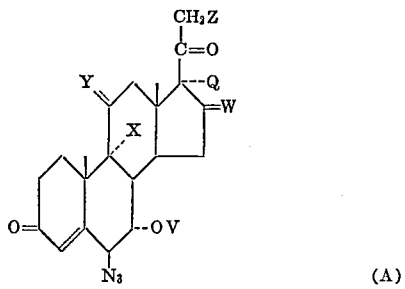

(A)

wherein Q, W, X, Y, and Z are as hereinabove defined for Formula I, and wherein V is a member selected from the group consisting of hydrogen and lower alkanoyl, with concentrated hydrochloric acid in a lower alkanoic acid in an inert solvent.

33. The process according to claim 32 wherein said lower alkanoic acid is acetic acid and wherein said inert solvent is dioxane.

34. The process for preparing a compound selected from the group consisting of a 6α-azido-4-pregnene-3,20-dione of following Formula I and the 1-dehydro analogs thereof:

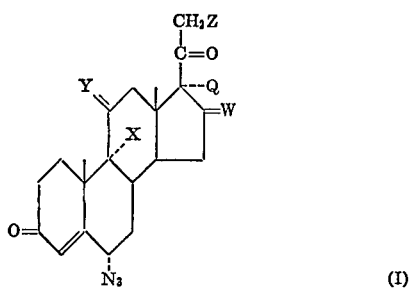

(I)

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen, (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene derivatives thereof;

X is a member selected from the group consisting of hydrogen and a halogen having an atomic weight less than 100;

Y is a member selected from the group consisting of hydrogen, oxygen, (H,βOH), and, provided X is halogen (H,β halogen of atomic weight less than 100);

Z is a member selected from the group consisting of hydroxy, OR" wherein R" is an acyl radical of an acid selected from the group consisting of a hydrocarbon carboxylic acid having up to 12 carbon atoms, phosphoric acid and the mono- and di-alkali metal and alkaline earth metal salts thereof, and when taken together with Q when both Q and Z are hydroxy, the 17α,21-lower alkylidene derivatives thereof, which comprises treating a member selected from the group consisting of a 6β-L-4-pregnene-3,20-dione of the following Formula A and the 1-dehydro analogs thereof:

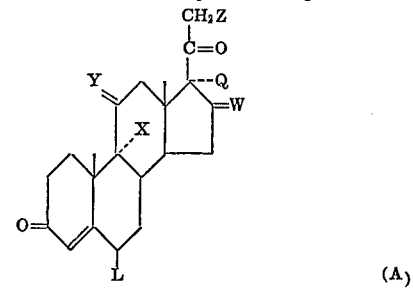

(A)

wherein L is a member selected from the group consisting of bromine, chlorine and hydrocarbonsulfonyloxy having up to seven carbon atoms and Q, W, X, Y, and Z are as defined hereinabove for Formula I, with an alkali metal azide in an inert solvent.

35. The process according to claim 34 wherein said alkali metal azide is sodium azide.

36. A 6-dehydro compound according to claim 1 wherein Q is hydroxy, W is (H,α-methyl), X is fluoro, Y is (H,βOH) and Z is acetoxy, said compound being 6-azido-9α - fluoro - 16α - methyl - 4,6 - pregnadiene - 11β,17α,21-triol-3,20-dione 21-acetate.

37. A compound according to claim 1 wherein Q is hydroxy, W is (H,β-methyl), X is fluoro, Y is (H,βOH) and Z is acetoxy, said compound being 6-azido-9α-fluoro-16β-methyl-4,6-pregnadiene-11β,17α,21 - triol - 3,20 - dione 21 acetate.

38. A 16α,17α-iso-propylidenedioxy derivative of a 6-dehydro compound of claim 1 wherein Q is hydroxy, W is (H,αOH), Y is (H,βOH), X is fluoro and Z is acetoxy, said compound being 6-azido-9α-fluoro-16α,17α-iso-propylidenedioxy - 4,6 - pregnadiene - 11β,21 - diol - 3,20-dione 21 acetate.

39. A 1,6-bis-dehydro compound according to claim 1 wherein Q is hydroxy, W is (H,α-methyl), X is fluoro, Y is (H,βOH) and Z is acetoxy, said compound being 6-azido - 9α - fluoro - 16α - methyl - 1,4,6 - pregnatriene-11β,17α,21-triol-3,20-dione 21-acetate.

40. A 1,6-bis-dehydro compound according to claim 1 wherein Q is hydroxy, W is (H,β-methyl), X is fluoro, Y is (H,βOH) and Z is acetoxy, said compound being 6-azido - 9α - fluoro - 16β - methyl - 1,4,6 - pregnatriene-11β,17α,21-triol-3,20-dione 21-acetate.

41. A 6-dehydro compound according to claim 1 wherein Q and Z are hydroxy, X is fluorine, Y is (H,βOH) and W is (H,α-methyl) said compound being 6-azido-9α-fluoro - 16α - methyl - 4,6 - pregnadiene - 11β,17α,21-triol-3,20-dione.

42. A 6-dehydro compound according to claim 1 wherein Q and Z are hydroxy, X is fluorine, Y is (H,βOH), and W is (H,β-methyl), said compound being 6-azido-9α-fluoro - 16β - methyl - 4,6 - pregnadiene - 11β,17α-,21-triol-3,20-dione.

43. A 1,6-bis-dehydro compound according to claim 1 wherein Q and Z are hydroxy, X is fluorine, Y is (H,βOH) and W is (H,α-methyl), said compound being 6-azido-9α-fluoro - 16α - methyl - 1,4,6 - pregnatriene - 11β,17α,21-triol-3,20-dione.

44. A 1,6-bis-dehydro compound according to claim 1 wherein Q and Z are hydroxy, X is fluorine, Y is (H,βOH) and W is (H,β-methyl), said compound being 6-azido-9α-fluoro - 16β - methyl - 1,4,6 - pregnatriene - 11β,17α,21-triol-3,20-dione."

References Cited

UNITED STATES PATENTS 3,707,484   12/1972   Rausser et al. _____ 260—349

ELBERT L. ROBERTS, Primary examiner

U.S. Cl. X.R.

260—239.55 D, 397.45, 397.47; 195—51; 424—238

UNITED STATES PATENT OFFICE
CERTIFICATE OF CORRECTION

Patent No. 3,784,603     Dated January 8, 1974

Inventor(s) Elliot L. Shapiro et al

It is certified that error appears in the above-identified patent and that said Letters Patent are hereby corrected as shown below:

Column 2, line 1, "of the composition" should read --of this composition--. Column 3, lines 8 and 9, "-6-azido-2-oxygenated" should read --6-azido-21-oxygenated--. Column 3, line 47, "=CHT where T is" should read --=CHT wherein T is--. Column 4, line 30, "iso-butyric, tert.-butyric, valeric," should read --iso-butyric, valeric,--. Column 4, line 40, "by R, R' and R" in" should read --by R" in---. Column 4, lines 42 and 43, "(e.g. sodium, potassium, lithium" should read --(e.g. sodium, potassium, lithium)--. Column 5, line 51, "-9$\alpha$-fluoro-16$\beta$-methyl-" should read --9$\alpha$-fluoro-16$\alpha$-hydroxy--. Column 5, lines 60 and 61, "anti-inflamatory should read --anti-inflammatory--. Column 6, lines 6 and 7, "-17-mono-valerate of the" should read --17-mono-valerate thereof, the--. Column 8, line 58, "thereof of the 21-" should read --thereof to the 21--. Column 9, lines 48 and 49, "iso-butyric, tert.-butyric, valeric," should read --isobutyric, valeric,--. Column 9, lines 64 and 65, "with an alkali metal ammonium fluoride should read --with a tetraalkylammonium fluoride--. Column 10, line 18, "-11$\beta$,17$\alpha$-triol-" should read --11$\beta$,17$\alpha$,21-triol--. Column 12, line 67, "wherein Q and E" should read --wherein Q and Z--. Column 13, lines 15 and 16, "is transferred as" should read --is transformed as--. Column 17, line 10, "-11$\beta$-hydroxy-4,6-pregnadiene." should read --11$\beta$-hydroxy-4,6-pregnadiene--. Column 18, line 26, "-7$\alpha$-acryloxy-" should read --7$\alpha$-acyloxy--. Column 18, line 35, "of four invention." should read --of our invention.--. Column 19, line 26, "chlorine or bromine when a halogen" should read --chlorine or bromine. When a halogen--. Column 19, line 46, "-3,11-20-trione" should read --3,11,20-trione Column 20, line 57, "-3,11,20-trions-" should read --3,11,20-trione--. Column 21, line 24, "an 5 ml." should read --and 5 ml.-- Column 21, line 28, "pregadiene" should read --pregnadiene--. Column 21, line 36, "dehyldrogenation" should read --dehydrogenation--. Column 21, lines 72 and 73, "the hydroxyl" should read --free hydroxyl--. Column 25, line 33, "-cronized)---2.30"

UNITED STATES PATENT OFFICE
CERTIFICATE OF CORRECTION

Patent No. 3,784,603　　　　　Dated January 8, 1974

Inventor(s) Elliot L. Shapiro

It is certified that error appears in the above-identified patent and that said Letters Patent are hereby corrected as shown below:

should read --(Micronized)---2.50--.  Column 26, line 25, "pour in water" should read --pour into water--.  Column 27, line 5, "water as solvent." should read --water as solvate.--.  Column 27, line 6, "250 mµ ($\xi$=13,176);" should read --250 mµ ($\xi$=13,176);--.  Column 27, line 68, "-3,11,20-trion 21-" should read --3,11,20-trione 21--.

Column 28, line 25, "-2-acetate" should read --21-acetate--.  Column 28, line 28, "trinone" should read --trione--.  Column 28, line 69, "-perature for hours to obtain" should read --temperature to obtain--.  Column 29, lines 62-64, "treat 6β-azido-7$\alpha$,17$\alpha$,21-trihydride in pyridine at room temperature. Isolate and purify dioxy-4-pregnene-3,20-dione 21-acetate with acetic anhy-" should read --treat 6β-azido-7$\alpha$,17$\alpha$,21-trihydroxy-4-pregnene-3,20-dione 21-acetate with acetic anhydride in pyridine at room temperature. Isolate and purify--.  Column 30, line 60, "105°C. and 1 g." should read --105°C add 1 g.--.  Column 31, line 1, "at 20°" should read --at -20°--.  Column 31, line 12, "-6β-azido-7,17$\alpha$,21-" should read --6β-azido-7$\alpha$,17$\alpha$,21--.  Column 31, before line 55 should read "Example 8".  Column 32, before line 1 should read "B. 6-Azido-9$\alpha$-chloro-11β-fluoro-4,6-pregnadiene-17$\alpha$,21-diol-3,20-dione 21-acetate  In a manner similar to that described in Example 1C2 treat 6β-azido-7$\alpha$,17$\alpha$,21-trihydroxy-9$\alpha$-chloro-11β-fluoro-4-pregnene-3,20-dione 7,21-diacetate with tetramethylammonium fluoride in acetonitrile at room temperature to obtain 6-azido-9$\alpha$-chloro-11β-4,6-prenadiene-17$\alpha$,21-diol-3,20-dione 21-acetate.".  Column 32, line 3, "hydrocortisone 2-acetate)" should read --hydrocortisone 21-acetate)--.  Column 32, line 54, "ovre" should read --over--.  Column 33, line 61, "-21-acetone" should read --21-acetate--.  Column 33, line 74, "acetate acid." should read --acetic acid.--.  Column 35, line 34, "-4,6-pregnadiene-" should read --4-pregnene--.  Column 35, lines 50 and 51, "-4-pregnene-11β,17$\alpha$,21-triol-3,20-dione-" should read --4-pregnene-17$\alpha$,21-diol-3,11,20-trione--.  Column 35, lines 52

UNITED STATES PATENT OFFICE
CERTIFICATE OF CORRECTION

Patent No. 3,784,603               Dated  January 8, 1974

Inventor(s) Elliot L. Shapiro et al

It is certified that error appears in the above-identified patent and that said Letters Patent are hereby corrected as shown below:

and 53, "-4-pregnene-11β,17α,21-triol-3,20-dione-" should read --4-pregnene-17α,21-diol-3,11,20-trione--. Column 35, lines 54 and 55, "-4-pregnene-11β,17α,21-3,20-dione-" should read --4-pregnene-17α,21-diol-3,11,20-trione--. Column 35, after line 69 insert "-9α-bromo-11β-chloro-16β-methyl-4-pregnene-17α,21-diol-3,20-dione 21-acetate, and-". Column 36, line 11, "-3,11,20-dione-" should read --3,11,20-trione--. Column 36, line 21, "-11β,17α,21-trol-" should read --11β,17α,21-triol--. Column 36, line 64, "-11β,11α,21-triol-" should read -11β,17α,21-triol--. Column 37, line 3, "-9-bromo-16-α-methyl-" should read --9α-bromo-16α-methyl--. Column 37, line 5, "-11β-17α," should read --11β,17α,--. Column 37, lines 26 and 27, "-21acetate," should read --21-acetate,--. Column 37, line 27, "-16α-ethyl-pregnene-" should read --16α-ethyl-4-pregnene--. Column 38, line 12, "-4-pregnene-17α-,21-" should read --4-pregnene-17α,21--. Column 38, line 27, "-7α,11β,21-tetrahydroxy-" should read --7α,11β,17α,21-tetrahydroxy--. Column 38, line 45, "-7,21diacetate," should read --7,21-diacetate,--. Column 39, lines 68 and 69, "-diol-3,20-trione-" should read --diol-3,11,20-trione--. Column 39, lines 70 and 71, "-diol-3,20-trione-" should read --diol-3,11,20-trione--. Column 39, lines 72 and 73, "-diol-3,11,20 21-acetate," should read --diol-3,11,20-trione 21-acetate--. Column 39, line 74, "-11β,1α,21-triol-" should read --11β,17α,21-triol--. Column 40, lines 13 and 14, "resultant respect products" should read --resultant respective products--. Column 40, line 16, "-16-methylenne-4,6-" should read --16-methylene-4,6---. Column 40, line 29, "-4,6-pregndiene-" should read --4,6-pregnadiene--. Column 40, lines 52 and 53, "monoperphthalic acid per 5 millimoles of steroid" should read --monoperphthalic acid in chloroform but using 1.25 g. of monoperphthalic acid per 5 millimoles of steroid--. Column 40, line 58, "-11β,1α,21-diol-" should read --11β,17α,21-diol--. Column 40, line 64, "-6α,7α-oxide-9α-" should read --6α,7α-oxido-9α---. Column 41, line 11,

UNITED STATES PATENT OFFICE
CERTIFICATE OF CORRECTION

Patent No. 3,784,603   Dated January 8, 1974

Inventor(s) Elliot L. Shapiro et al.

It is certified that error appears in the above-identified patent and that said Letters Patent are hereby corrected as shown below:

"-4-pregnane-" should read --4-pregnene--. Column 44, line 70, "-7α,16α,17α,21tetrahydroxy-" should read --7α,16α,17α,21-tetrahydroxy--. Column 45, line 60, "dioxygentted" should read --dioxygenated--. Column 46, line 39, "-7,17,21-triacetate-" should read --7,16,21-triacetate--. Column 46, line 50, "at -20°" should read --at -20°C--. Column 47, line 27, "-3,20-dione 7,21-diacetate." should read --3,20-dione 7,16,21-triacetate.--. Column 49, line 3, "result" should read --resultant--. Column 49, line 30, "-3.20-dione." should read --3,20-dione.--. Column 49, before line 31, insert "6β-Azido-7α-acetoxy-17α,21-isopropylidenedioxy-4-pregnene-3,20-dione". Column 49, line 40, "-7α,21-isopropylidenedioxy-" should read --7α-hydroxy-17α,21-isopropylidenedioxy-4-pregnene--. Column 49, line 75, "product" should read --products--.

Column 51, line 26, "-16-fluoromethyelne-" should read --16-fluoromethylene--.

Column 51, line 46, "-tetrahyroxy-16-" should read --tetrahydroxy-16--.

Column 52, line 67, "-6α,9β-dibromo-" should read --6β,9α-Dibromo-

Column 54, line 8, "-9α-broom-" should read --9α-bromo--. Column 54, line 36, "-9,11β-dichloro-" should read --9α,11β-dichloro--. Column 54, line 37, "-17,21-diol-" should read --17α,21-diol--.

UNITED STATES PATENT OFFICE
CERTIFICATE OF CORRECTION

Patent No. 3,784,603   Dated January 8, 1974

Inventor(s) Elliot L. Shapiro et al

It is certified that error appears in the above-identified patent and that said Letters Patent are hereby corrected as shown below:

Column 54, line 58, "-16fluoromethylene-" should read --16-fluoromethylene--. Column 54, line 71, "-20-one 21-acetate," should read --3,20-dione 21-acetate,--. Column 55, line 9, "-6$\alpha$-azido-9$\alpha$-11$\beta$-" should read --6$\alpha$-Azido-9$\alpha$,11$\beta$--. Column 56, line 13, "-11$\beta$-17$\alpha$,21-triol-" should read --11$\beta$,17$\alpha$,21-triol--.

Column 56, line 39, "-tetrol-3,20dione-" should read --tetrol-3,20-dione--. Column 56, line 41, "-6$\alpha$-azido-9$\alpha$,fluoro-" should read --6$\alpha$-Azido-9$\alpha$-fluoro--. Column 56, line 44, "-diol-20-one-" should read --diol-3,20-dione--. Column 57, line 41, "-3,11-20-" should read --3,11,20--. Column 57, lines 54 and 55, "-16,21diacetate," should read --16,21-diacetate,--. Column 58, line 7, "-4,6pregnadiene-" should read --4,6-pregnadiene--.

Column 58, line 68, "-11$\beta$,17$\alpha$,21-diol-" should read --11$\beta$,17$\alpha$,21-triol--. Column 60, line 47, "-iso-proplidenedioxy-" should read --iso-propylidenedioxy--. Column 60, line 58, "filter an air dry" should read --filter and air dry--. Column 61, lines 2 and 3, "-2-disodium phosphate," should read --21-disodium phosphate,--. Column 63, line 40, "-4,6-pregnadiene-11$\beta$,21-diol-" should read --4,6-pregnadiene-17$\alpha$,21-diol--. Column 64, line 57, "-11$\beta$,ol-3,20-dione-" should read --11$\beta$-ol-3,20-dione--. Column 64, line 59, "-11$\beta$.ol-3,20-dione-" should read --11$\beta$-ol-3,20-dione--. Column 64, line 62, "-6-azido-16$\alpha$-methyl-" should read --6-Azido-16$\beta$-methyl--. Column 64, line 70, "-6-azido-16$\beta$-methyl-" should read --6-Azido-16$\alpha$-methyl--. Column 65, line 12, "-6-azido-9$\alpha$,fluoro-" should read --6-Azido-9$\alpha$-fluoro--. Column 65, line 15, "-dichloro-17$\alpha$-(1'-" should read --dichloro-17$\alpha$,21--. Column 65, line 37, "-trions 17-n-butyrate-" should read --trione 17-n-butyrate--. Column 65, line 51, "-3,30-dione-" should read --3,20-dione--. Column 65, line 54, "-9$\alpha$-fluro-16$\beta$-methyl-" should read --9$\alpha$-fluoro-16$\alpha$-methyl--. Column 65, line 68, "-4,6-pregnadines-"

UNITED STATES PATENT OFFICE
CERTIFICATE OF CORRECTION

Patent No. 3,784,603   Dated January 8, 1974

Inventor(s) Elliot L. Shapiro et al.

It is certified that error appears in the above-identified patent and that said Letters Patent are hereby corrected as shown below:

should read --4,6-pregnadienes--.  Column 66, line 8, "-diol-3,1,20-" should read --diol-3,11,20--.  Column 66, line 26, "-11α,17α,21-" should read --11β,17α,21--.  Column 66, lines 36 and 37, "-4,6-pregnadiene-4,6-pregnadiene-11β,17α,21-triol-" should read --4,6-pregnadiene-11β,17α,21-triol--.  Column 67, line 3, "-4,6-pregadiene-" should read --4,6-pregnadiene--.  Column 67, lines 7 and 8, "-proprionate-" should read --propionate-- Column 67, line 16, "-di-proprionate," should read --di-propionate,--.  Column 67, line 20, "-di-proprionate," should read --di-propionate,--.  Column 67, line 24, "-proprionate," should read --propionate,--.  Column 67, line 36, "-proprionate-" should read --propionate--.  Column 67, line 41, "-proprionate-" should read --propionate--.  Column 67, line 49, "-di-buyrate-" should read --di-butyrate--.  Column 67, line 69, "followed" should read --following--.  Column 68, line 51, "-3,11,20-dione-" should read --3,11,20-trione--.  Column 69, line 75, Claim 3, "-17α-21-diol-" should read --17α,21-diol--.  Column 72, line 18, Claim 24, "-17α,21-diol-3,20-dione-" should read --17α,21-diol-3,11,20-trione--.

UNITED STATES PATENT OFFICE
CERTIFICATE OF CORRECTION

Patent No. 3,784,603              Dated January 8, 1974

Inventor(s) Elliot L. Shapiro et al.

It is certified that error appears in the above-identified patent and that said Letters Patent are hereby corrected as shown below:

Column 73, line 11, Claim 27, Formula (A),
" 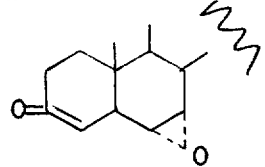 " should read -- 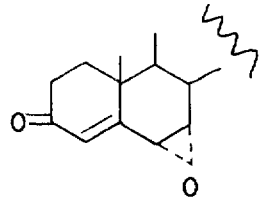 --.

Column 76, line 56, Claim 42, "-4,6-pregnadiene-11β,17α-21-triol-" should read --4,6-pregnadiene-11β,17α,21-triol--.

Signed and Sealed this nineteenth Day of July 1977

[SEAL]

Attest:

RUTH C. MASON
Attesting Officer

C. MARSHALL DANN
Commissioner of Patents and Trademarks